United States Patent
Tan et al.

(10) Patent No.: US 8,106,949 B2
(45) Date of Patent: Jan. 31, 2012

(54) SMALL MEMORY FOOTPRINT LIGHT TRANSPORT MATRIX CAPTURE

(75) Inventors: Kar-Han Tan, Sunnyvale, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 520 days.

(21) Appl. No.: 12/412,244

(22) Filed: Mar. 26, 2009

(65) Prior Publication Data

US 2010/0245591 A1    Sep. 30, 2010

(51) Int. Cl.
*H04N 17/00* (2006.01)
*H04N 9/31* (2006.01)

(52) U.S. Cl. ........ 348/180; 348/181; 348/177; 348/745; 348/744; 348/187; 353/69

(58) Field of Classification Search .................. 348/187, 348/184, 177, 181, 188, 180, 744, 745, 746, 348/747, 806; 353/69; 382/275
See application file for complete search history.

(56) References Cited

U.S. PATENT DOCUMENTS

| | | | |
|---|---|---|---|
| 5,459,486 A | 10/1995 | Iverson et al. | |
| 7,019,713 B2 | 3/2006 | Hereld et al. | |
| 7,036,940 B2 | 5/2006 | Matsuda et al. | |
| 7,104,653 B2 | 9/2006 | Moriwaki et al. | |
| 7,158,685 B2 | 1/2007 | Guenter | |
| 7,181,365 B2 | 2/2007 | Inoue et al. | |
| 7,857,464 B2 * | 12/2010 | Saito et al. | ........................ 353/94 |
| 7,901,095 B2 * | 3/2011 | Xiao et al. | ..................... 353/121 |
| 7,978,928 B2 * | 7/2011 | Tan et al. | ....................... 382/276 |
| 8,013,904 B2 * | 9/2011 | Tan et al. | .................... 348/222.1 |
| 2007/0171381 A1 | 7/2007 | Tan et al. | |
| 2007/0171382 A1 | 7/2007 | Tan et al. | |
| 2008/0174704 A1 | 7/2008 | Tan et al. | |

* cited by examiner

*Primary Examiner* — Jefferey Harold
*Assistant Examiner* — Jean W Desir

(57) ABSTRACT

A projection system uses a transformation matrix to transform a projection image p in such a manner so as to compensate for surface irregularities on a projection surface. The transformation matrix makes use of properties of light transport relating a projector to a camera. A display pipeline of user-supplied image modification processing modules are reduced by first representing the processing modules as multiple, individual matrix operations. All the matrix operations are then combined with, i.e., multiplied to, the transformation matrix to create a modified transformation matrix. The created transformation matrix is then used in place of the original transformation matrix to simultaneously achieve both image transformation and any pre and post image processing defined by the image modification processing modules.

21 Claims, 37 Drawing Sheets

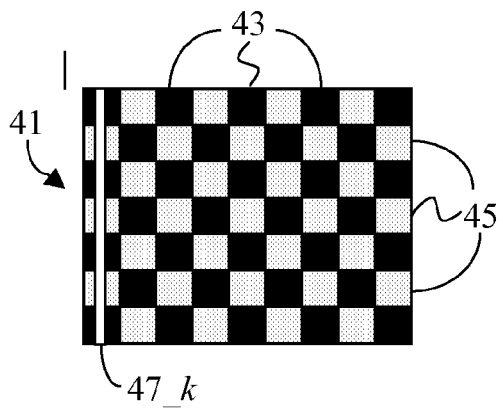
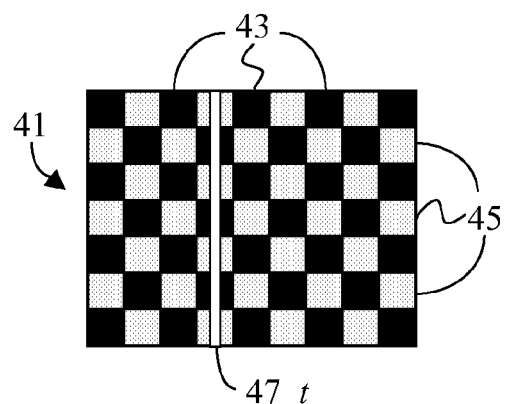
Fig. 5A
Fig. 5B
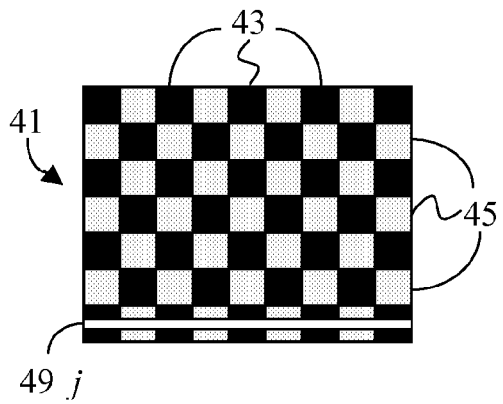
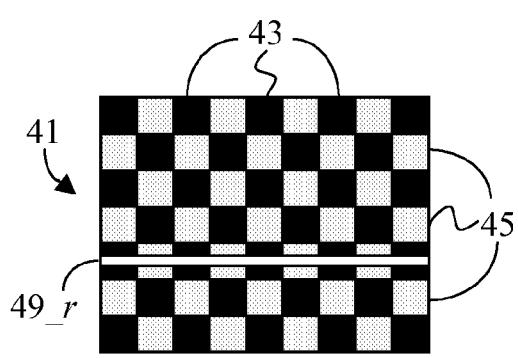
Fig. 6A
Fig. 6B
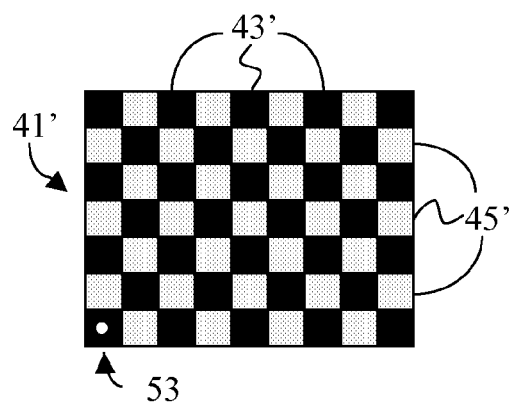
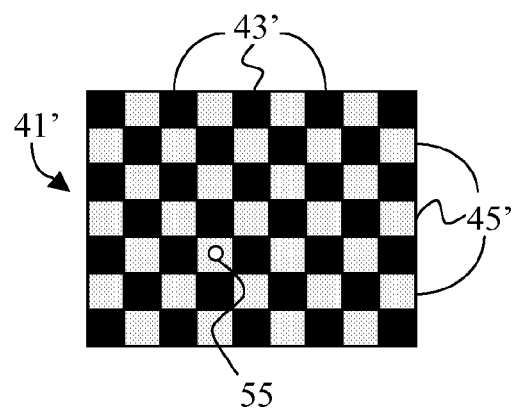
Fig. 7A
Fig. 7B

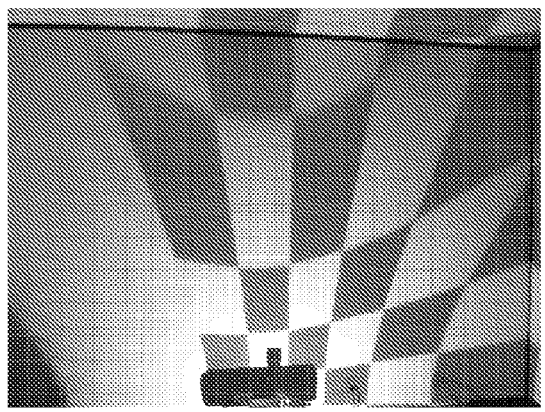 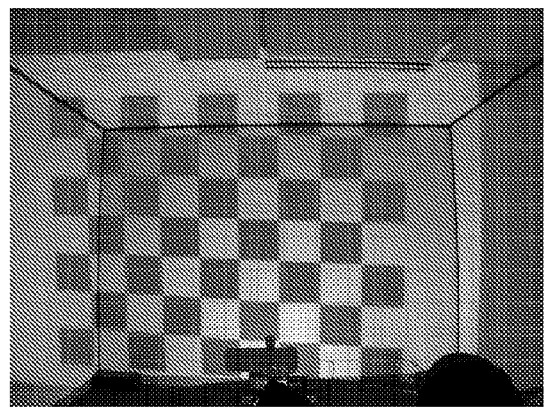
FIG. 29A          FIG. 29B
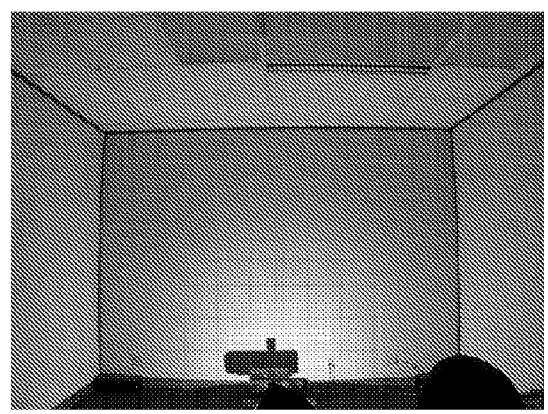 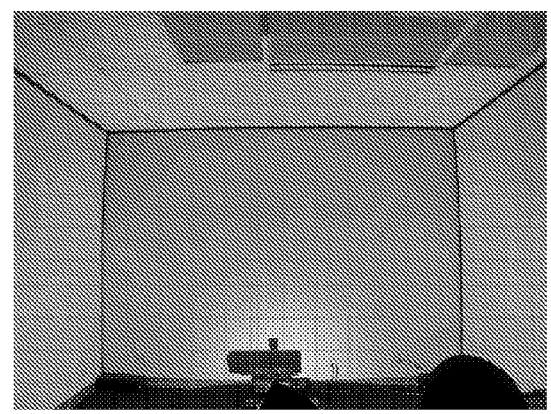
FIG. 30A          FIG. 30B for $i = 1 \ldots m \times n$
 do
  $MaxX[i] \leftarrow 0$
  $MaxY[i] \leftarrow 0$
  $Tval[i] \leftarrow 0$
for $X = 1 \ldots q$
 do
  project $P_X$
  pause
  capture $C_X$
  for $i = 1 \ldots m \times n$
   do
    if $C_X[i] > MaxX[i]$
     then
      $MaxX[i] \leftarrow C_X[i]$
      $IdX[i] \leftarrow X$
for $Y = 1 \ldots p$
 do
  project $P_Y$
  pause
  capture $C_Y$
  for $i = 1 \ldots m \times n$
   do
    if $C_Y[i] > MaxY[i]$
     then
      $MaxY[i] \leftarrow C_Y[i]$
      $IdY[i] \leftarrow Y$
for $i = 1 \ldots m \times n$
 do
  if $MaxX[i] > MaxY[i]$
   then
    $Tval[i] \leftarrow MaxY[i]$
   else
    $Tval[i] \leftarrow MaxX[i]$ $Tid[i] \leftarrow \text{IntersectionIndex}(IdX[i], IdY[i])$

Fig. 46

Fig. 47
$$\text{for } i = 1 \ldots m \times n$$
$$\text{do}$$
$$\quad MaxX[i] \leftarrow 0$$
$$\quad MaxY[i] \leftarrow 0$$
$$\quad Tval[i] \leftarrow 0$$
$MaxX[i] \leftarrow 0$
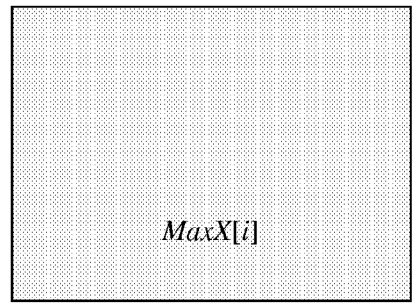
$MaxY[i] \leftarrow 0$
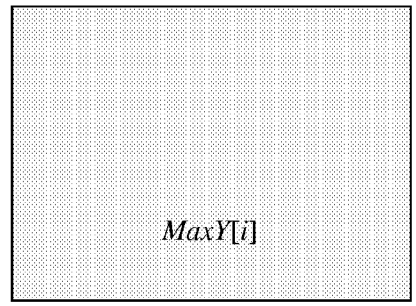
$Tval[i] \leftarrow 0$
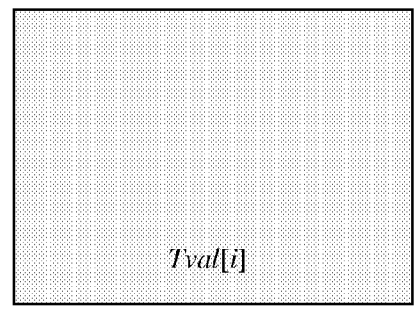

SMALL MEMORY FOOTPRINT LIGHT TRANSPORT MATRIX CAPTURE

BACKGROUND

1. Field of Invention

The present invention is related to methods of optimizing the generation of a light transport matrix T.

2. Description of the Related Art

When projectors and cameras are combined, hybrid devices and systems that are capable of both projecting and capturing light are born. This emerging class of imaging devices and systems are known in the research community as projector-camera systems. Typically, images captured by one or more cameras, are used to estimate attributes about display environments, such as the geometric shapes of projection surfaces. The projectors in these projector-camera systems then adapt their projected images so as to compensate for shape irregularities in the projection surfaces to improve the resultant imagery. In other words, by using a camera, a projector can "see" distortions in a projected image, and then adjust its projected image so as to reduce the observed distortions.

In order to achieve this, the camera and projector need to be calibrated to each other's imaging parameters so as to assure that any observed image distortion is due to irregularities in the projection environment (i.e. surface irregularities), and not due to distortions inherent to the projector or camera, or due to their relative orientation to each other.

Thus, a key problem that builders of projector-camera systems and devices need to solve is the determination of the internal imaging parameters of each device (i.e. intrinsic parameters) and the determination of the geometric relationship between all projectors and cameras in the system (i.e. extrinsic parameters). This problem is commonly referred to as that of calibrating the system.

Even after a system has been substantially calibrated, however, the issue of adjusting a projection to compensate for distortions in a projected image is not straightforward. Identifying and compensating for projection distortion can be a very computationally intensive operation, which has traditionally greatly limited its application to non-specialized fields.

In an effort to better understand the calibration of projector-camera systems, Applicants studied multi-camera imaging systems found in the field of computer vision. Although such multi-camera imaging systems consist of only image photographing devices, and do not include any image projecting devices, a large body of work concerning the calibration of such multi-camera imaging systems exists in the field of computer vision, and it was thought that one might glean some insight from their approach toward calibrating multiple devices, albeit multiple image photographing devices.

A commonly used method in computer vision techniques for calibrating a camera in an imaging system is described in article, "A flexible new technique for camera calibration", IEEE Transactions on Pattern Analysis and Machine Intelligence, 22(11):1330-1334, 2000, by Zhengyou Zhang, which is herein incorporated in its entirety by reference. In this method, multiple images of a flat object marked with a number of known feature points (typically forming a grid) are captured by the camera, with the flat object posed at a variety of known angles relative to the camera. The image location of each feature point is extracted, and since the relative location of each feature point is known, the collection of feature point locations can then be used to calibrate the camera. When two or more cameras are present in an imaging system, the intrinsic parameters as well as the geometric relationship between the present cameras can be estimated by having all cameras capture an image of the flat object at each pose angle.

Since projectors and cameras are very similar in terms of imaging geometry, it might seem reasonable to postulate that techniques suitable for calibrating cameras in multi-camera imaging systems might be suitable for calibrating projectors in projector-camera systems. However, since all camera calibration techniques require that the camera requiring calibration (i.e. the imaging device being calibrated) capture a number of images, it would appear that camera calibration techniques cannot readily be applied to projectors since projectors cannot capture images.

Therefore, in traditional projector-camera systems, at least two cameras have been needed, in addition to a projector. The two cameras are calibrated first, typically using multi-camera imaging system calibration techniques, to establish a stereo camera pair. More specifically, these systems use a "bootstrapping" procedure to calibrate the two cameras and form the stereo camera pair. As it is known in the art, a stereo camera pair can be used to estimate depth (i.e. achieve a pseudo perspective view) to establish a quasi-depth perception of feature points visible to the stereo camera pair. The calibrated stereo camera pair is then used to calibrate the projector. Basically, the establishment of this quasi-depth perception is used to identify surface depth irregularities of a projection surface and thereby of an image projected onto the projection surface. The projector can then be calibrated to compensate for the surface depth irregularities in the projected image. In essence, to calibrate the projector using this quasi-depth perception, the projector is first made to project feature points onto a display environment (i.e. the projection surface), which may have an irregular surface. The pre-calibrated, stereo camera pair is used to resolve the perspective depth location of the projected points. The projector can then be calibrated to compensate for surface/depth irregularities in the projection surface, as determined by the depth location of the projected points. While this bootstrapping technique is a tested-and-proven calibration method for projector-camera systems, it is not applicable to the calibration of self-contained projector-camera devices, since it requires the use of pre-calibrated; strategically located, external stereo camera pairs, and thus requires much operator intervention.

Of related interest is a technique called dual photography proposed by Sen et al. in article, "Dual Photography", Proceedings ACM SIGGRRAPH, 2005, which is herein incorporated by reference in its entirety. Dual photography makes use of Helmholtz reciprocity to use images captured with real cameras to synthesize pseudo images (i.e. dual images) that simulate images "as seen" (or effectively "captured") by projectors. That is, the pseudo image simulates a captured image as "viewed" by a projector, and thus represents what a projector-captured image would be if a projector could capture images. This approach might permit a projector to be treated as a pseudo camera, and thus might eliminate some of the difficulties associated with the calibration of projectors.

Helmholtz reciprocity is based on the idea that the flow of light can be effectively reversed without altering its light transport properties. Helmholtz reciprocity has been used in many computer graphics applications to reduce computational complexity. In computer graphics literature, this reciprocity is typically summarized by an equation describing the symmetry of the radiance transfer between incoming ($\omega_i$) and outgoing ($\omega_o$) directions as $fr(\omega_i \rightarrow \omega_o) = fr(\omega_o \rightarrow \omega_i)$, where fr represents the bidirectional reflectance distribution function (BRDF) of a surface.

Thus, dual photography ideally takes advantage of this dual nature (i.e. duality relationship) of a projected image and a captured image to simulate one from the other. As is described in more detail below, dual photography (and more precisely Helmholtz reciprocity) requires the capturing of the light transport property between a camera and a projector. More specifically, dual photography requires determination of the light transport property (i.e. light transport coefficient) relating an emitted light ray to a captured light ray.

When dealing with a digital camera and a digital projector, however, dual photography requires capturing a separate light transport coefficient relating each projector pixel (i.e. every emitted light ray) to each, and every, camera pixel (i.e. every light sensor that captures part of the emitted light ray), at the resolution of both devices. Since a digital projector and a digital camera can both have millions of pixels each, the acquisition, storage, and manipulation of multitudes of light transport coefficients can place real practical limitations on its use. Thus, although in theory dual photography would appear to offer great benefits, in practice, dual photography is severely limited by its physical and impractical requirements of needing extremely large amounts of computer memory (both archival, disk-type memory and active, solid-state memory), needing extensive computational processing power, and requiring much time and user intervention to setup equipment and emit and capture multitudes of light rays for every projection environment in which the projector-camera system is to be used.

A clearer understanding of dual photography may be obtained with reference to FIGS. 1A and 1B. In FIG. 1A, a "primal configuration" (i.e. a configuration of real, physical devices prior to any duality transformations) includes a real digital projector 11, a real projected image 13, and a real digital camera 15. Light is emitted from real projector 11 and captured by real camera 15. A coefficient relating each projected light ray (from each projector pixel e within real projector 11) to a correspondingly captured light ray (captured at each camera sensor pixel g within real camera 15) is called a light transport coefficient. Using the light transport coefficient, it is possible to determine the characteristics of the projected light ray from the captured light ray.

In the present example, real projector 11 is preferably a digital projector having a projector pixel array 17 symbolically shown as a dotted box and comprised of s rows and r columns of individual projector pixels e. Each projector pixel e may be the source of a separately emitted light ray. The size of projector pixel array 17 depends on the resolution of real projector 11. For example, a VGA resolution may consist of an array of 640 by 480 pixels (i.e. 307,200 projector pixels e), an SVGA resolution may have an array of 800 by 600 pixels (i.e. 480,000 projector pixels e), an XVG resolution may have an array of 1024 by 768 pixels (i.e. 786,732 projector pixels e), an SXVG resolution may have an array of 1280 by 1024 pixels (i.e. 1,310,720 projector pixels e), and so on, with greater resolution projectors requiring a greater number of individual projector pixels e.

Similarly, real camera 15 is a digital camera having a camera sensor pixel array 19 symbolically shown as a dotted box and comprised of u rows and u columns of individual camera pixels g. Each camera pixel g may receive, i.e. capture, part of an emitted light ray. The size of camera sensor pixel array 19 again depends on the resolution of real camera 15. However, it is common for real camera 15 to have a resolution of 4 MegaPixels (i.e. 4,194,304 camera pixels g), or greater.

Since each camera pixel g within camera sensor pixel array 19 may capture part of an individually emitted light ray from a distinct projector pixel e, and since each discrete projector pixel e may emit a separate light ray, a multitude of light transport coefficients are needed to relate each discrete projector pixel e to each, and every, camera pixel g. In other words, a light ray emitted from a single projector pixel e may cover the entirety of camera sensor pixel array 19, and each camera pixel g will therefore capture a different amount of the emitted light ray. Subsequently, each discrete camera pixel g will have a different light transport coefficient indicating how much of the individually emitted light ray it received. If camera sensor pixel array 19 has 4,194,304 individual camera pixels g (i.e. has a 4 MegaPixel resolution), then each individual projector pixel e will require a separate set of 4,194,304 individual light transport coefficients to relate it to camera sensor pixel array 19. Therefore, millions of separately determined sets of light transport coefficients (one set per projector pixel e) will be needed to relate the entirety of projector pixel array 17 to camera sensor pixel array 19 and establish a duality relationship between real projector 11 and real camera 15.

Since in the present example, each discrete projector pixel e requires a separate set of 4,194,304 individually determined light transport coefficients to relate it to real camera 15, and since real projector 11 may have millions of discrete projector pixels e, it is beneficial to view each set of light transport coefficients as a separate array of light transport coefficients and to collect these separate arrays into a single light transport matrix (T). Each array of light transport coefficients constitutes a separate column within light transport matrix T. Thus, each column in T constitutes a set of light transport coefficients corresponding to a separate projector pixel e.

Since in the present example, real projector 11 is a digital projector having an array of individual light projector pixels e and real camera 15 is a digital camera having an array of individual camera pixels g, a light transport matrix T will be used to define the duality relationship between real projector 11 and real camera 15. In the following discussion, matrix element $T_{ge}$ identifies an individual light transport coefficient (within light transport matrix T) relating an individual, real projector pixel e to an individual, real camera pixel g.

A real image, as captured by real camera 15, is comprised of all the light rays individually captured by each camera pixel g within camera sensor pixel array 19. It is therefore helpful to organize a real captured image, as determined by camera sensor pixel array 19, into a real-image capture matrix, C. Similarly, it is beneficial to organize a real projected image, as constructed by activation of the individual projector pixels e within projector pixel array 17, into a real-image projection matrix, P. Using this notation, a real captured image (as defined by real-image capture matrix C) may be related to a real projected image (as defined by real-image projection matrix P) by the light transport matrix T according to the relationship, C=TP.

The duality transformation, i.e. dual configuration, of the system of FIG. 1A is shown in FIG. 1B. In this dual configuration, real projector 11 of FIG. 1A is transformed into a virtual camera 11", and real camera 15 of FIG. 1A is transformed into a virtual projector 15". It is to be understood that virtual camera 11" and virtual projector 15" represent the dual counterparts of real projector 11 and real camera 15, respectively, and are not real devices themselves. That is, virtual camera 11" is a mathematical representation of how a hypothetical camera (i.e. virtual camera 11") would behave to capture a hypothetically projected dual image 13", which is similar to real image 13 projected by real projector 11 of FIG. 1A. Similarly, virtual projector 15" is a mathematical representation of how a hypothetical projector (i.e. virtual projector 15") would behave to project hypothetical dual image 13" that substantially matches real image 13, as captured by real camera 15 (of FIG. 1A). Thus, the positions of the real projector 11 and real camera 15 of FIG. 1A are interchanged in FIG. 1B as virtual camera 11" and virtual projector 15".

It should be noted that the pixel resolution of the real devices carries forward to their counterpart virtual devices (i.e. dual devices). Therefore, virtual camera 11" has a virtual camera sensor pixel array 17" consisting of s rows and r columns to match the resolution of projector pixel array 17 of real projector 11. Similarly, virtual projector 15" has a virtual projector pixel array 19" consisting of u rows and u columns to match the resolution of camera sensor pixel array 19 of real camera 15.

If one assumes that dual light transport matrix T" is the light transport matrix in this dual configuration such that a dual-image capture matrix C" (which defines dual image 13" as captured by virtual camera 11") relates to a dual-image projection matrix P" (which defines dual image 13" as projected by virtual projector 15") as C"=T"P", then T"$_{eg}$ would be an individual dual light transport coefficient relating an individual virtual projector pixel g" to an individual virtual camera pixel e".

Helmholtz reciprocity specifies that the pixel-to-pixel transport coefficient is equal in both directions (i.e. from real projector 11 to real camera 15, and from virtual projector 15" to virtual camera 11"). That is, T"$_{eg}$=T$_{ge}$, which means T"=T$^T$, (i.e. dual light transport matrix T" is equivalent to the result of the mathematical, matrix transpose operation on real light transport matrix T). Therefore, given light transport matrix T, one can use T$^T$ to synthesize the dual, or virtual, images that would be acquired in the dual configuration.

Thus, the light transport matrix T permits one to create images that appear to be captured by a projector, with a camera acting as a second projector. However, as is explained above, the high complexity involved in generating and manipulating light transport matrix T has heretofore greatly limited its application, particularly in the field of calibrating projector-camera systems.

Other problems associated with projector-camera systems are how to compensate for light diffusing objects that may obstruct a projector's line of sight. Of related interest are issues of whether projector-camera systems can be used to achieve more complex images than typical. For example, can such systems combine multiple images from multiple projectors to create a single composite image? Alternatively, can one generate "3-D" images, or other visual effects that previously required more complex equipment and more complex projection setups? Also, can one make better use of the camera in a projector-camera system so that the camera can be an active part of an image creation process. Furthermore, what are the implications of using a low resolution, inexpensive camera in such projector-camera systems?

Previous works [Raskar et al. 1998; Underkoffler and Ishii 1998] put forth the concept of intelligent illumination and showed how projectors could be used to enhance workplace interaction and serve as novel tools for problem solving. The projector-camera community has since solved many of the technical challenges in intelligent projectors. In particular, significant advances have been made in automatic mosaicing of multiple projectors [Chen et al. 2002; Yang et al. 2001; Raij et al. 2003; Sukthankar et al. 2001; Raskar et al. 2003].

[Raskar et al. 2001] demonstrated projection onto complex objects. Using previously created 3D models of the objects, multiple projectors could add virtual texture and animation to real physical objects with non-trivial complicated shapes.

[Fujii et al. 2005] proposed a method that modified the appearance of objects in real time using a co-axial projector-camera system. [Grossberg et al. 2004] incorporated a piecewise polynomial 3D model to allow a non-co-axial projector-camera system to perform view projection.

Projector camera systems have also been used to extract depth maps [Zhang and Nayar 2006], and space-time-multiplexed illumination has been proposed as a means for recovering depth edges [Raskar et al. 2004].

As will be explained more fully below, the present invention addresses the problem of how to determine what a projector needs to project in order to create a desired image by using the inverse of the light transport matrix, and its application will further simplify the calibration of projector-camera systems.

An object of the present invention is also to reduce computing hardware requirements for generating the light transport matrix.

SUMMARY OF THE INVENTION

The above objects are met in a system that simplifies the generation of transport matrix T, simplifies the implementation of light transport coefficients in dual photography, modifies while still further simplifying the light transport matrix T to incorporate compensation for light scattering effects or light noise.

Application of dual photography is simplified by reducing the number of captured images needed to generate a light transport matrix T of (p×q) projector pixel array from (p×q) images to (p+q) images. Manipulation of the light transport matrix T is simplified by replacing the use of a fully populated light transport matrix T with an index associating each projector pixel to only non-zero light transport coefficient values. By eliminating the use of zero-valued light transport coefficients, the memory and processing requirements for implementing dual photography are greatly reduced. This dual photography technique is applied to the calibration of projector-camera systems.

In a first embodiment of the present invention, a method and system for generating light transport coefficients relating a digital projector to a digital camera is shown. In the case where the digital projector has an array of projection pixels and the digital camera has an array of sensor pixels, the method or system includes a processing unit to execute the following steps: (a) defining a first test image, which can be a matrix having respective data location for corresponding pixel information or any data file form storing image pixel information; (b) defining a second test image (which can be a matrix having respective data location for corresponding pixel information or any data file form storing image pixel information), each pixel within the first test image having a one-to-one corresponding with a pixel within the second test image; (c) defining a first set of first test patterns (which can be predefined or generated as needed in accordance with an algorithm to assure the first test patterns follow a predefined pattern), each first test pattern within the first set defining a first group of selected projection pixels to be simultaneously activated and defining a first group of not-selected projector pixels to be simultaneously not-activated; (d) defining a second set of second test patterns (which can be predefined, or generated as needed in accordance with an algorithm to assure the second test patterns follow a predefined pattern), each second test pattern within the second set defining a second group of selected projection pixels to be simultaneously activated and defining a second group of not-selected projector pixels to be simultaneously not-activated; (e) using the digital projector to project, each in turn, the first test patterns; (f) using the digital camera to capture, each in turn, each projected first test pattern; (g) checking each captured first test pattern by comparing the captured light intensity value of each pixel of said captured first test pattern with a corresponding pixel in said first test image, and if the captured light intensity value being compared is greater than that of the corresponding pixel in said first test image, then over-writing the corresponding pixel with the captured light intensity value, otherwise leaving the corresponding pixel unchanged; and (k) comparing, pixel-by-pixel, the intensity value of each pixel within the first test image with the intensity value in its corresponding pixel within the second test image, storing the lower intensity value.

In the above method, or system, the first test image preferably has a pixel resolution matching the digital camera. The second test image may also have a pixel resolution matching the digital camera. Furthermore, each of the first test patterns may define the first group of selected projection pixels as a straight line pattern of projection pixels spanning from a an edge of the array of projection pixels to an opposite edge of said projection pixels.

Also in the current method or system, each of the second test patterns preferably defines the second group of selected projection pixels as a straight line pattern of projection pixels spanning from a an edge of the array of projection pixels to an opposite edge of said projection pixels, wherein the straight line pattern of the second group of selected projection pixels is aligned along a direction different from the straight line pattern of the first group of selected projection pixel.

It is further preferred that each of the first test patterns is limited to having not more than one projection pixel in common with each of the second test patterns. Also, it is to be understood that all projector pixels not within the first group of selected projection pixels are part of the first group of not-selected projection pixels. Also preferably, selected projection pixels are lit to their maximum light intensity, and not-selected pixels are maintained dark.

Similarly, it is preferred that all of the first test patterns within the first set are distinct from each other, and that all of the second test patterns within the second set are distinct from each other.

In a preferred embodiment, the first test image is a blank image. If so, then the second test image is preferably also a blank image.

Also in a preferred embodiment, in step (g), if the compared value of the captured light intensity value of the first test pattern is greater than that of the corresponding pixel in the first test image, then correlation information correlating the overwritten corresponding pixel in first test image to the first test pattern being checked is stored.

It is further preferred that between steps (g) and (k), method or system further include: (h) using the digital projector to project, each in turn, second test patterns; (i) using the digital camera to capture, each in turn, each projected second test pattern; and (j) checking each captured second test pattern, comparing the captured light intensity value of each pixel of captured second test pattern with a corresponding pixel in the second test image, and if the captured light intensity value of the second test pattern is greater than that of the corresponding pixel in the second test image, then overwriting the corresponding pixel within the second test image with the captured light intensity value, otherwise leaving the corresponding pixel unchanged.

Additionally, if the compared value of the captured light intensity value of the first test pattern is greater than that of the corresponding pixel in the first test image, then further storing correlation information correlating the overwritten corresponding pixel in the first test image to the first test pattern being checked; and in step (j), if the compared value of the captured light intensity value of the second test pattern is greater than that of the corresponding pixel in the second test image, then further storing correlation information correlating the overwritten corresponding pixel in the second test image to the second test pattern being checked.

In a preferred embodiment, in step (f), each captured image has a resolution matching the first blank image. Also, all projection pixels within the digital projector are preferably activated at least once by the end of step (e). Also preferably, no projector pixel within the digital projector is actuated more than once during the execution of step of (e). Additionally, in step (e), each of the first test patterns is projected consecutively with no second test pattern projected between projections of first test patterns.

The present invention further envisions defining a composite_light_transport image as a blank image having a pixel resolution matching the pixel resolution of the first test image; and in step (k), the lower intensity value is stored in the pixel within composite_light_transport image that corresponds to pixel within the first test image being compared.

Additionally step (k), above, may include identifying the first test pattern correlated to the pixel within the first test image being compared; identifying the second test pattern correlated to the pixel within the second test image being compared; determining an intersection index identifying the projection pixel corresponding to the illumination of an intersection of the identified first test pattern and the identified second test pattern; and correlating with the stored lower intensity value the determined intersection index.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 4A is an illustrative example of a projected footprint on a light sensor array within a digital camera resulting from activation of a single projector pixel in a projector.

FIG. 4B is an illustrative example of a column of light transfer coefficients within a matrix T reflecting the example of FIG. 3A.

FIGS. 5A and 5B show two examples of two columns of projector pixels simultaneously projected onto a scene having a checkerboard pattern.

FIGS. 6A and 6B show two examples of two rows of projector pixels simultaneously projected onto a scene having a checkerboard pattern.

FIG. 7A shows a generated light ray footprint resulting from a single projector pixel, as created by combining the images of FIGS. 5A and 6A.

FIG. 7B shows a generated light ray footprint resultant from a single projector pixel, as created by combining the images of FIGS. 5B and 6B.

FIG. 29A shows the room of FIG. 28A with an uncalibrated projected image.

FIG. 29B shows the room of FIG. 28A with a calibrated projected image.

FIG. 30A shows the room of FIG. 28A with an uncalibrated blank projection.

FIG. 30B shows the room of FIG. 28A with a calibrated blank projection.

FIG. 46 shows an algorithm consisting of fourth parts for capturing light transport matrix T directly into an efficient representation.

FIG. 47 is a pictorial representation of the first part of the algorithm of FIG. 46.

DESCRIPTION OF THE PREFERRED EMBODIMENTS

In order to apply camera calibration techniques to projectors, one would require projectors to be able to capture images. That is, if projectors could capture images, then projector-camera systems could be treated like multi-camera systems, and standard camera calibration techniques (described above) might be used to calibrate projector-camera systems. In other words, if a projector could be treated as a pseudo-camera, then it could be calibrated along with a real camera in a manner similar to the camera calibration stage of the multi-camera system described above, and the "bootstrapping" projector calibration stage previously used for calibrating projector-camera systems might be eliminated.

Figure 2A:
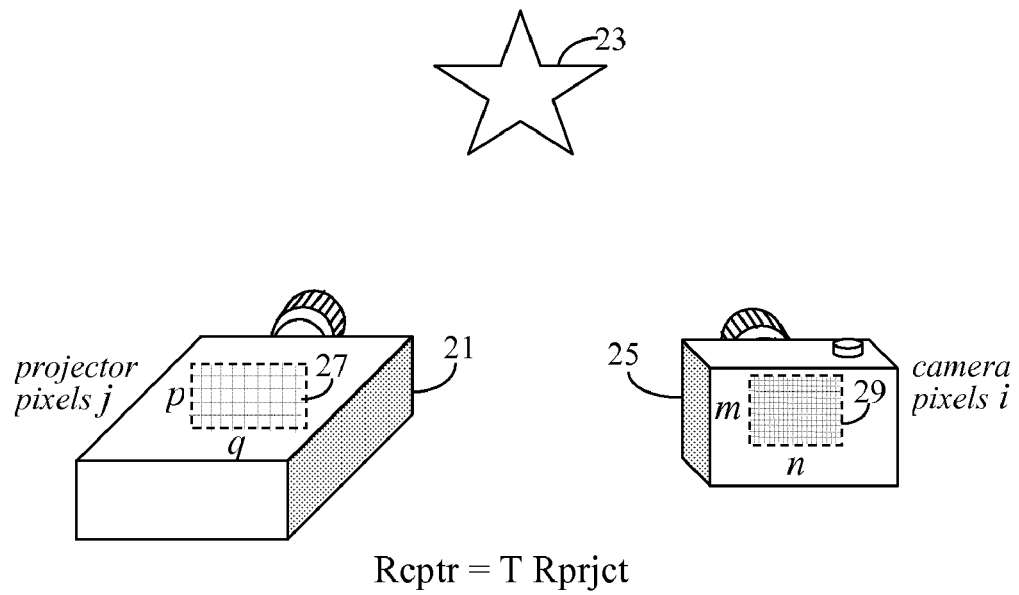
FIGS. 2A and 2B show a setup for dual photography in accord with the present invention.

With reference to FIG. 2A, an imaging setup in accord with the present invention may include a real projector 21 and a real camera 25. Real projector 21 is preferably a digital projector and has an imaging element including an imaging projection array (i.e. projector pixel array 27), consisting of p rows and q columns of individual imaging projection elements (i.e. projector pixels j) Projector pixel array 27 is internal to real projector 21, and is shown for discussion purposes as crossed lines within a dotted square in FIG. 2A. Real projector 21 is preferably of the liquid crystal display (LCD) type, digital light processing (DLP) type, liquid crystal on silicon (LCOS) type, or other digital projection technology type.

Preferably, real camera 25 is a digital camera having an image sensor including a camera sensor pixel array 29 (i.e. light receptor array or image sensor array), consisting of m rows by n columns of individual camera pixels i (i.e. image sensor elements or light receptor pixels). For simplicity, camera sensor pixel array 29 is shown on real camera 25, but it is to be understood that camera sensor pixel array 29 is internal to real camera 25.

This physical setup using real projector 21 and real camera 25 is preferably called the 'primal' setup. Light rays emitted from individual projector pixels j within real projector 21 form real image 23 by bouncing off a projection surface (i.e. display environment or scene), which may have an irregular or flat shape, and some of the light rays eventually reach the image sensor within real camera 25. In general, each light ray is dispersed, reflected, and refracted in the scene and hits the camera's image sensor at a number of different locations throughout camera sensor pixel array 29. Thus, when a single light ray emitted from an individual imaging projector pixel j from real projector 21 reaches real camera 25, the individually projected light ray forms an m-by-n image on camera sensor pixel array 29, with each individual camera pixel i receiving a certain amount of light intensity contribution from the projected light ray.

Consequently, although it might appear that ideally a single light transport coefficient relating one projector pixel j to one camera pixel i might be determinable by individually turning ON a single projector pixel j to emit a single light ray to hit a single camera pixel i, this is not the case. In reality, the entire camera sensor pixel array 29 will receive a different contribution of light intensity from the singly emitted light ray. Therefore, each light ray emitted from each individual projector pixel j generates a different set, or array, of individual light transport coefficients, one for each camera pixel i within camera sensor pixel array 29. Consequently, each set (i.e. array) will consist of (m×n) [i.e. m-multiplied-by-n] individual light transport coefficients, one for each camera pixel i.

If each set of light transport coefficients is arranged as a column of coefficients to form a composite light transport matrix, T, then the composite light transport matrix T will have a different column of light transport coefficients for each individual projector pixel j. Furthermore, since there is a one-to-one correspondence between each light transport coefficient entry (i.e. matrix element) within each column and each camera pixel i, each column represents the entire image captured at camera 25 resulting from a single projector pixel j being turned ON. Accordingly, the entire (i.e. composite) light transport matrix T will consist of (p×q) [i.e. p multiplied-by q] columns (one column [i.e. captured image] for each individually turned ON projector pixel j) and (m×n) rows (one row for each individual camera pixel i).

In the following discussion, it is beneficial to view a real projected image as a first vector, Rprjct, (i.e. real projection vector) having (p×q) elements (one for each projector pixel j), and a resultant real captured image as a second vector, Rcptr, (i.e. real captured image vector) having (m×n) elements (one for each camera pixel i).

Using the notation that a real projected image (i.e. an image projected using the entire projector pixel array 27) is represented as a (p×q) real projection vector "Rprjct" (i.e. a "p-by-q vector"), and the notation that a correspondingly real captured image (i.e. an image captured by the entire camera sensor pixel array 29) is represented as an (m×n) real captured image vector "Rcptr" (i.e. an "m-by-n vector"), then the light transport relationship between real projector 21 and real camera 25 can be written as Rcptr=T Rprjct where T is a composite light transport matrix that relates real projector 21 to real camera 25. It is to be understood that light transport matrix T would have been previously generated by, for example, individually and separately turning ON each projector pixel j and determining the corresponding light transport coefficient for each individual camera pixel i.

To recapitulate, since each projector pixel j results in a light ray that is scattered across the entire camera sensor pixel array 29, each individual camera pixel i will have a differently valued light transport coefficient indicative of an intensity value of a predefined light characteristic it received from each individual projector pixel j. In the present embodiments, this light characteristic is preferably a measure of light intensity. Therefore, each projector pixel j will result in a column of (m×n) individual light transport coefficients, each coefficient indicating an amount of light intensity received by each camera pixel i. Since real projector 21 has (p×q) projector pixels j, light transport matrix T will have (p×q) columns [one for each projector pixel j] and (m×n) rows [one for each camera pixel i] of individual light transport coefficients. Thus, light transport matrix T has traditionally been necessarily huge, consisting of (p×q×m×n) individual light transport coefficients.

Figure 2B:
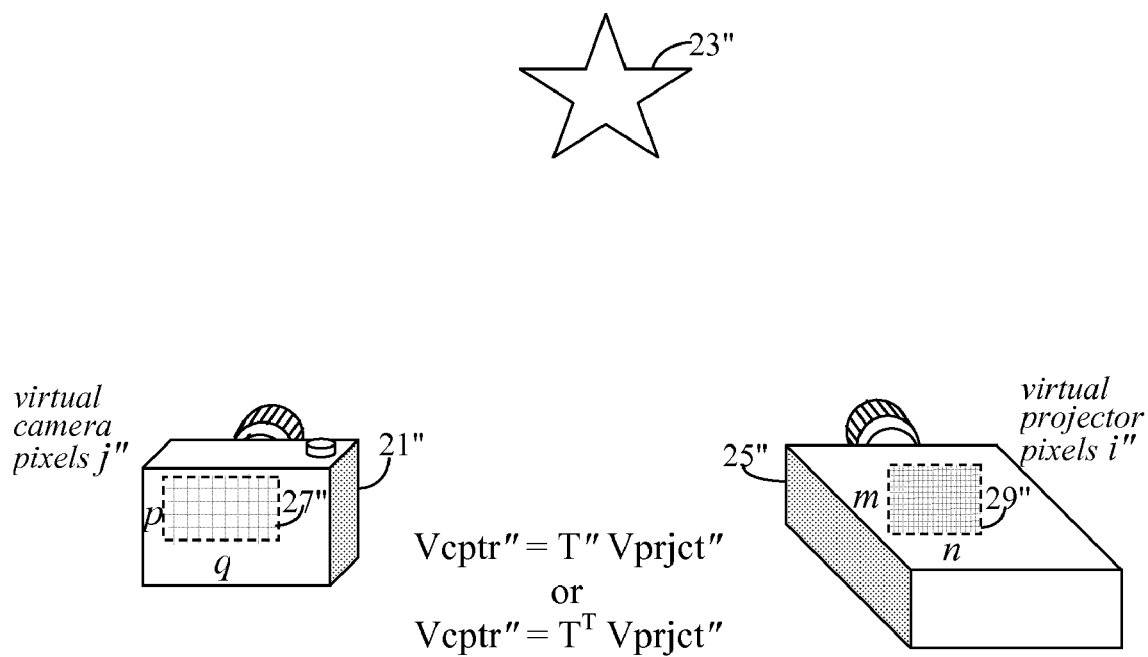

With reference to FIG. 2B, a "dual" setup is one where real projector 21 is replaced by a virtual camera 21" having a virtual camera sensor pixel array 27" of equal size as real projector pixel array 27. Thus, virtual camera 21" has a virtual camera sensor pixel array 27" comprised of p-rows by q-columns of virtual camera pixels j". Similarly, in this "dual" setup, real camera 25 is replaced by a virtual projector 25" having a virtual projector pixel array 29" of equal size as real camera sensor pixel array 29. Therefore, virtual projector 25" has a virtual projector pixel array 29" comprised of m-rows by n-columns of virtual projector pixels i".

In this case, a virtual image 23" (as projected by virtual projector 25") would be represented by an (m×n) virtual projection vector, Vprjct". Similarly, a virtually captured image captured by virtual camera 21" would be represented by a (p×q) virtual captured image vector, Vcptr". Therefore in this dual setup, virtual captured image vector Vcptr" relates to virtual projection vector Vprjct" by a "dual" light transport matrix T". By the principle of Helmholtz reciprocity, the light transport is equal in both directions. Therefore, the dual light transport matrix T" for the dual setup (i.e. the duality transformation setup) relates virtual captured image vector Vcptr" to virtual projection vector Vprjct" by following relation:

Vcptr"=T"Vprjct"

This relationship, however, brings up the problem of how can one determine the multitudes of "virtual" light transport coefficients that make up dual light transport matrix T", and that relate a virtually projected image to a virtually captured image? Remarkably, it has been found that a duality transformation from a real light transport matrix, T, to its dual light transport matrix, T", can be achieved by submitting the real light transport matrix T to a transpose matrix operation. Thus, T" is the transpose of T, such that T"=$T^T$ and Vcptr"=$T^T$ Vprjct".

As it is known in the art of matrix computation, the transpose matrix operation of a general [x×y] matrix A is denoted by the addition of a superscript letter "T" (such as $A^T$, for example) and is defined by an [y×x] matrix whose first column is the first row of matrix A, and whose second column is the second row of matrix A, whose third column is the third row of matrix A, and so on. As is readily evident, this matrix operation simply flips the original matrix A about its first element, such that its first element (i.e. at position (1,1)) remains unchanged and the bottom of the first column becomes the end of the first row. Consequently, if one can capture, or otherwise determine, the real light transport matrix T for a primal setup, then the dual light transport matrix T" for the dual setup is readily computable by flipping the real light transport matrix T to obtain its transpose, $T^T$, as described. In further discussions below, dual light transport matrix T" and transposed light transport matrix $T^T$ may be used interchangeably.

It is noted, however, that if one can provide a simplified method of determining T, one can directly determine $T^T$ from T for the duality transformation. Before proposing a method for simplifying the determination of T, it is beneficial to first discuss some of the difficulties of traditional methods of determining T.

As is explained above, real light transport matrix T holds the individual light transport coefficients corresponding between each individual projector pixel j of real projector 21 and all the individual camera pixels i of real camera 25. Therefore, a determination of each individual light transport coefficient corresponding between an individual projector pixel j and all camera pixels i should avoid light ray contributions from other projector pixels j in projector pixel array 27.

To accomplish this, one may first consider an initial, real projection image_j created by setting a $j^{th}$ projector pixel to a value of 1 (i.e. is turned ON) and setting to a zero value (i.e. turning OFF) all other elements in projector pixel array 27. In this case, the $j^{th}$ projector pixel is the projector pixel under-test for which the light transport coefficients is to be determined. These test conditions are annotated as a real projection vector Rprjct_j that has a value of one at an entry location associated with the $j^{th}$ projector pixel, and has all other entry locations corresponding to all other projector pixels set to a value of zero. One may then capture real projection image_j to determine its corresponding (m×n) real captured image vector Rcptr_j, which defines the $j^{th}$ column of matrix T.

This method of acquiring a column of light transport coefficients for matrix T for a given $j^{th}$ projector pixel, suggests that a systematic method for capturing the entire matrix T is to sequentially turn ON each projector pixel j of real projector 21 (one projector pixel at a time), and to capture its corresponding real image, Rcptr_j, with real camera 25. When all p×q projector pixels j have been sequentially turned ON, and their corresponding real images Rcptr_j have been captured, all the captured image vectors Rcptr_1 to Rcptr_(p×q) are grouped to form matrix T. Each captured image vector Rcptr_j constitutes a column of light transport coefficient entries in matrix T. This results in a matrix T having (p×q) columns and (m×n) rows of individual light transport coefficients.

This straight forward, and systematic process for determining matrix T, however, is obviously a time-consuming process requiring (p×q) image projection-and-capture steps. Furthermore, the resultant light transport matrix T is very large, consisting of (p×q×m×n) elements. Because of the size of matrix T, computing a dual image is an extremely computation intensive operation requiring matrix multiplication between dual light transport matrix, $T^T$, (which has the same number of elements as matrix T), and a virtual projection vector Vprjct" (which is a long vector having (m×n) elements).

Figure 1A:
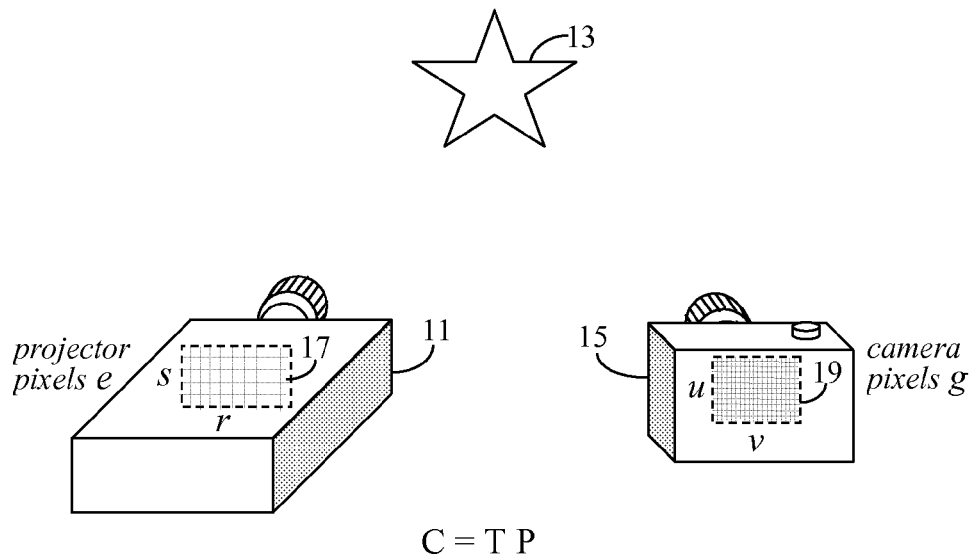
FIGS. 1A and 1B show a prior art setup for implementation of dual photography.
Figure 1B:
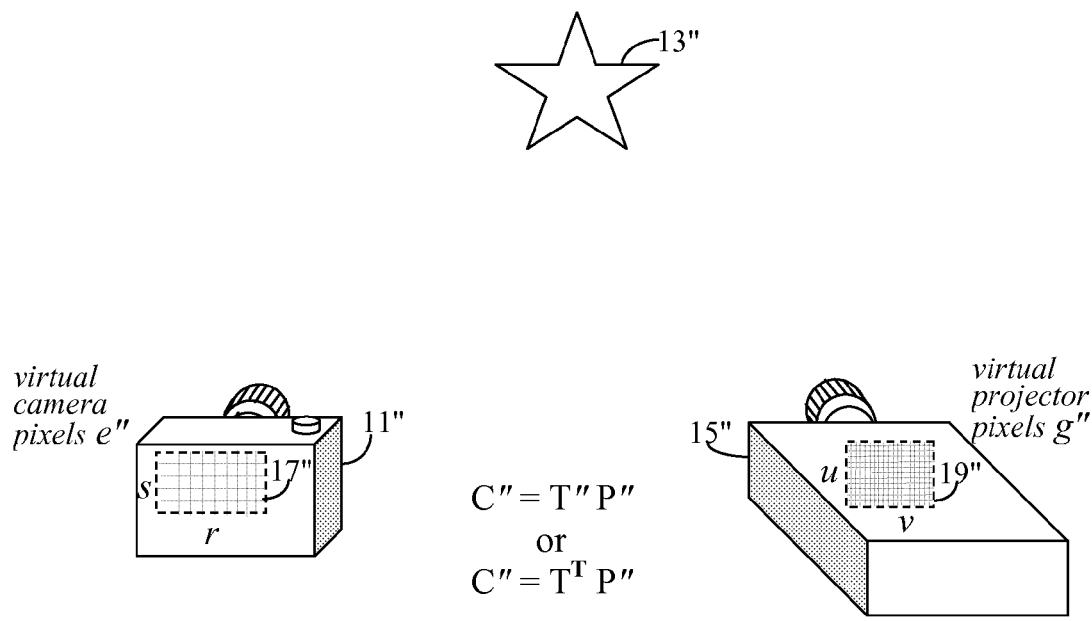

In the past, a scheme for determining matrix T by adaptively turning on multiple pixels of a real projector at a time (such as projector 11 of FIG. 1A), has been suggested to speed up the process of determining matrix T. However, this scheme is complex, and requires that an image to be projected be divided into multiple zones, and that one projector pixel from each zone be selected. All selected projector pixels from the multiple zones are turned on simultaneously while assuring that the simultaneously lit projector pixels are selected distant enough from each other to eliminate light interference between each other. Consequently, this scheme is scene-dependent (i.e. dependent upon the display environment) since it is necessary to assure that light interference between individually selected projector pixels is minimized. Since creation of the multiple zones is dependent on the display environment, this scheme requires physical inspection of a projection area and manual setup, and therefore does not easily lend itself to general use or to automation.

A feature of the present invention proposes a method of reducing the number of procedural steps in the determination of real light transport matrix T. That is, instead of requiring (p×q) image projection-and-capture steps (and the storing of p×q captured images), the presently proposed method captures at most "p plus q" [i.e. (p+q)] images, and under specific circumstances, described below, the number can be further reduced dramatically.

The present method is based on the following assumption: for most projector-camera display applications, any two distinct light rays b and c emitted from real projector 21 will typically hit camera sensor pixel array 29 at distinct parts. That is, any light ray emitted from a projector pixels j will not be dispersed across the entirety of camera sensor pixel array 29, but will be primarily concentrated within a small group of camera pixels i forming a light footprint within a distinct region of camera sensor pixel array 29. Furthermore, there will be no, or negligible, overlap in adjacent light footprints (i.e. negligible overlap in the camera pixels i hit by distinct projected light rays from distinct projector pixels j). This ideal light ray distribution condition may be assumed when the resolution of the real camera 25 is much higher (i.e. at least two times higher) than the resolution real projector 21.

This assumption regarding the non-overlap of distinct light rays, off course, is not true in general. For example, the ideal light ray distribution condition may not be achievable when the resolution of real camera is 25 is comparable to, or smaller than, the resolution of real projector 21, or when a light diffusing material is located between the light path of a projected light ray from real projector 21 to camera sensor pixel array 29. For example, if the projection scene (i.e. display environment or projection surface/area) includes light diffusing material, such as a glass of milk, the projected light rays will be diffused and the likelihood of significant light overlap between the different light rays at camera sensor pixel array 29 is greatly increased. However, a display setup designed to ensure high resolution projections is likely to be devoid of such light diffusing material, and it is virtually guaranteed that each projected light footprint will be substantially distinct from the next. That is, in venues, or settings, where high resolution projections are desired, it is likely that the venue will be clear of light diffusing articles along the light path of a projected image.

In the present first embodiment, it is assumed that the pixel resolution of real camera 25 is at least four times greater than that of real projector 21 and that the projection scene is devoid of any light diffusing material, such that the requirements for the ideal light ray distribution condition are met. Nonetheless, alternative embodiments for more general situations where the resolution of real camera 25 is not restricted to be greater than real projector 21, or where the light path between real projector 21 and real camera 25 is not limited to be devoid of light diffusing material are provided below.

Figure 3A:
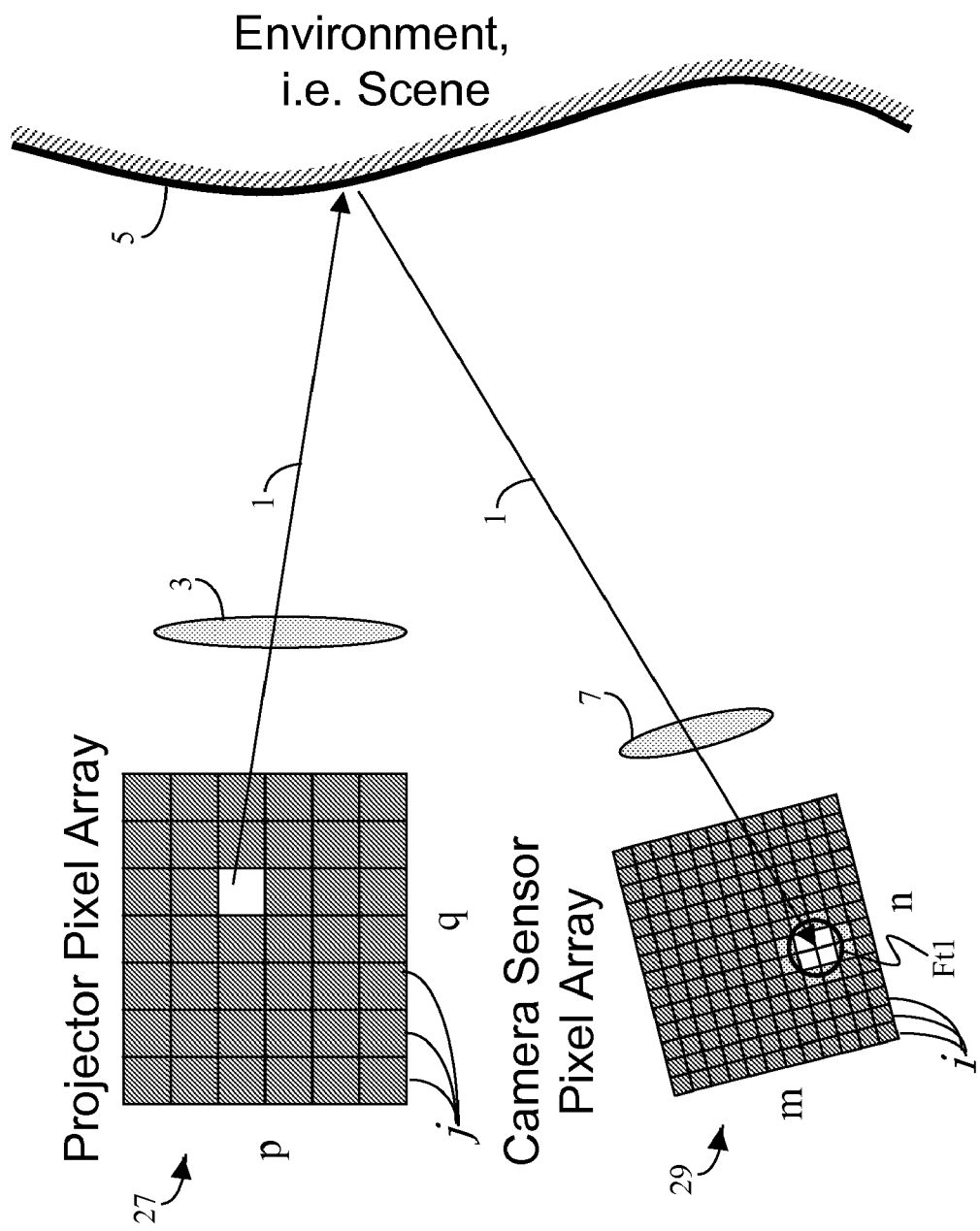
FIG. 3A is an example of a light ray projected from a single projector pixel, bouncing off a scene, and forming a small light footprint on a camera sensor pixel array.
Figure 3B:
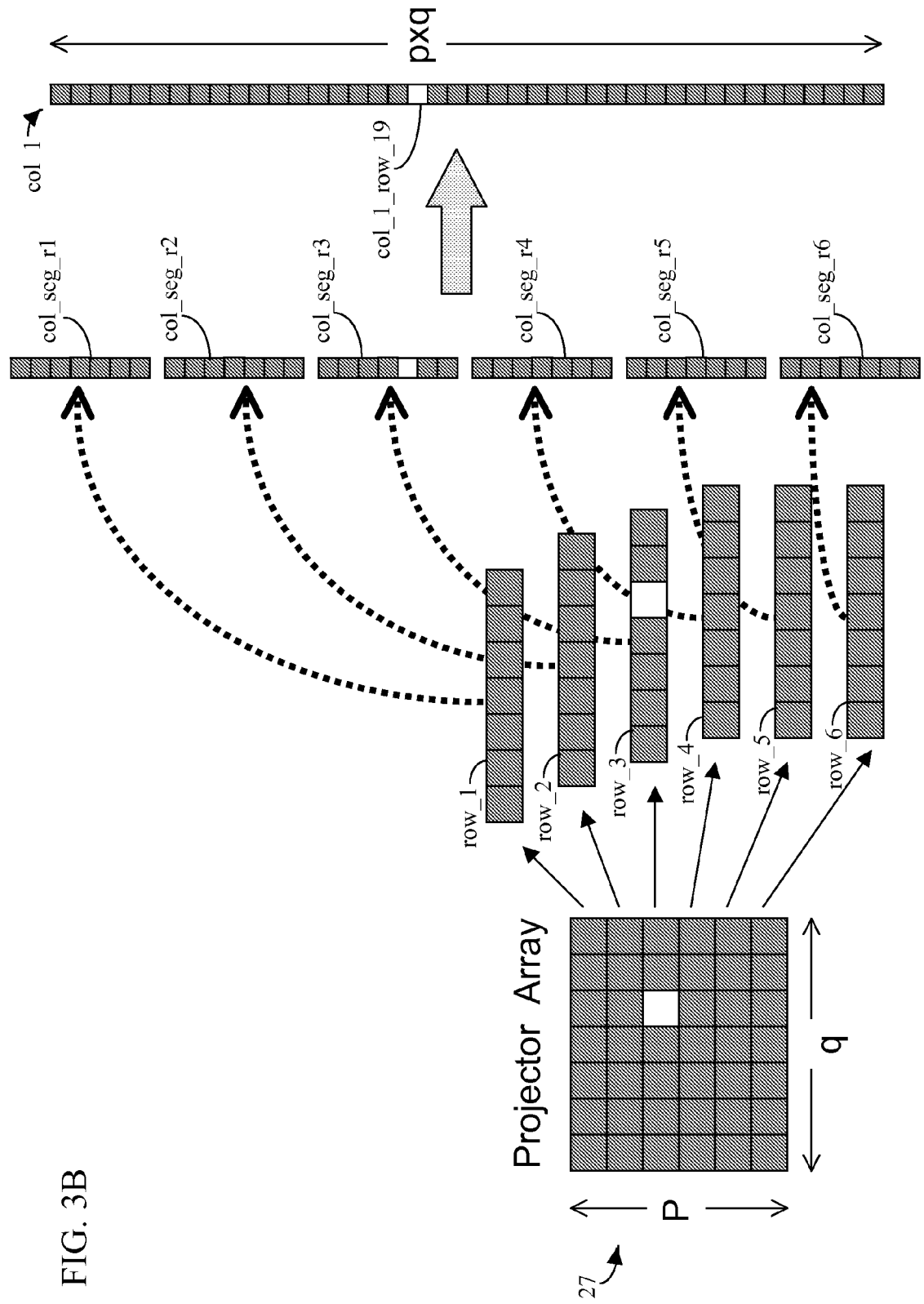
FIG. 3B is an example of how a projected image may be represented as an array of information.
Figure 3C:
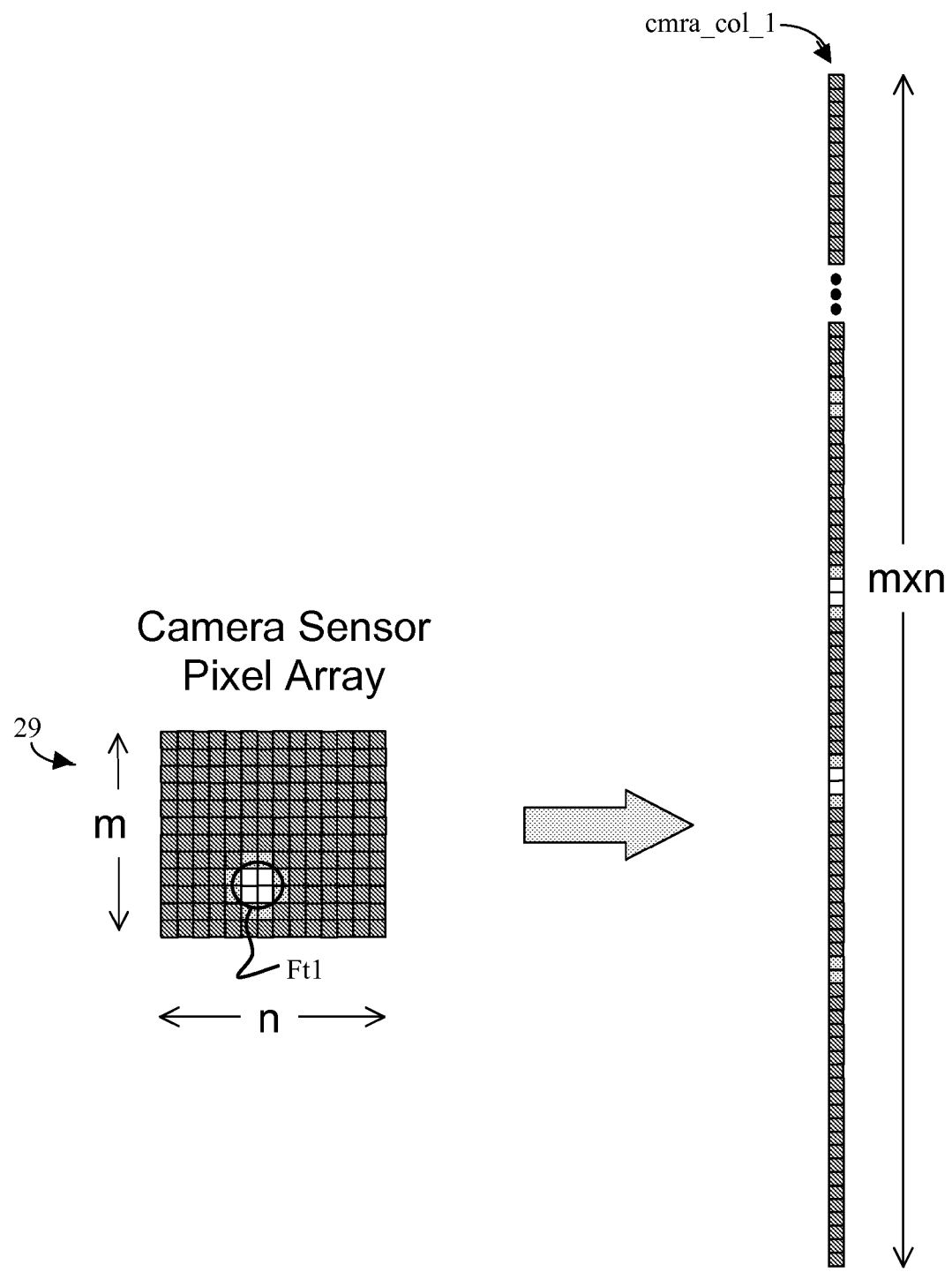
FIG. 3C is an example of how a captured light footprint on a camera sensor pixel array may be represented as an array of information.

A first pictorial representation of the present assumptions and vector generation method is shown in FIGS. 3A to 3C. With reference to FIG. 3A, an illustrative example of the present invention shows real projector pixel array 27 having a pixel resolution smaller than that of real camera sensor pixel array 29. For ease of discussion, projector pixel array 27 is illustratively shown to consist of only 6 rows and 7 columns (i.e. p=6 and q=7) for a total resolution of 42 projector pixels j (i.e. (6×7) elements). Similarly for ease of discussion, camera sensor pixel array 29 is illustratively shown to consist of only 12 rows and 14 columns (i.e. m=12 and n=14) for a total resolution of 168 camera pixels i (i.e. (12×14) elements). It is noted that the resolution of camera sensor pixel array 29 is four times greater than the resolution of projector pixel array 27, and no light diffusing material is located within the light path from projector pixel array 27 to camera sensor pixel array 29, and so the ideal light ray distribution conditions for the present first embodiment are met.

In FIG. 3A, each square within projector pixel array 27 represents a different projector pixel j. In the present example, it is desired to obtain the light transport coefficients for the projector pixel j located at the intersection of the third row and fifth column (i.e. projector pixel j=(5,3) is the projector pixel under test). As explained above, light diffusion, or light scattering, is ignored. Thus, projector pixel j=(5,3) is shown to be turned ON, i.e. lit, as is indicated by a white square, while all other projector pixels are shown to remain turned OFF, as indicated by dark gray squares. Projector pixel j=(5,3) emits light ray 1, which passes through a projector lens 3 before hitting a projection surface 5 (which is basically a generic projection scene determined by the environment in which real projector 21 and real camera 25 are located). Since light diffusion is ignored in the present example, light ray 1 bounces off projection surface 5 and passes through a camera lens 7 before hitting a group of camera pixels i forming a light ray footprint indicated by circle Ft1. Since the resolution of each projector pixel j is much coarser than that of the camera pixels i, the created light ray footprint Ft1 on camera sensor pixel array 29 covers several camera pixels i, with the camera pixels at the center of light ray footprint Ft1 (indicated as white squares) receiving the most light intensity, and the camera pixels i along the periphery of light ray footprint Ft1 (indicated as light gray squares) receiving less light intensity, and those camera pixels i not within light ray footprint Ft1 (indicated as dark gray squares) receiving no light. The light transport coefficients for each camera pixel i corresponding to the projector pixel under test j=(5,3) may then be determined by determining the light intensity reading of all camera pixels i within camera sensor pixel array 29.

As is explained above, it is beneficial to view projector pixel array 27 as a first vector (real projection vector Rprjct), and to view the resultant captured image across the entirety of camera sensor pixel array 29 as a second vector (real captured image vector Rcptr). A pictorial representation of how real projector vector Rprjct may be constructed is shown in FIG. 3B. Projector pixel array 27 is first separated into six rows, row_1 to row_6, and each row is then turned 90 degrees to form six column segments col_seg_r1 to col_seg_r6. The six column segments col_seg_r1 to col_seg_r6 are then joined end-to-end to form one composite column col_1 consisting of (p×q) elements (i.e. (6×7) or 42 elements). In the present example, element col_1_row_19 (i.e. the $19^{th}$ element down from the top of column col_1) corresponds to a projector pixel j at array location (5,3) of projector pixel array 27. Element col_1_row_19 is shown as a white square, while all other elements are shown as darkened squares, to indicate that element col_1_row_19 is the only projector pixel turned ON.

A similar process is applied to camera sensor pixel array 29 in FIG. 3C to construct real captured image vector Rcptr. In the present exemplary case, camera sensor pixel array 29 would be broken up into m rows (i.e. 12 rows) that are each turned 90 degrees to form 12 column segments, not shown. In a manner similar to how projector pixel array 27 was rearranged in FIG. 3B, the 12 column segments are joined end-to-end to form one composite column cmra_col_1 (i.e. vector Rcptr) of (m×n) elements (i.e. (12×14) or 168 elements).

In the present example, the light ray emitted from projector pixel j at array location (5,3) of projector pixel array 27 is assumed to form light ray footprint Ft1 on camera sensor pixel array 29. The span of light ray footprint Ft1 is indicated by a circle, and encompasses twelve camera pixels i on four different rows of camera sensor pixel array 29. The camera pixels i within light ray footprint Ft1 receive at least a part of the light intensity from a light ray emitted from projector pixel j=(5,3) (i.e. matrix element col_1_row_19) from FIG. 3A or 3B. The camera pixels at the center of light footprint circle Ft1 receive the most light intensity, and are identified as white squares, and the camera pixels along the perimeter of light footprint circle Ft1 receive less light intensity and are identified as light gray squares. Those camera pixels not within light ray footprint Ft1 are shown as dark gray squares. As is illustrated in FIG. 3C, these white and light gray squares constitute nonzero elements within the captured image, and are shown as white and light gray squares (i.e. nonzero) valued NZ elements interspersed between many zero valued elements (i.e. dark gray squares) within vector Rcptr (i.e. column cmra_col_1).

Figures 4A, 4B:
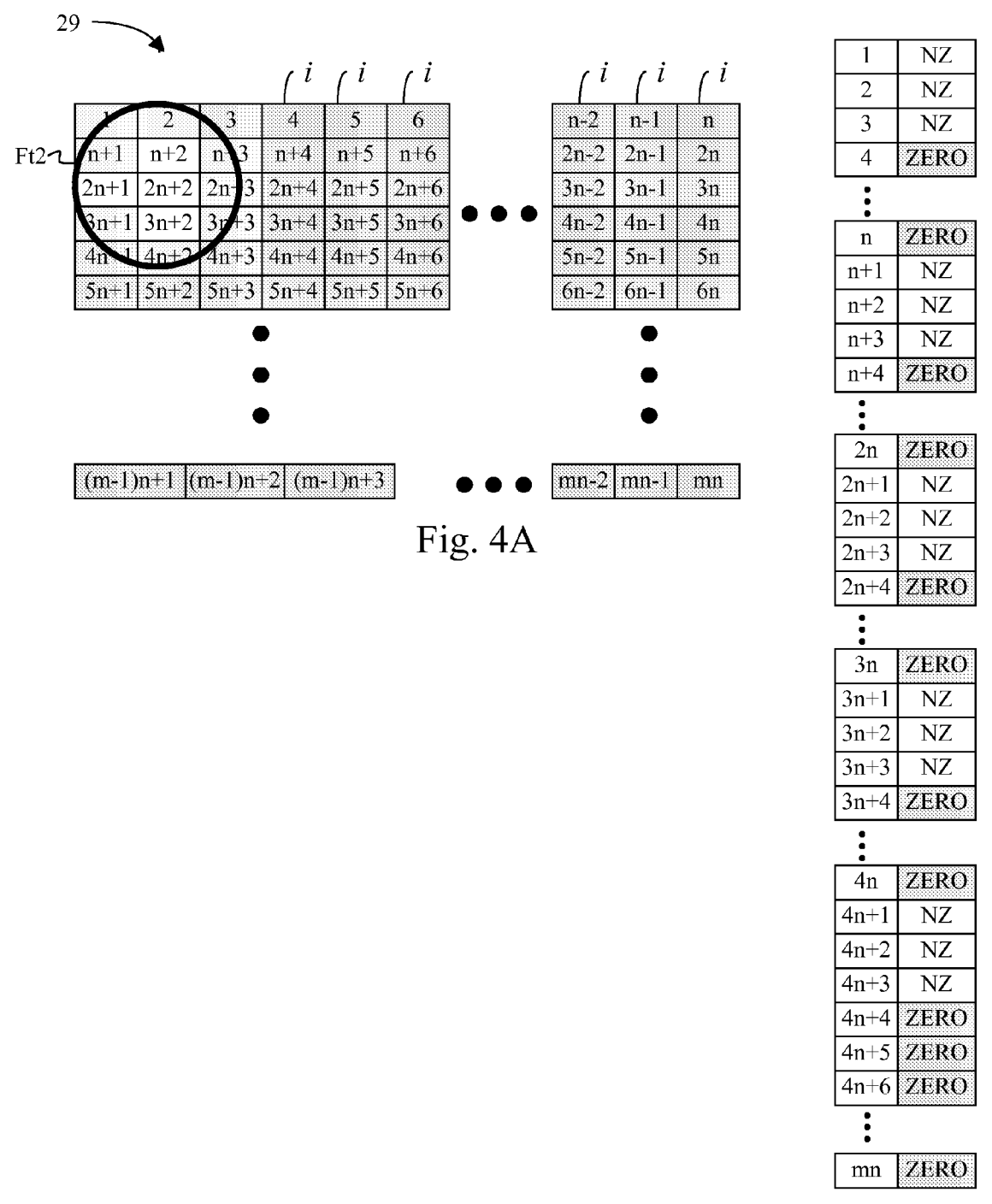

A second example providing a close-up view of how the light footprint of a single light ray from a projector pixel j may cover several camera pixels i is shown in FIGS. 4A and 4B. In FIG. 4A, a partial view of another exemplary camera sensor pixel array 29 shows individual camera pixels i numbered horizontally from 1 to n on the first row, continuing with (n+1) to (2n) on the second row, and (2n+1) to (3n) on the third row, and so on. Following this sequence, it is to be understood that camera pixels i along the bottom-most row would be numbered from (m−1)n+1 to (mn).

A second light ray footprint Ft2 of a single light ray from another exemplary, single, projector pixel j impacting camera sensor pixel array 29 is denoted as a circle. For illustration purposes, those camera pixels i not within light ray footprint Ft2 [i.e. those camera pixels i not hit by the single light ray emitted from the $j^{th}$ projector pixel] are shown as deeply darkened, those camera pixels i partly covered by footprint Ft2 are shown as lightly darkened, and those camera pixels i completely within footprint Ft2 are shown as having no darkening. As it is known in the art, each camera pixel i that is at least partially covered by light ray footprint Ft2 will register a light intensity value proportional to the amount of light it receives. This light intensity value may be assigned as the light transfer coefficient for that individual camera pixel i. Alternatively, the light transport coefficient of each camera pixel i may be made proportional to the light intensity value registered by the individual camera pixel i. Nonetheless, those camera pixels i that are not directly hit by the projection light ray from the $j^{th}$ projector pixel should have a light intensity value of zero (or close to zero, or below a predefined threshold light intensity value), and their corresponding light transport coefficient should likewise have a value of zero (or close to zero).

With reference to FIG. 4B, an example of a captured image vector Rcptr_j [or $j^{th}$ column of matrix T], as would correspond to the footprint Ft2 example of FIG. 4A is shown. This $j^{th}$ column of matrix T is illustratively shown as a numbered vertical sequence of light transport coefficients, each corresponding to the numbered camera pixel i of camera sensor pixel array 29 of FIG. 4A. The numerical sequence of capture vector Rcptr_j preferably follows the horizontally numbered sequence of individual camera pixels i in camera sensor pixel array 29 shown in FIG. 4A. As shown, only those elements within captured imaged vector Rcptr_j that correspond to camera pixels i covered by light ray footprint Ft2 have non-zero values, i.e. "NZ", for light transport coefficients. All other camera pixels have "ZERO" values for light transport coefficients. It is to be understood that "NZ" represents any non-zero light transport coefficient value, and that this value would be related to the amount of light intensity received by the corresponding camera pixel i. Since light ray footprint Ft2 spans several rows of camera sensor pixel array 29, each row is sequentially listed in captured image vector Rcptr_j, with several long sequences of zero valued light transport coefficients interspersed between a few non-zero, NZ, valued light transport coefficients.

Returning now to the present novel method for determining matrix T, it is first noted that individual light transport coefficients for projector pixel j map to column j of the light transport matrix T. Assuming minimal overlap between projector pixels, it follows that a first set of projector pixels S1 within imaging projector pixel array 27 maps to a corresponding set of columns (one per projector pixel) in light transport matrix T.

[i.e. S1 ⊂ {1, ..., (p×q)}]

Furthermore, it is assumed that the first set of projector pixels S1 includes target projector pixel j, i.e. the target projector pixel under test.

Let Rcptr_S1 be a first real image captured by real camera 25 of a projected image created by the simultaneous activation of the first set of projector pixels S1.

Consider now a second set of projector pixels S2 who share only projector pixel under test j in common with the first set of projector pixels S1,

[i.e. S1∩S2={j}]

Let Rcptr_S2 be a second real image captured by real camera 25 of a projected image created by the simultaneous activation of the second set of projector pixels S2. The light transport coefficients of the $j^{th}$ column of light transport matrix T (which corresponds to the target projector pixel under test, i.e. corresponds to j) may be directly obtain from real captured images Rcptr_S1 and Rcptr_S2 by identifying the one light ray footprint they share in common (i.e. similar to light ray footprints Ft1 or Ft2 in FIG. 3A, 3C or 4A). This common light ray footprint would correspond to a light ray emitted from target projector pixel j, which is the only lit projector pixel j shared in common among first set S1 and second set S2.

The next step, therefore, is to determine how to identify the one light ray footprint commonly shared by both real captured images Rcptr_S1 and Rcptr_S2. A method of identifying this common light ray footprint is to conduct a pixel-by-pixel comparison of both captured images Rcptr_S1 and Rcptr_S2, and to identify the dimmer of two compared pixels. For example, in first captured image Rcptr_S1 only sensor pixels within individual light ray footprints, each corresponding to the simultaneous lighting of the first set of projector pixels S1, will have non-zero (NZ) light intensity values, and all other pixels in captured image Rcptr_S1 will have zero values, i.e. will be comparatively dark. Similarly in second captured image Rcptr_S2, only sensor pixels within light ray footprints corresponding to the second set of simultaneously turned on projector pixels S2 have non-zero (NZ) light intensity values, and all other pixels will have zero (or dark) values (i.e. below a predefined threshold value). Since the two sets S1 and S2 share only the target projector pixel j in common, a direct comparison of both captured images will quickly identify the camera pixels i within the light ray footprint corresponding to projector pixel j by identifying the only non-zero region (i.e. non-dark region) common to both Rcptr_S1 and Rcptr_S2. Stated differently, the intersection of the lit regions (i.e. light ray footprints) of Rcptr_S1 and Rcptr_S2 is identified, and this identified light ray footprint will correspond to the target projector pixel under-test, j.

A method of accomplishing this is to conduct a pixel-by-pixel comparison of both captured images Rcptr_S1 and Rcptr_S2, and to retain only the darker (i.e. dimmer) of the two compared pixels. This process may be expressed as:

Tj≈MIN(Rcptr_S1,Rcptr_S2)

where Tj is the $j^{th}$ column of matrix T, and "MIN" indicates that the lower valued camera pixel (i.e. the darker camera pixel having a lower captured light intensity value) in Rcptr_S1 and Rcptr_S2 is retained, and the higher valued (i.e. brighter) camera pixel is discarded. In this way, the only high intensity values that are retained correspond to a light ray footprint common to both S1 and S2.

Stated differently, since the contribution of each individual projector pixel j is mapped to distinct parts of the camera sensor pixel array 29, there is a set L of cameral pixels i among pixels i=1 to i=(m×n) common to captured image Rcptr_S1 and Rcptr_S2 that corresponds to the target projector pixel, j.

[i.e. L ⊂ {1, ..., (m×n)}]

It should again be noted that the target projector pixel, j, is the intersection of projector pixel sets S1 and S2, (i.e. j is the only projector pixel common to both sets S1 and S2), such that S1∩S2={j}

Therefore, among the captured camera pixels (in both Rcptr_S1 and Rcptur_S2) that do not correspond to the target projector pixel, j, (i.e. those camera pixels not in set L, i.e. ∉L), at least one of the compared camera pixels in either Rcptr_S1 or Rcptr_S2 will not have received light. Since camera pixels receiving light will be brighter than camera pixels not receiving light, the operation MIN(Rcptr_S1, Rcptr_S2), provides an image where only pixels in set L [i.e. ∪L] are lit, which is a good approximation of Tj, i.e. the $j^{th}$ column in matrix T.

This implies that if sets of adjacent projector pixels in projector pixel array 27 are lit in columns and in rows (or any arbitrary pair of patterns that intersect at only one point, i.e.

share only one projector pixel j in common), and a first collection of captured images Rcptr_Sy are made for the lit columns of projector pixels and a second collection of captured images Rcptr_Sx are made for the lit rows of projector pixels, then the light transport coefficients for any individual projector pixel j may be obtained by comparing both collections and identifying the region L where a captured image of a lit column intersect a captured image of a lit row, the intersection corresponding to a light ray projected by activation of projector pixel j, alone.

Thus, a method of determining transport matrix T is to collect a first set of images Rcptr_Sy_1 to Rcptr_Sy_q, corresponding to q captured images of q lit columns of projector pixels, and construct a second set of images Rcptr_Sx_1 to Rcptr_Sx_p corresponding to p captured images of p lit rows of projector pixels. Then for all projector pixels j=1 to j=(p×q) within projector pixel array 27, there exists a pair of row and column captured images, Rcptr_Sy_a and Rcptr_Sx_b, such that the intersection of Rcptr_Sy_a and Rcptr_Sx_b correspond to a light ray footprint created by activation of the target project pixel under-test, j. Therefore, one needs to construct sets of projection images:

Rprjct_Sy_1 to Rprjct_Sy_q and Rprjct_Sx_1 to Rprjct_Sx_p where each projection image Rprjct_Sy_1 to Rprjct_Sy_q is paired with any of projection images Rprjct_Sx_1 to Rprjct_Sx_p such that each pair of projection images shares only one light footprint in common. That is, $$\forall j \in \{1, \ldots, (p \times q)\} \exists Rprjct\_Sy\_a, Rprjct\_Sx\_b | Rprjct\_Sy\_a \cap Rprjct\_Sx\_b = \{j\}$$

The above formula being interpreted to mean that for all projector pixels j in {1 . . . (p×q)} there exist a pair of projection images, each having a differently constructed pattern such that the intersection of the constructed patterns intersect at a single point (i.e. pattern section, or a single light footprint region) corresponding to a common projector pixel, j. A basic example of such pairs of constructed patterns would be projected pairs of vertical light lines and horizontal light lines. In this case, the intersection of the captured image of a vertical light line and the captured image of a horizontal light line would include all the camera pixels i that correspond to a target projector pixel under-test, j, (i.e. all camera pixels i that lie within a light ray footprint created by a light ray emitted from project pixel under-test j).

Therefore, any column Tj [where j=1 to (p×q)] within transport matrix T can be synthesized from images Rcptr_Sy_1 to Rcptr_Sy_q and Rcptr_Sx_1 to Rcptr_Sx_p. A scheme that satisfies this property is to use pixel coordinates: let Rprjct_Sx_j be a first projected image such that only pixels with an x-coordinate equal to j are turned ON, and let Rprjct_Sy_k be a second projected image such that only pixels with a y-coordinate equal to k are turned ON. Then MIN(Rprjct_Sx_j, Rprjct_Sy_k) gives an image corresponding to projector pixel (j, k) being turned ON. This process can be better understood with reference to FIGS. 5A, 5B, 6A, 6B, 7A, and 7B.

In FIG. 5A, a scene, or display environment is illustratively shown as a flat surface 41 with a checkerboard pattern. It is to be understood that the checkerboard pattern is shown purely to facilitate the present description by providing a contrast for projected light lines, and the display environment need not have any pattern and may be of irregular shape. The relative location of each vertical light line and horizontal light line are known since it is known which projector pixels were turned in their creation, and their known relative displacement may be used to calibrate real projector 21, as is more fully explained below.

Firstly, a bright vertical line, or vertical light beam, 47_k (i.e. column of light rays emitted simultaneously from a column of projection pixels), is projected onto surface 41 by real projector 21. In the present case, bright vertical line 47_k is generated by turning ON all projector pixels within projector pixel array 27 that have a y-coordinate equal to k. Real camera 25 then captures this real image, Rcptr_Sy_k, as one example of a lit column of projector pixels.

In FIG. 5B, where all elements similar to those of FIG. 5A have similar reference characters, real projector 21 projects a second bright vertical line 47_t of light rays onto surface 41. In this case, bright vertical line 47_t is generated by turning ON all projector pixels having a y-coordinate equal to t. Real camera 25 then captures this image, Rcptr_Sy_t, as another example of a lit column of projector pixels. It is to be understood that real projector 21 could project a separate bright vertical line of light rays for each of the q columns of projector pixel array 27, and real camera 25 could capture a separate image of each projected bright vertical line.

With reference to FIG. 6A, all elements similar to those of FIGS. 5A and 5B have similar reference characters and are described above. In the present case, real projector 21 preferably projects a bright horizontal line, i.e. horizontal light beam, 49_j made up of light rays emitted simultaneously from a row of projection pixels onto projection surface 41. Bright horizontal line 49_j may be generated by turning ON all projector pixels having an x-coordinate equal to j. Real camera 25 then captures this real image, Rcptr_Sx_j, as one example of a lit row of projector pixels.

In FIG. 6B, real projector 21 projects a second bright horizontal line 49_r (made up of simultaneously lit, individual light rays) onto surface 41. As before, bright horizontal line 49_r may be generated by turning ON all projector pixels having an x-coordinate equal to r. Real camera 25 then captures this real image, Rcptr_Sx_r, as another example of a lit row of projector pixels. It is to be understood that real projector 21 could project a separate horizontal line of light rays for each of the p rows in projector pixel array 27, and real camera 25 could capture a separate image of each projected bright horizontal line of light rays.

If one now conducts a pixel-by-pixel comparison of captured image Rcptr_Sy_k from FIG. 5A and captured image Rcptr_Sx_j from FIG. 6A (or alternatively compares only their respective bright vertical and bright horizontal lines), using operation MIN(Rcptr_Sx_j, Rcptr_Sy_k) to retain only the darker of two compared image pixels and discarding the brighter of the two, one would generate an image 43', as shown in FIG. 7A. All elements in FIGS. 7A and 7B similar to those of FIGS. 5A, 5B, 6A, and 6B have similar reference characters with the addition of an apostrophe, and are described above.

Since most of image Rcptr_Sx_j (FIG. 5A) is the same as image Rcptr_Sy_k (i.e. they mostly consist of the checkerboard pattern on flat surface 41 with projected light rays), retaining the darker of two compared pixels does not change the majority of the resultant image. That is, if two compared pixels are relatively the same, then electing either pixel over the other does not much affect the resultant image 43'. However, when a pixel on bright vertical line 47_k in captured image Rcptr_Sy_k is compared with a corresponding pixel in captured image Rcptr_Sx_j that does not lie on a bright horizontal line 49_j, then retaining the darker of the two image pixels will discard the pixel on the bright vertical line from image Rcptr_Sy_k, and retain the plain pixel from image Rcptr_Sx_j, which is illuminated by ambient light and not by a projector pixel. Therefore, bright vertical line 47_k is eliminated from generated image 43'. Similarly, when a pixel on bright horizontal line 49_j in image Rcptr_Sx_j is compared with a corresponding pixel in image Rcptr_Sy_k that does not lie on bright vertical line 47_k, then retaining the darker of the two pixels will discard the pixel on the bright horizontal line from image Rcptr_Sx_j, and retain the plain pixel from image Rcptr_Sy_k, which is illuminated by ambient light and not by a projector pixel. Consequently, horizontal line 49_j is also eliminated from generated image 43'. However, within the region where bright vertical line 47_k intersects bright horizontal line 49_j, both compared image pixels are brightly lit pixels showing an impact by a light ray. Comparison of these two image pixels within this intersection region will result in either of the two bright beam pixels being selected for image 41'. As a result, image 41' will show a brightly lit region 53 corresponding to a projected light ray emitted from coordinates (j,k) of projector pixel array 27. Thus, the light transport coefficients for the projector pixel having coordinates (j,k) can be extracted from generated image 53 without having to physically capture an image of a light ray individually projected from the projector pixel at (j,k).

A second example is shown in FIG. 7B, where the combination of real captured images corresponding to FIGS. 5B and 6B (which would respectively correspond to real captured images Rcptr_Sy_t and Rcptr_Sx_r following the above-described naming convention), results in a second brightly lit region 55 corresponding to a projected light ray emitted from coordinates (r,t) of projector pixel array 27.

A similar process may be followed to identify the light transport coefficients of every projector pixel j in projector pixel array 27 without having to individually turn ON and project each projector pixel j, one-at-a-time. This method of generating an image of a hypothetically, singularly activated projector pixel to obtain the projector pixel's light transport coefficients requires at most only (p+q) captured images, one for each row and column of projector pixels in projector pixel array 27 of real projector 21. Furthermore, once all the pixel projection locations have been identified, the (p+q) captured images may be discarded, and all that needs to be saved is an index and corresponding footprint information.

Figure 8:
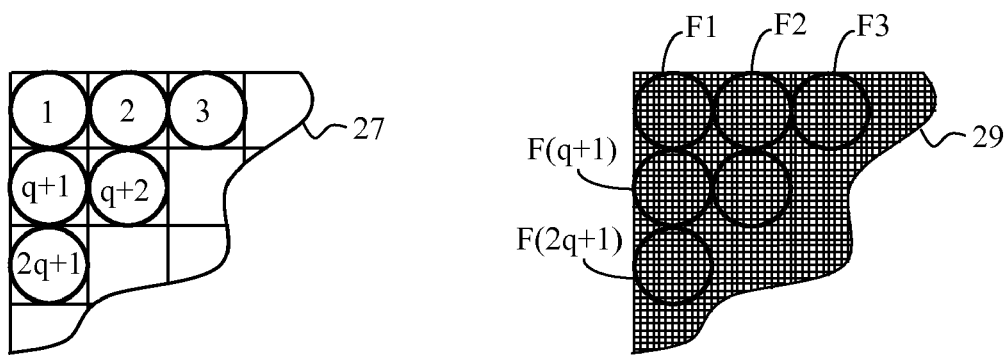
FIG. 8 is a first example of an index associating projector pixels to non-zero valued light transport coefficients, as determined by a light ray footprint as generated in FIG. 7A or 7B.

An example of this approach is shown in FIG. 8, where a partial view of projector pixel array 27 (illustrated as a cross-hatch pattern) is compared to a partial view of camera sensor pixel array 29 (also illustrated as a crosshatch pattern). For illustrative purposes, the cross-hatch pattern illustrating the partial camera sensor pixel array 29 is made denser than the cross-hatch pattern representing projector pixel array 27 in order to better illustrate that, in the present example, pixel density (i.e. resolution) of real camera 25 is preferably greater than the resolution of real projector 21, and thus a light ray emitted from a single projector pixel j may create a light footprint (such as F1) spanning several camera pixels i.

In the present example of FIG. 8, an index of real projector pixel array 27 is represented as a partial array with circles 1, 2, 3, ... (q+1) ... (2q+1) ... etc. representing individual projector pixels j. Similarly, real camera sensor pixel array 29 is shown superimposed by a corresponding partial array of circular light footprints F1, F2, F3, ... F(q+1), ... etc. representing the footprint information corresponding to individually activated projector pixels j (assuming light scattering is ignored). Thus, footprints F1, F2, F3, ... F(q+1), ... etc. respectively correspond to projector pixels 1, 2, 3, ... (q+1), etc.

Following this approach, only two sets of information need to be stored. A first set of information corresponds to an index of projector pixels j and a second set of information corresponds to footprint information associating groups of camera pixels i with each projector pixel j. In other words, zero-valued coefficients need not be stored, which greatly reduces the memory requirements.

Figure 9:
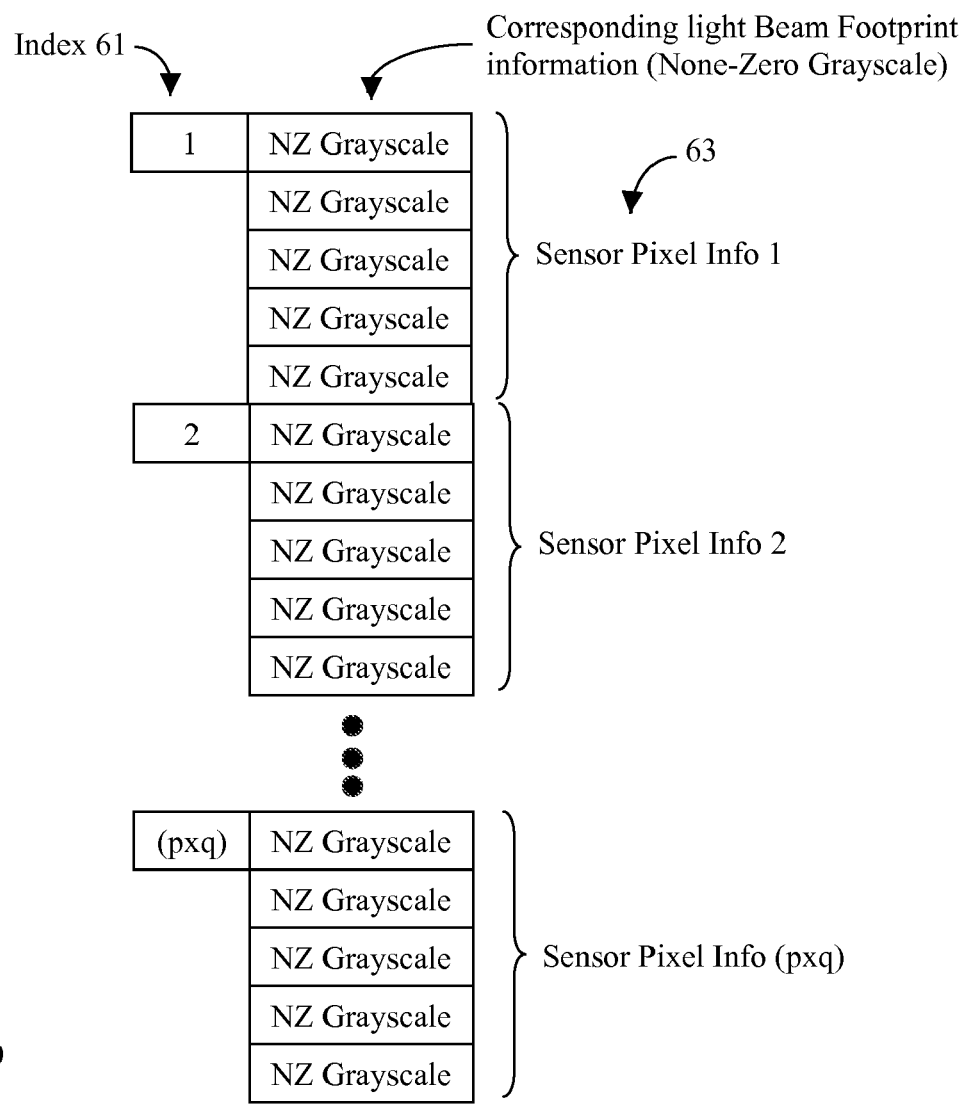
FIG. 9 is second example of an index associating projector pixels to non-zero valued light transport coefficients, as determined by a light ray footprint as generated in FIG. 7A or 7B.

A second example of organizing this information is shown in FIG. 9, where an index 61 of projector pixels j is shown to point to, or correspond to, group 63 of grayscale (i.e. non-zero valued, or "NZ Grayscale") camera pixel i information (i.e. corresponding to a resultant light ray footprint).

Having shown how to reduce the number of images that need to be captured and stored to generate the needed light transport coefficients, and how to reduce the amount of data that needs to be stored and manipulated, for dual photography, the following next section addresses some of the practical difficulties of implementing dual photography. As is explained above, a light transport matrix T can be very large, and its use (or the use of its transpose, the dual light transport matrix $T^T$) requires large amounts of active memory (for example, DRAM) and excessive computational processing power/time. Therefore, general use of the dual image has heretofore not been practical.

To more efficiently construct a dual image, one first notes that $$Vcptr''=T^T Vprjct''$$

Since the virtual camera sensor pixel array 27" in virtual camera 21" corresponds in actuality to real projector pixel array 27 of real projector 21 (see FIGS. 2A and 2B), it is convenient to use the same index j to denote any virtual camera pixel within Vcptr" obtained by virtual camera 21". Therefore, a relationship between each virtual projector pixel j in a virtual captured image versus a corresponding row of elements in $T^T$ may be denoted as $$Vcptr''(j)=T^T_j Vprjct''$$

where $T^T_j$ refers to the $j^{th}$ row in $T^T$.

As is explained above, $T^T$ is the matrix transpose of light transport matrix T (i.e. matrix T turned on its diagonal), and the values of row $T^T_j$ (where j is any value from 1 to (p×q)) therefore correspond to the $j^{th}$ column of matrix T (i.e. $T_{COL\_j}$). Since each column of T has (m×n) elements (i.e. equivalent to the pixel resolution of real camera 25), this would appear to be a very large number of elements. However, recalling that in the present implementation, only a limited number of elements in each column of matrix T are non-zero (i.e. only those corresponding to camera sensor pixels i upon which shone the intersection of a vertical and horizontal light beam, i.e. a light footprint), it is self apparent that only a few of the (m×n) elements within in each column j of matrix T (and subsequently in each row $T^T_j$) are non-zero. Therefore, it is not necessary to examine all elements in $T_{COL\_j}$ when computing Vcptr" (j). Indeed, as is explained above in reference to FIGS. 8 and 9, it is preferred that only a single index 61 showing all individually activated projector pixels j, and their corresponding light ray footprint information 63 be stored.

As is shown in FIG. 9, index 61 associates a listing of grayscale entries 63 for each projected light ray (from an individual projector pixel j of real projector 21). It is to be understood that each group of grayscale entries 63 corresponds to the non-zero entries within each column of T, and only these non-zero grayscale values need to be examined during each matrix operation of a column of light transport matrix T. Thus, the number of calculations needed to determine each value of $Vcptr''(Ij)=T^T_j Vprjct''$ is greatly reduced.

In other words, this subset of elements, SVcptr"(G), within each column G of matrix T that needs to be processed may be defined as $T_{COL\_G}(a)$, where a is an index for any virtually captured pixel [i.e. $a \in \{1, \ldots, (p \times q)\}$] in Vcptr"(G). Therefore, for each SVcptr"(G), one can define the set of elements to be examined as:

$$SVcptr''(G) = \{a \mid \forall z \in \{1, \ldots, (p \times q)\} T_{COL\_G}(a) \geq T_{COL\_z}(a)\}$$

Since in general $\|SVcptr''(G)\| \ll (p \times q)$, it takes significantly less time to compute:

$$Vcptr''(G) = \sum_{a \in SVcptr''(G)} T_G^T(a) Vprjct''(a)$$

than to compute:

$$Vcptr''(j) = T_j^T Vprjct''$$

Figure 10A:
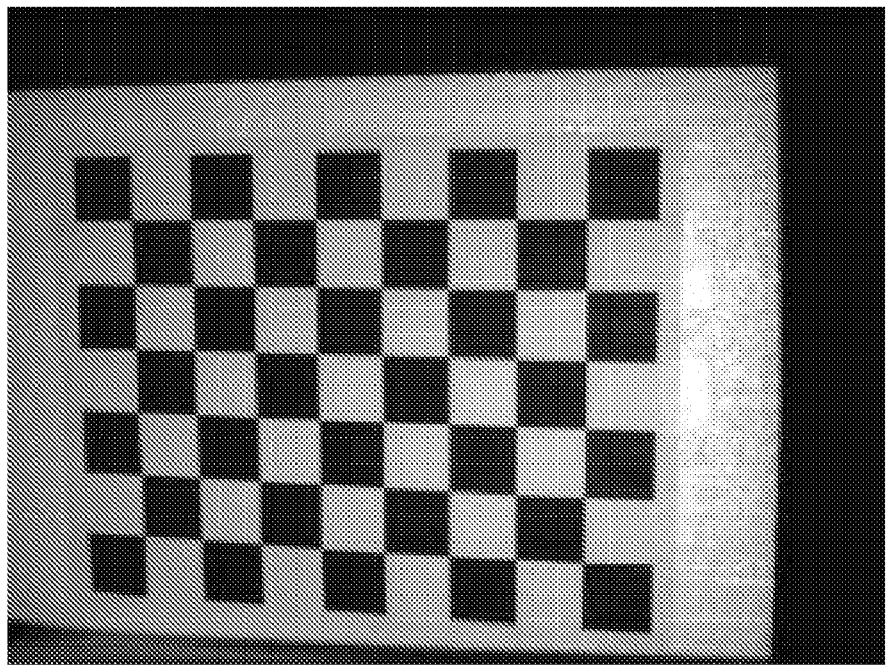
FIG. 10A shows a real captured image taken by a real camera.
Figure 10B:
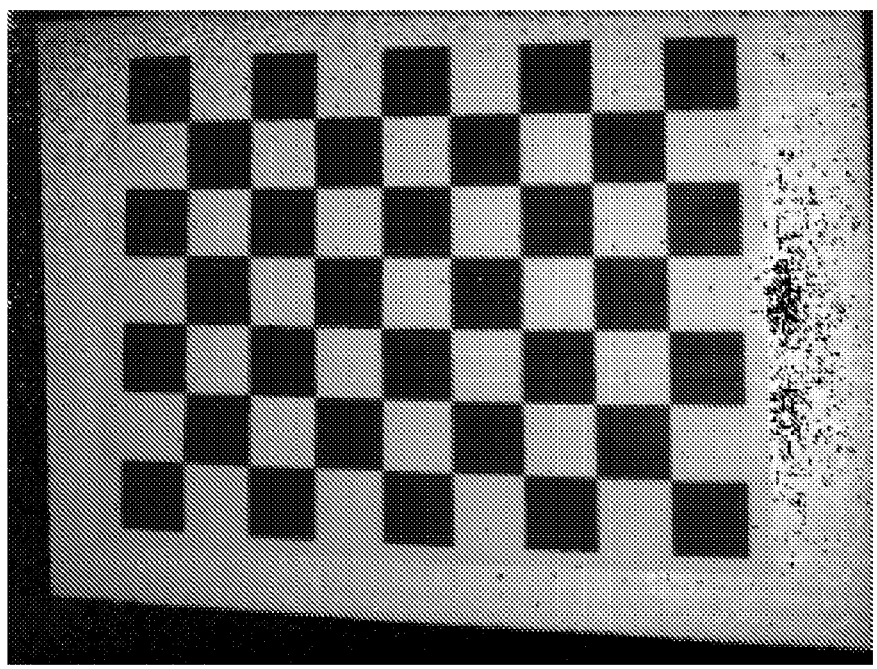
FIG. 10B shows a dual captured image, as seen by a real projector, as generated using the method of the present invention.

An example of a dual image generated using this method is shown in FIGS. 10A and 10B. FIG. 10A shows a primal image, as projected by a real projector. FIG. 10B shows the resultant dual image computed by an implementation of the present method. The dual image of FIG. 10B represents the image virtually captured by the real projector 27 (i.e. virtual camera 21"), or stated differently, the image as "seen" by the real projector 21.

The above discussion shows how to compute dual images efficiently from a reduced set of images, which saves image capture time as well as computation time. As is explained above, the real captured images and dual captured images can be used to calibrate both real camera 25 and real projector 21, respectively.

That is, since the images from the projector's view cannot be directly captured, a straightforward solution is to construct projector-view images (i.e. dual images) from corresponding camera images using dual photography techniques, and then to calibrate the projector using the constructed images. For example, after having taken several real images at different angles of a known object with carefully measured features, the real camera can be calibrated by using the known dimensions of the object to compensate for distortions in the captured images arising from the different angle views. The virtual images, as seen by the real projector, can then be generated from the same captured images using dual photography techniques, as described above, and the real projector may be calibrated in a manner analogous to the real camera.

A possible setback associated with this straightforward method, however, is the difficulty in generating and manipulating the light transport matrix T, and operating on the large image vectors resulting from the large number of camera and projector image pixels. Although this labor-intensive and expensive process is mitigated substantially by using the dual photography method described above, for purposes of calibrating real projector 21 in a projector-camera system, such as that shown in FIG. 2A, Applicants have developed a novel method that avoids the need for generating a full T matrix and for creating a full dual image, while still taking advantage of some of the benefits of using a dual image (i.e. an image as "seen" by real projector 21) to facilitate calibration of real projector 21.

Assuming that a projection scene is relatively flat, then one can greatly reduce the number of light footprints points for which a light transport coefficient needs to be determined. In other words, the generation of a full T matrix can be avoided altogether by noting that to calibrate the projector; one does not need to construct an entire dual image, but only needs to determine the location of a strategic set of points, particularly if the projection surface is not very irregular. For example, the strategic set of points may be the corners of the squares within the checkerboard pattern on flat surface 41 of FIG. 5A, as seen by the projector. The greater the irregularity of the projection scene surface, the greater the number of points in the strategically selected set of points. Conversely, the flatter the projection scene, the fewer the number of points in the strategic set of points.

Applicants have adapted a homography-based method to achieve this goal of a reduced number of points in the strategic set, and thus avoid the generation and manipulation of a full T matrix, or a simplified T matrix described above, and further avoid the full dual-image generation process by incorporating some features of dual-image generation into the calibration process, itself. This alternate embodiment of the present invention directly computes the coordinates of the checker corner features (or other known feature) across the projector-view images without requiring the construction of the dual images and the detection of the corners from the constructed dual images.

In this novel method, one may use the real camera to capture images of a planar checkerboard and detect the checker block corners across the captured images. It is to be understood that a checkerboard is being used purely for illustrative purposes, and any scene may be captured. In the present case, since the orientation of the projected vertical and horizontal lines are known, variations in the projected lines can be identified and corrected, irrespective of the scene. Thus, the projector-camera system need not be calibrated beforehand. Rather, all elements of the projector-camera system are calibrated at the same time.

Secondly, it is observed that projector images follow the so-called perspective projection model, which relates two (or more) views of a single scene as seen by two (or more) separated sources. That is, different viewing sources will "see" a different view (or image) of the same scene since the different sources are located at different angles to the scene. However, since there is only one real scene (irrespective of the number of views of the scene), one can generate a mathematical relationship between the different views that will associate any point on any one view to a corresponding point on the real scene (and thereby to a corresponding point in each of the other views).

If one of these separate views is assumed to be a virtual image as "seen" by a real projector, while a second separate view is deemed to be a real image captured by a real camera, then the perspective projection model (which relates the two views to the common, real scene) would permit one to extract from the captured real image some information relating to the virtual image, without generating a full dual image.

Using this approach, Applicants have devised a method of extracting sufficient information for calibrating a real projector without requiring a full dual image. Thus, although the dual image is not fully created, one can still apply a camera calibration technique to a projector, albeit in a roundabout way.

Under the perspective projection model, the relationship between two image projections of a planar object from different views is a simple linear projective transformation or homography. This transformation relates the coordinates of any point on the planar object (i.e. a homogeneous coordinate) to the coordinates of a corresponding point on a specific view of the planar object. In the present embodiment, the projector-view image of the planar checkerboard is a homography of the corresponding camera image. Specifically, for any point P on the real scene (i.e. checkerboard), its homogeneous coordinate in the projector-view image Up=(up, vp, 1) and the coordinate in the camera image Uc=(uc, vc, 1) satisfy the following equation, Up=λHUc where λ is a scalar and H is a 3×3 homography transformation matrix (as is known in the art) of which the bottom right entry is set to 1. The pair of corresponding coordinates provides 3 linear equations, where one of the equations determines the scalar and the other two are used to determine H, the homography transformation matrix. Since there are 8 unknown entries in 3×3 matrix H, given the correspondence between N coordinate points (where N≧4) on the checker board, the homography between the projector-view image and the camera image can be recovered by solving the 2N linear equations. The greater the number of N, the lower the error relating coordinate points between the projector-view and the camera image.

To obtain the corresponding coordinates, 10 white points are preferably projected on a scene, such as the checkerboard pattern. An image of the checkerboard with the projected white points is then captured using a real camera, such as real camera 25, and the coordinates of the 10 points in the camera image are computed. In the present process, it is only necessary that the ten points be distinguished during the computation of their corresponding coordinates in the captured image. This may be achieved by projecting the ten points sequentially, and determining their corresponding coordinates, in turn. Alternatively, differently colored points may be projected simultaneously, and the different points identified by color.

Since the projector preferably projected the points in a known relation to each other, the coordinates of the points in the projected image are known. This results in 10 pairs of corresponding coordinates, one set as captured by the real camera and a second set as projected by the real projector. Once the nomography is recovered, the coordinates of the checkerboard corners detected in the camera images can be directly transformed to compute the corresponding corner coordinates in the projector-view images. The projector parameters can then be calibrated using a camera calibration method, such as the one described above.

Figure 11:
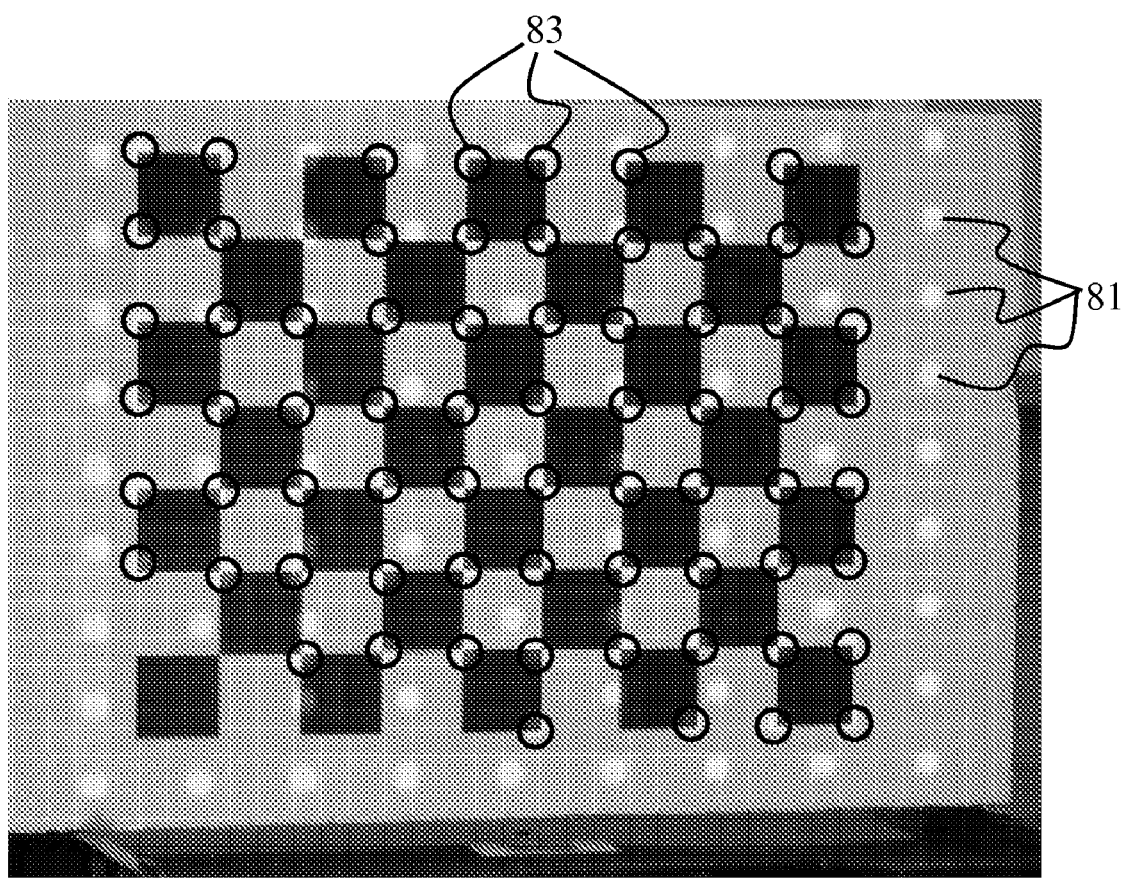
FIG. 11 is an example of a result obtained by use of nomography to calibrate a projector.

An example of this approach is shown in FIG. 11. In FIG. 11, the feature capture results are as follows. The circles, or dots, not shown in outline (for example dots 81) were used for estimating homography, while the outlined circles, or dots, (for example dots 83) are the corner point features. As can be seen, the outlined dots 83 are on the actual corners, indicating that the projector coordinates for each detected corner has been correctly captured.

It is to be understood, however, that instead of projecting dots, one may use the method described above of projecting multiple pairs of lines that intersect at one point (i.e. horizontal and vertical lines as described above), and extracting dot information from the one intersection point of each pair of lines. Furthermore, it is not necessary to project the lines onto a known pattern, such as the checkerboard pattern described above, since the spatial relationship between the pairs of projected lines are already known. That is, since one knows which columns and rows of the projector pixel array are turned on simultaneously, one knows their spatial relation. Furthermore, it is to be noted that the camera need not be pre-calibrated to the particular scene. Rather, the projector and camera may be calibrated at the same time.

As is explained above, this approach of using patterns to extract dot information includes a series of pattern projection and image capture steps. Thus, when an uncalibrated camera captures each projected pattern (i.e. vertical or horizontal line), any distortion of the projected pattern due to irregularities on the projection surface may be ignored for the moment. When all the patterns have been captured, the spatial relation (or transformation) between the projector and camera can be made since the spatial relation between the vertical and horizontal lines are known. That is, the spatial relation between the vertical and horizontal lines, as projected, are known since one knows which projector pixels were turned on during their generation. Furthermore, since one knows the true orientation of the vertical and horizontal lines, one can compensate for surface irregularities on the projection scene and view angles.

When a captured image of a vertical line is combined with a captured image of a horizontal line to extract dot information, one knows what projector pixel relates to the extracted dot, and one further can determine what group of camera pixels correspond to the extracted dot (as determined by the intersection of the vertical and horizontal lines). Thus, the homography relationship between the projector and camera (i.e. the transformation of one view for the other) can be achieved without need of calibrating either device individually to any specific projection scene (or projection surface).

This approach borrows from the above-described, simplified method for generating the transport matrix, T, but reduces the number of needed image projection-and-capture steps from (p+q) to a fraction of (p+q) determined by the number of desired dots. Although as little as 4 dots may be used to calibrate a projector-camera system whose scene environment is a flat projection surface, in order to account for some irregularities in a projection surface, for possible errors in the image capture steps, and for errors in identifying projected light lines or patterns due to existence of ambient light noise, it has been found that projecting seven horizontal light lines and seven vertical light lines to generate as many as fourteen to forty-nine dots is sufficient for overcoming most errors. It is to be understood that the greater the amount of surface irregularities in the projection scene, the greater the number of needed intersecting pairs of lines, but this number of seven vertical lines and seven horizontal lines has been found to be sufficient for many real-world situations. A reason why much fewer than (p+q) dots are needed is because one is not trying to generate a full transport matrix for use in dual photography. Rather, one is interested in identifying a few known relational dots for purposes of finding the homography relationship between two views, i.e. between the real view from the real camera and the virtual view from the real projector. However, it should be emphasized that an estimate of a full light transport matrix T can be generated from the few relational dots by assuming a smooth transition between the dots. That is, once the homography relationship is obtained, the same relationship of Up=λHUc can be used to fill-in gaps in construction of an estimated light transport matrix T.

The above described method for generating transport matrix T can be applied toward solving a different problem. Specifically, given a projector and camera pair, if one would like the camera "to see" a desired view on a given scene (i.e. projection environment), what should the projector illuminate onto the scene in order to produce that desired view? This task is termed "View Projection" hereinafter.

Clearly, finding the needed image to be projected requires detailed and precise knowledge about the geometry of the scene and the projection characteristics of the projector device, along with the photometric properties of the scene so that the reflection of light from the projector produces the exact desired view. For display surfaces with uniform albedo, i.e. reflectivity, and parametric shapes, these necessary measurements can be made explicitly.

Producing high quality imagery on arbitrarily complex nonparametric shapes with non-uniform surface reflectance properties, however, is still a daunting task requiring familiarity with a wide variety of tools and much human intervention. A goal of the present embodiment is to devise a measurement process that is completely automatic and requires no user intervention or parameter tweaking beyond casual hardware setup. In other words, the projector-camera system that achieves View Projection capabilities should completely calibrate itself with a single touch of a button.

A projection system that is capable of displaying correctly on complex surfaces under challenging settings has many real world applications. Making it fully automatic further allows it to be deployed in settings where professional display setup is not always available. Another goal of the present embodiment is to reduce the requirement on exotic imaging equipment, so that high quality calibration can be achieved with off-the-shelf components within an average consumer's reach. This goal may be achieved by combining some of the features and benefits of the previous embodiments in an automated and simplified process.

As is explained above in reference to the image setup of FIG. 2A, which consists of one real projector 21 and one real camera 25, real projector 21 has a p-row-by-q-column projector pixel array 27 while the real camera 25 has an m-row-by-n-column camera sensor pixel array 29. Light rays emitting from real projector 21 bounce off a scene (i.e. projection surface) and some of them eventually reach real camera sensor pixel array 29. In general, each ray of light is dispersed, reflected, and refracted in the scene and hits camera sensor pixel array 29 at a number of different locations. Thus, the light ray emitted from projector pixel j reaches real camera 25 and forms an m-by-n image across the entirety of camera sensor pixel array 29, where each camera pixel i receives a certain amount of light. If the image projected is represented as a (p×q)-element real image vector Rprjct, and the image captured is represented as an (m×n)-element captured image vector Rcptr, then the light transport between real projector 21 and real camera 25 can be written as Rcptr=TRprjct where T is the light transport matrix. As is illustrated in FIG. 2B, it has been shown that by the principle of Helmholtz reciprocity, the equation Vcptr"=$T^T$Vprjct"

can be used to model a "dual" setup where projector 21 is viewed as a p-row-by-q-column virtual camera 21", and real camera 25 is viewed as a m-row-by-n-column virtual projector 25". This enables "Dual Photography", where one can synthesize images that appear as though they were captured by real projector 21, with the scene appearing as if illuminated by light emanating from real camera 25.

View Projection, the object of the present embodiment, addresses a different problem. In View Projection, one is interested in finding a projector image that, when used to illuminate a scene, allows the camera to capture a predefined, desired image. In light transport terms, one is provided with T and with a desired Rcptr, and one wants to recover, i.e. generate, Rprjct. Clearly, Rprjct can be found by the following relation:

Rprjct=$T^{-1}$Rcptr

If one can determine inverse matrix $T^{-1}$ of light transport matrix T, then one can generate the required projection image, Rprjct, needed to produce the desired viewable image Rcptr.

The inverse of light transport matrix T has been used in the past for other purposes. For example, in article "A Theory of Inverse Light Transport" by Seitz et al. (IEEE International Conference on Communications, ICCV05), hereby incorporated in its entirety by reference, the inverse of the light transport matrix T is used to analyze the way light bounces in arbitrary scenes. In this approach, a scene is decomposed into a sum of η-bounce images, where each image records the contribution of light that bounces η times before reaching a camera. Using a matrix of "impulse images", each η-bounce image is computed to infer how light propagates through the scene.

The problem being addressed by Seitz et al., of course, is different than that posed by View Projection, where one is provided with, or envisions, a desired image (Rcptr, for example) and wants to infer an unknown projection source that can produce the desired image. In this case, it would be beneficial to compute Rprjct=$T^{-1}$Rcptr. It should be noted that calculation ($T^T$Vprjct") of Dual Photography would render a virtually captured image, Vcptr", that is a different view of Rcptr, but does not show the real source of projected image Rprjct.

The inverse ($T^{-1}$) of light transport matrix T is more difficult to compute than its transpose, $T^T$, requiring much more computational resources. Indeed, the sheer size of T makes computing $T^{-1}$ an extremely challenging task requiring tremendous computational resources. Worse, it is not always possible to find the inverse of an arbitrary matrix. That is, some matrixes may not have an inverse.

As it is known in the art, the identity matrix, or unit matrix, is denoted by I, and has the property that for a given matrix A, the following relationship holds:

AI=IA=A

If matrix A were a matrix of order m by n, then the pre-multiplicative identity matrix I would be of order m by m, while the post-multiplicative identity matrix I would be of order n by n.

The multiplicative inverse of a matrix is typically defined in terms of identify matrix I. A left multiplicative inverse of a matrix A is a matrix B such that BA=I, and a right multiplicative inverse of a matrix A is a matrix C such that AC=I If the left and right multiplicative inverse of a matrix A are equal, then the left and right multiplicative inverse are simply called the "multiplicative inverse", or "inverse", and is denoted by $A^{-1}$.

Fortunately, Applicants have found that in many display settings, an approximation to inverse matrix $T^{-1}$ may suffice. Creating a suitable approximation to the inverse of a matrix, however, requires meeting certain criteria not generally present in light transport matrix T. Therefore, before attempting to create an approximation to inverse matrix $T^{-1}$, one needs to first create a suitably modified light transport matrix T that meets the required criteria.

In general, $T^{-1} \neq T^T$. However, one constraint used above in the generation of an estimation of $T^T$ is likewise useful in the construction of $T^{-1}$. As is discussed above, for most projector-camera display applications, one may generally use the limitation that any two distinct light rays j and k emitted from a projector will hit a camera sensor at distinct parts, i.e. there is usually little overlap in the camera sensor pixels hit by light from each of the light rays j and k. This characteristic is termed the "Display Constraint" hereinafter.

Figure 12:
FIG. 12 shows a projected image distorted by two wine glasses placed between a projector and a scene.

In general, the Display Constraint may be violated if there is significant light scatter in the scene, such as the example given above where the scene consists of a glass of milk, and the light rays are diffused by the milk resulting in significant overlap. Another example of a scene that violates the Display Constraint is shown in FIG. 12, which includes two wine glasses between a projector and a projection scene, resulting in significant light scattering. In this example, a projected image consisting of lettering is projected onto the scene and shown to experience much optical distortion due to the wine glasses. Below is provided a method for compensating for such light scattering when the Display Constraint is violated, but for the present discussion, it is first assumed that the Display Constraint is met and each pixel projected will be distinct from the next.

As is also explained above, each column of the transport matrix T is the projection image resulting from one pixel from the projector. Thus, all of the column entries have zero values except those corresponding to the camera pixels hit by light emitting from the corresponding projector pixel.

Applicants noted that if adjacent light footprints (created by adjacently lit projector pixels) have no overlap, then columns of T would be orthogonal. In real-world applications, by the Display Constraint, overlap between adjacent light footprints is minimal, which implies that light from different projector pixels will mostly hit different camera pixels. As a result, if two columns of T are placed next to each other, the non-zero entries will not line up most of the time, and their dot product will be close to zero. This implies that the columns of T are approximately orthogonal to each other. In the present technique, these minimal, overlapping pixels are removed from the creation of the T matrix, which results in an approximate T matrix that is orthogonal, by definition. As is explained more fully below, these techniques permit further simplification of creation and manipulation of the T matrix.

Figure 13:
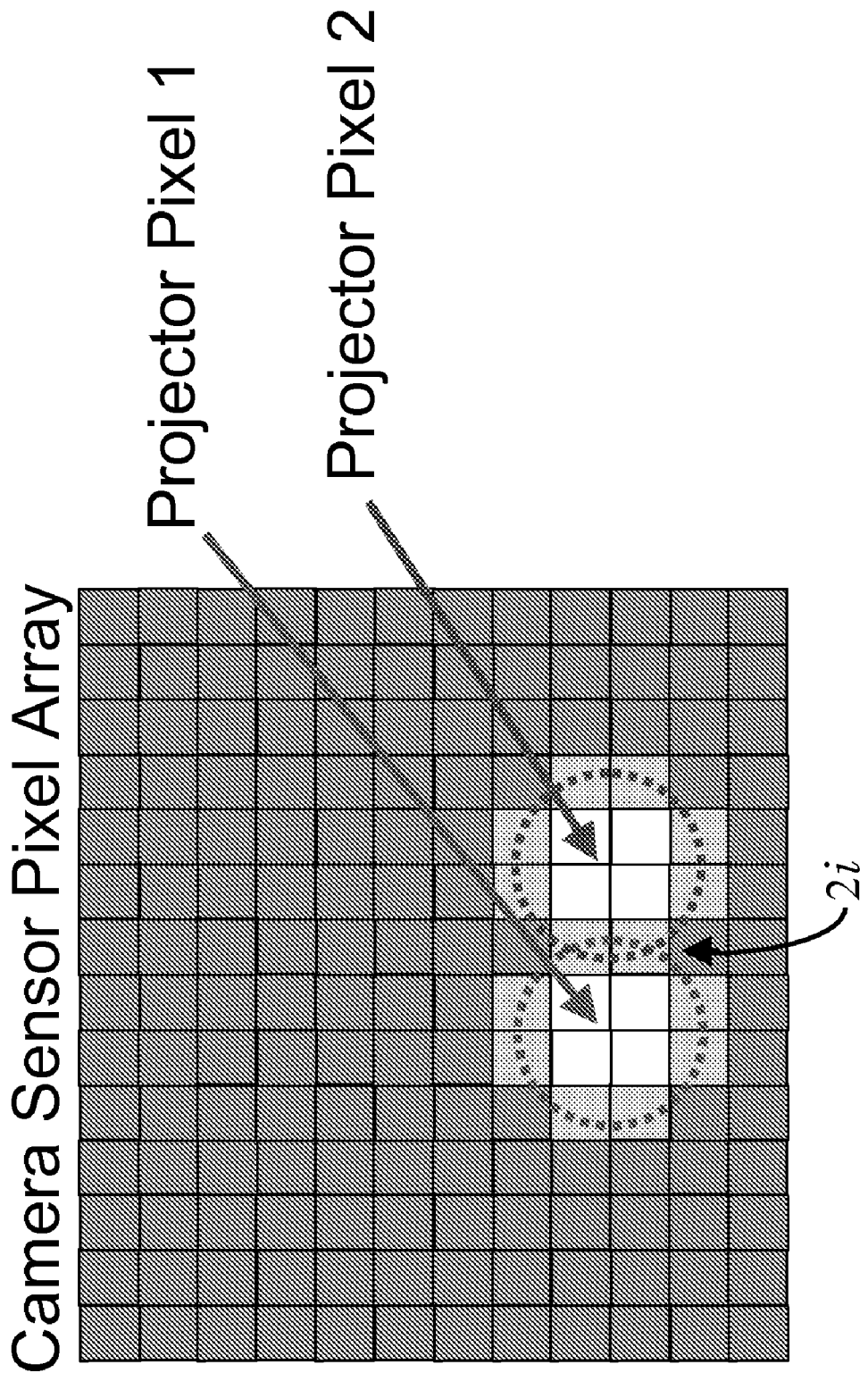
FIG. 13 is an example of two overlapping adjacent light footprints produced by two distinct projector pixels.

By the Display Constraint, light from different projector pixels will mostly hit different camera pixels, i.e. camera pixels corresponding to different projector pixels will have little overlap with each other. An example of this is shown in FIG. 13, wherein a first light footprint, Projector_Pixel_1, from a first projector pixel shares only two perimeter camera pixels 2$i$ with an adjacent second light footprint, Projector_Pixel_2, from a second projector pixel. This means that if columns of light transport matrix T are placed next to each other, the non-zero entries among the different columns will not line up most of the time (i.e. only the dimmer non-zero entries will have some overlap, as illustrated by sample pixels 2$i$ in the present example), and their dot product will be close to zero.

Figure 14:
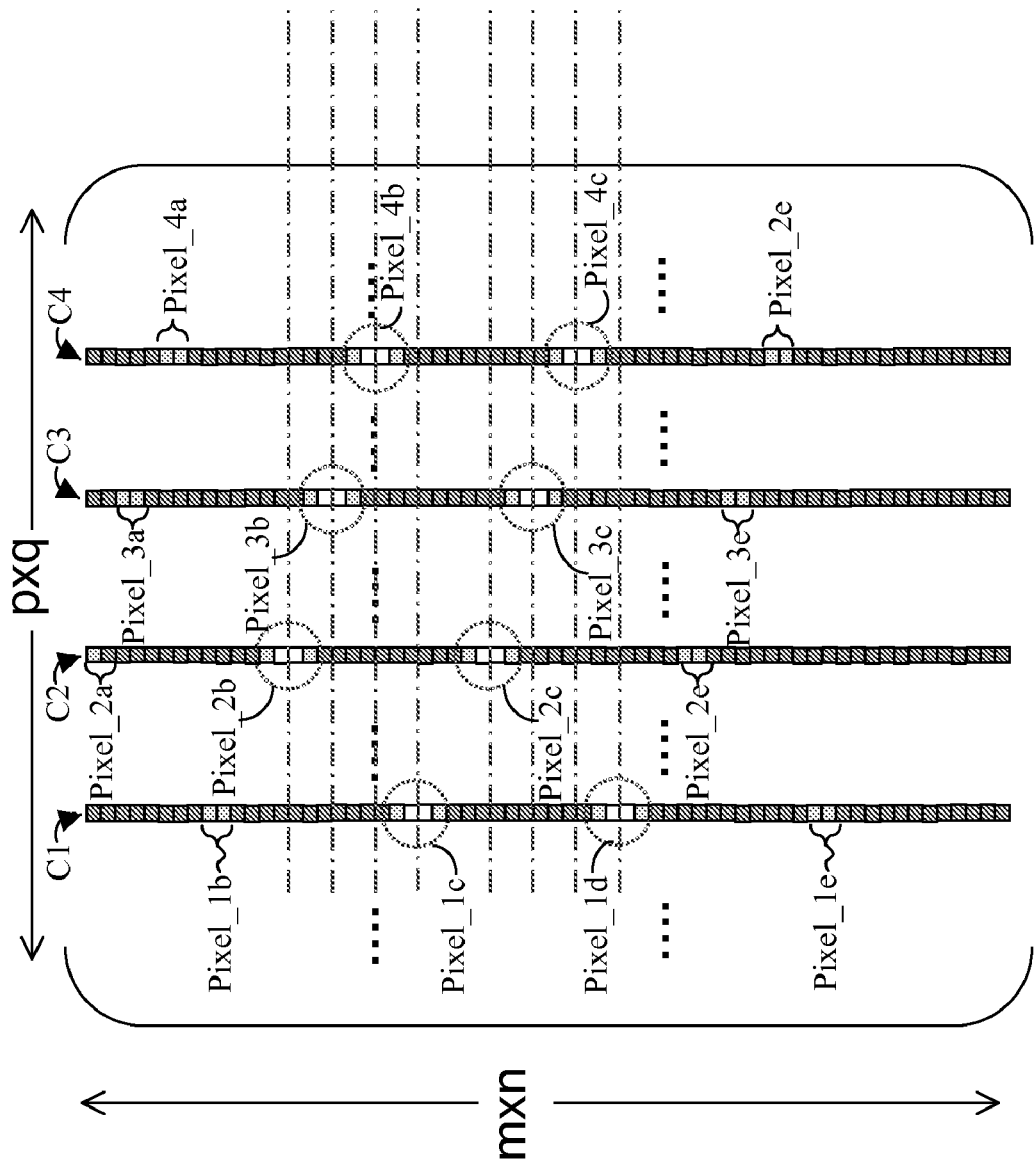
FIG. 14 is an example of a process in accord with the present invention for imposing the display constraint on an arbitrary scene.

An example of this is shown in FIG. 14, where four columns C1 to C4 of a light transport matrix T are shown adjacent each other. In column C1, circles Pixel_1$c$ and Pixel_1$d$ identify the brightest parts (i.e. the center parts) of a first pixel's light footprint that is recorded as an image within column C1. As shown, the full light footprint includes other less bright pixel groups Pixel_1$b$ and Pixel_1$e$. However, for ease of explanation, only the brightest parts of each light footprint within each column C1-C4 is identified by circles since the circles identify those pixel coefficient entries that will be retained in construction of a modified (i.e. estimated) light transport matrix T. As was shown in FIG. 13, the brightest part of any one light footprint does not overlap with the brightest part of any other light footprint. Thus, if the dimmer, perimeter sections of a light footprint (i.e. pixel groups Pixel_1$b$ and Pixel_1$e$) are ignored to form a resized light footprint, then it can be assured that no overlap will exist between the resized light footprints. As is shown in FIG. 14, if one compares adjacent circled groups of pixels along adjacent columns, one will note that none of the circled pixels in adjacent columns overlap. For example, partial light footprint Pixel_1$c$ in column C1 is offset in the horizontal direction from partial light footprint Pixel_2$c$ in column C2, which in turn is offset from partial light footprint Pixel_3$c$ in column C3, which is likewise offset from partial light footprint Pixel_4$c$ in column C4, and so on. Similarly, none of the other bright partial light footprint circled sections (i.e. Pixel_1$d$, Pixel_2$b$, Pixel_3$b$, and Pixel_4$b$) within each column line up with each other in the horizontal direction.

Since by the Display Constraint light from different projector pixels will mostly hit different camera pixels, most column entries have zero-value entries, except those corresponding to a light footprint defining camera pixels hit by light emitted from a corresponding projector pixel. This means that if two columns of T are placed next to each other, the non-zero entries will not line up most of the time, and their dot product will be close to zero. This implies that the columns of T are orthogonal to each other.

This is particularly true if the dim perimeter parts of a light footprint are ignored, and one works with the resized light footprints consisting of only the brightest sections of a light footprint. In this case, columns of T become truly orthogonal to each other, meaning that that the transpose of a specific column multiplied by any column other than itself will produce a zero result.

Figure 15:
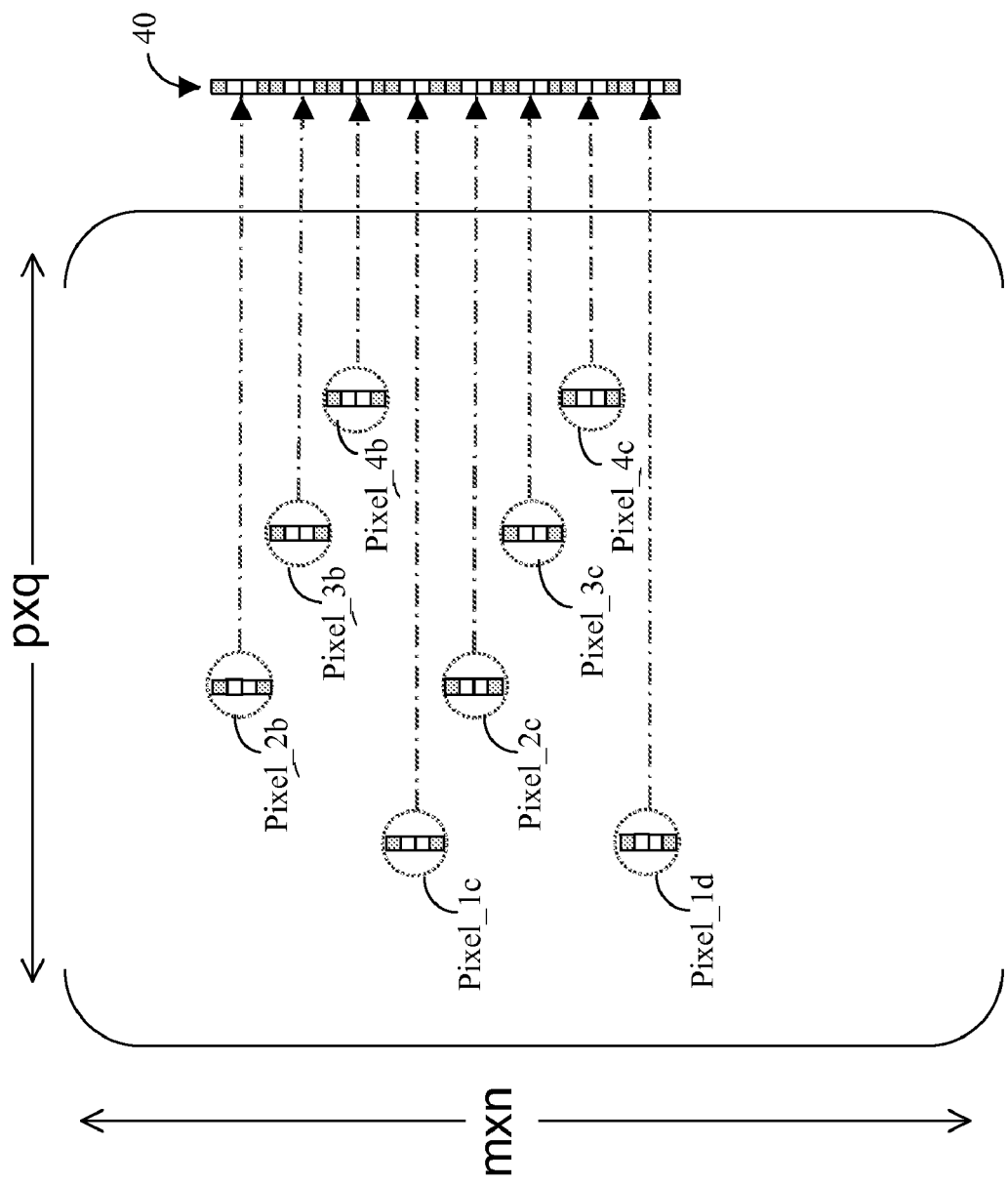
FIG. 15 is a further step in the imposing of the display constraint as introduced in FIG. 14.

Thus, the orthogonal nature of T may be assured by the way in which T is constructed in the above-described process for generating a modified T. As is explained above, the amount of memory necessary for storing T is likewise reduced by storing only nonzero values within each column. In the modified T, this process is simplified because the nonzero values to be stored can be quickly identified by storing only the brightest value within each row of light transport matrix T, which automatically creates resized light footprints. For example in FIG. 14, one may identify the brightest pixels along rows of T (i.e. among adjacent image information corresponding to separate projector pixels and arranged in adjacent columns of T) as indicated by circles Pixel_1$c$ to Pixel_4$c$, Pixel_2$b$ to Pixel_4$b$ and Pixel_1$d$. If only the brightest valued entry within each row is retained, one obtains the structure of FIG. 15. The identified bright sections may then be combined into a vector representation 40 of modified matrix T (hereinafter light transport matrix T and modified light transport matrix T are used interchangeably, unless otherwise stated). As shown, vector representation 40 removes any overlap between adjacent columns of T by limiting itself to only the brightest pixel values within each row of T, and effectively imposes the Display Constraint on an arbitrary scene. Consequently, this construct of T is orthogonal, by design. It is to be understood that to fully define modified light transport matrix T, one only needs a second matrix column, or second array, to hold index information indicating which groups of partial light footprint sections belong to the same resized light footprint. In the present case, for example, groups Pixel_1$c$ and Pixel_1$d$ are part of a single resized light footprint corresponding to a first pixel. Similarly, light footprint sections Pixel_2$b$ and Pixel_2$c$ together form a second resized light footprint for a second pixel, and so on.

To determine an approximation to the inverse of T (i.e. to determine an approximation to inverse matrix $T^{-1}$), it is beneficial to first note that $AA^{-1}=I$, and that the identity matrix I is comprised of a matrix having entry values set to a value of "one" (i.e. 1) along a diagonal from its top left corner (starting at matrix location (1,1)) to its bottom right corner (ending at matrix location (r,g)), and having entry values set to "zero" (i.e. 0) everywhere else. In order to compute $T^{-1}$, one first defines a matrix $\check{T}$ such that each column in $\check{T}$ is comprised of normalized values, with each column in $\check{T}$ corresponding to a column in light transport matrix T (or equivalently, to a column in the modified light transport matrix). That is, $$\check{T}r = Tr/(\|Tr\|)^2, \ r=1,2,3,\ldots,pq$$

where $\check{T}r$ is the $r^{th}$ column of $\check{T}$. Since matrix operation $\|Tr\|$ defines the square root of the sum of the squares of all values in column r of matrix T, the square of $\|Tr\|$ is simply the sum of the squares of all the values in column r. That is, $$(\|Tr\|)^2 = \left\{ \sum_{\varepsilon=1}^{\varepsilon=g} (Tr_\varepsilon)^2 \right\}$$

By dividing each value entry in column r by the sum of the squares of all the values entries in column r, operation $\{Tr/(\|Tr\|)^2\}$ has the effect of normalizing the value entries in column r of matrix T. If one now takes the transpose of $\check{T}r$, i.e. flips it on its side such that the first column becomes the top row and the last column becomes the bottom row, the result will be rows of elements that are the normalized values of corresponding columns of elements in T. Therefore, for every column in T, one has the following result:

$$(\check{T}r^T) \times (Tr) = 1$$

and $$(\check{T}r^T) \times (T\omega) = 0, \text{ for } r \ne \omega$$

In other words, multiplying a column of T with a corresponding row in $\check{T}r^T$ always results in a value of 1, and as one multiplies all the columns in T with the corresponding row in $\check{T}r^T$, one produces a matrix with numeral 1's along its diagonal, and one may place zeroes everywhere else to fully populate the produced matrix.

Therefore, in the case of matrix T, where columns are (or are made) orthogonal to each other, and given the specific construction of matrix $\check{T}$, it has been shown that the transpose of $\check{T}$ is equivalent to the inverse of T (i.e. $\check{T}^T = T^{-1}$), by definition, or at least $\check{T}$ is a left multiplicative inverse of T. Therefore, Rprjct=$\check{T}^T$ Rcptr.

Note that only the part of the projector pixels that actually hit the camera sensor can be recovered. For the projector pixels not hitting any of the camera pixels, the corresponding columns in T contain zeros and the above equation of $\check{T}r = Tr/(\|Tr\|)^2$ is undefined. In such cases it is preferred that the corresponding columns in $\check{T}$ be set as zero columns. Thus, $\check{T}^T$ is the inverse of the part of T that covers the overlapping area of the field-of-views of the projector and the camera. It only recovers the projector pixels in Rprjct that fall in the overlapping area and blacks out the other pixels.

In the following discussion, matrix $\check{T}^T$ is called the View Projection matrix, such that given a desired view c, one can find an image p defined as p=($\check{T}^T$c) such that projecting image p produces a scene which, when viewed from the reference camera location, has the same appearance as c. Since $\check{T}^T$ is effectively an approximation of inverse matrix $T^{-1}$ (or a modified version of matrix $T^{-1}$ created by imposing upon it the display constraint) and is used as such herein, for the rest of the following discussion inverse matrix $T^{-1}$ and View Projection matrix $\check{T}^T$ may be used interchangeably, unless otherwise indicated. In this case, it is to be understood that the symbol $T^{-1}$ generally represents the inverse of both the unmodified and the modified (i.e. approximated) forms of the light transport matrix T since its modification is optional, for ease of use.

Although an efficient method for computing an approximation of true inverse matrix $T^{-1}$ has been demonstrated, in its raw form, inverse matrix $T^{-1}$ is still a staggeringly large matrix, requiring large amounts of storage and of course significant computation power just to perform matrix multiplication. Again, approximation of the true inverse matrix $T^{-1}$ is subject to the Display Constraint.

Therefore, it is advisable to apply to View Projection matrix $\check{T}^T$ a similar compacting technique as is described above for reducing transpose matrix $T^T$. In this manner, View Projection matrix $\check{T}^T$ may be reduced to a representation consisting of a first column of nonzero entries and a second column of corresponding index values. Recall that the Display Constraint dictates that the non-zero entries in the distinct columns of T do not line up on the same row. This means that on each row of T, there will only be one non-zero entry (or one entry above a predefined threshold value) and one need only store that entry along with its column index in order to represent the entire matrix T (with the understanding that any non-stored T entry location is designated with a zero value, by default). Consequently, the space needed to store T can be reduced down to that of a single column of nonzero T entries plus a second column of index values.

In a real world setting, however, many of the unlit entries of T (i.e. those camera pixels i not within a light footprint) will not be exactly zero due to sensor noise (i.e. light picked up by a camera pixel, but which does not originate from a singularly designated, i.e. turned ON, projector pixel). Thus, there may be multiple non-zero values in each row, with one non-zero value entry corresponding to a light footprint and the remaining non-zero entries being due to light noise. In such cases, it is likely that the one non-zero entry corresponding to a light footprint is will have the highest value in the row (i.e. have the brightest value). Therefore in order to filter out light noise, the maximum valued entry in each row (i.e. the row-maximum value) may be identified and designated as the one non-zero entry for that row that corresponds to a light footprint. This eliminates any low valued entries due to light noise. By identifying these row-maximum entry values, one obtains the non-zero values of each column. Therefore, for each projector pixel, one identifies the corresponding set of camera pixels, along with the distribution of light intensity among these camera pixels. Typically, this set of corresponding camera pixels (associated to any given projector pixel) is a very small subset of the entire camera image. Since only the entries from these corresponding camera pixels need to be considered during matrix operations, performing view projection image transformation using this sparse matrix representation is very efficient.

In practice, it is preferred to use a fixed pattern scanning technique, which exploits the Display Constraint to speed up the process. As is explained above, the contribution from a projector pixel j maps to column j of the light transport matrix T. It follows that a set of projector pixels $S1 \subset \{1, \ldots, p \times q\}$ maps to a corresponding set of columns in T. Considering two such sets of pixels S1 and S2 where $S1 \cap S2 = \{j\}$, let the two images captured when turning on the two sets of pixels be $C_{S1}$ and $C_{S2}$. It can be shown that $$Tj \approx MIN(C_{S1}, C_{S2})$$

where Tj is the $j^{th}$ column of T. $C_{S1}, C_{S2}$ are the sum of the respective columns of T, i.e. $C_S = \Sigma_{j \in S} Tj$. Given that the contribution of each individual projector pixel j is mapped to distinct parts of the camera sensor, there is a common set of pixels $l \subset \{1, \ldots, m \times n\}$ in the captured images $C_{S1}, C_{S2}$ that corresponds to projector pixel j. Now, as $S1 \cap S2 = \{j\}$, for the rest of the captured image pixels $\notin l$, at least one of the images would not have received light from one of the projector pixel sets, S1 or S2. Since pixels receiving light will be brighter than pixels not receiving light, MIN($C_{S1}$, $C_{S2}$) renders an image where only pixels∈l are lit, which is a good approximation of Tj.

This implies that if one can construct sets

Y1, ..., Yp, X1, ..., Xq, where $\forall i \notin \{1, \ldots, (p \times q)\}, \exists X_p Y_k | X_j \cap Y_k = \{i\}$, one can synthesize Tj where j=1, ..., p×q from images $C_{X1}, \ldots, C_{Xq}$ and $C_{Y1}, \ldots, C_{Yp}$.

In the above discussion, each pair of projected images has only one intersection point in common. One construction that satisfies this property uses the following pixel coordinates as indicators: let Xj be an image creating by turning on only those pixels whose x-coordinate is equal to j, and Yk be an image created by turning only those pixels whose y-coordinate is equal to k. Then MIN(Xj, Yk) gives an image with coordinates (j, k) turned ON. Using this method, capturing p+q images allows one to synthesize all p×q columns of T. It should be noted that while this method for capturing T is faster than capturing each pixel individually, and simpler than the adaptive scheme described in the reference to Sen et al., 2005, discussed above, this method may still be slower than other schemes previously proposed in the literature. In particular, a method for establishing projector-camera pixel correspondence is to project the X and Y coordinates in time sequential binary codes, in theory allowing all correspondence to be captured in log(N) time, where N is the maximum coordinate value. In practice, this method places stringent requirements on the camera sensor resolution, especially when the least significant bits are being projected. One may also propose to project multiple stripes simultaneously to cut down the number of images needed. This however requires some way to identify each of the stripes captured in an image, e.g. specifying a subset of landmark stripes or exploiting color coding or other distinguishing patterns. These schemes may indeed speed up the capture process, however they introduce additional complexity and brittleness, and often one needs to tweak the feature detection parameters so the schemes work correctly. In the presently preferred embodiment, there are no parameters to be tweaked and unless there is a hardware failure, a one-time capture typically yields a good copy of a view projection matrix.

As is explained above, the view projection matrix, $\check{T}^T$, is capable of compensating for geometric and photometric distortions introduced by projection optics, display surfaces, and their relative positioning. The efficacy of the view projection capabilities of $\check{T}^T$ was tested by means of a number of experiments.

Figure 16:
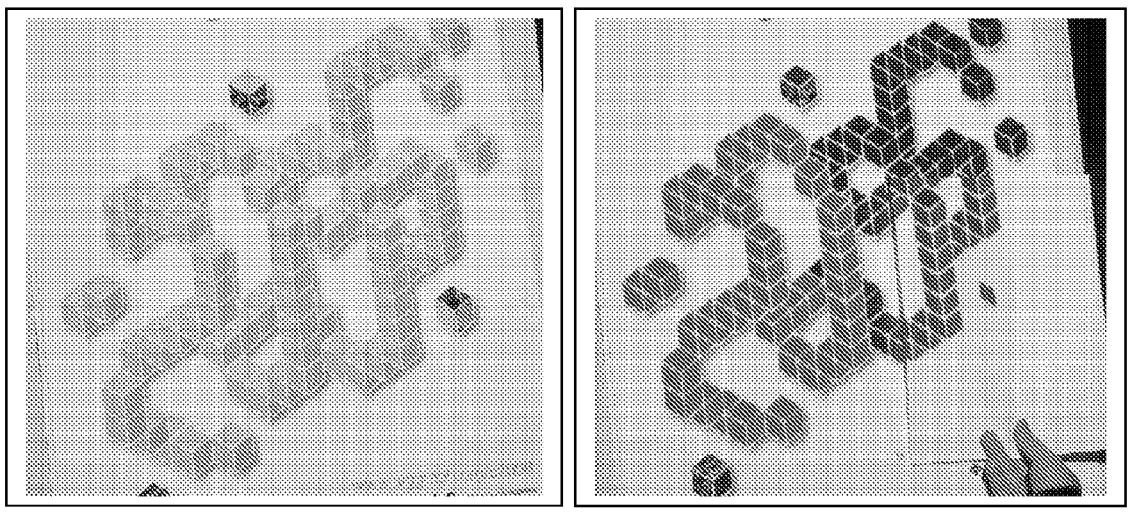
FIG. 16 is an example of the present invention being applied to color compensation in poster images.

To illustrate that one can control the desired appearance of a scene, it was shown that one can dynamically change the appearance of a printed poster. An example is shown in FIG. 16. The Poster image on the left is shown under white light. The poster image on the right is shown under view projection illumination. The faces of the cubes are made to appear to have the same color. A sheet of white paper placed over the poster image on the right reveals the actual projected image used to produce this desired view. It was found that viewers quickly lose track of the original appearance of the poster after seeing the animation. While it is difficult to show in a paper, this scene as observed by the camera is quite close to that observed by the human eye. The poster was animated by cycling the colors in the poster and making the colors appear uniform. Movies were also shown over the poster while photometric compensation took place in real time to eliminate all traces of the underlying poster image.

Figure 17:
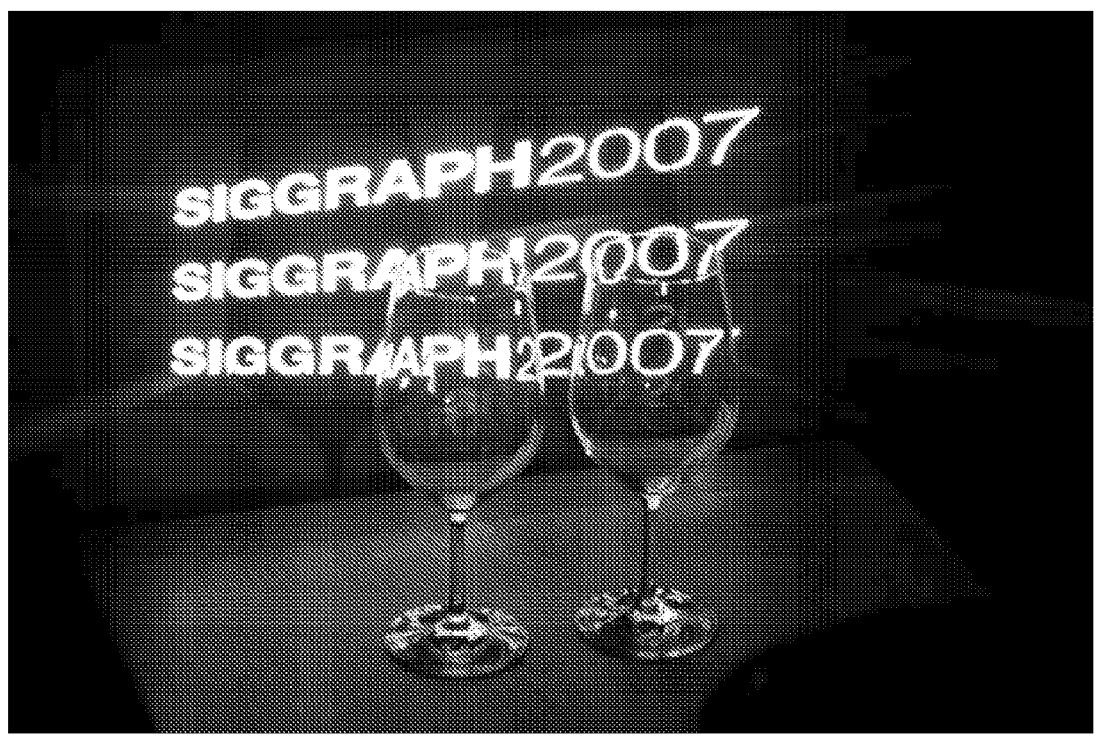
FIG. 17 shows the projection scene of FIG. 12, but with the present invention's method of compensating for light distortion applied.

As mentioned earlier, the presently preferred construct of transport matrix T depends on the Display Constraint, which stipulates minimal overlap between adjacent light footprints resulting from adjacently lit projector pixels. An example of a situation where the Display Constraint is not upheld is discussed above in reference to FIG. 12, where two wine glasses are placed between a projector and a projection surface, or scene. As is further explained above, however, the view projection matrix $\check{T}^T$ can enforce (i.e. impose) the Display Constraint on an arbitrary scene by selecting only the brightest pixel within each row of T in the creation of an approximation of the inverse of T. In order to test the efficacy of the algorithms of the present invention under various conditions (not just only under the Display Constraint, from which they derive their efficiency and justification) an experiment was conducted to determine how they behave when the Display Constraint is not satisfied. The experiment illustrated in FIG. 12 was set up with the pair of wine glasses placed between the projector and its display surface. Due to the significant amount of distortions introduced by the glassware, there is much overlap between the sensor light footprints of distinct projector pixels. To this scene was then applied the same acquisition method and same algorithms for enforcing the Display Constraint in the generation of the view projection matrix $\check{T}^T$. It was found that the computed view projection matrix $\check{T}^T$ was able to remove most of the unwanted distortion and allow the projector to display a corrected image on the designated display surface, as shown in FIG. 17.

Stated differently, when the Display Constraint cannot be guaranteed, the method of generating view projection matrix $\check{T}^T$, which forces a pseudo Display Constraint on a projection environment, can be applied to the generation of the light transport matrix T. Specifically, when generating the simplified light transport matrix T, as described above in reference to FIGS. 13-15, one may select the brightest pixel in each row to identify components of a light footprint, whereby light diffusion error and light noise error can be greatly reduced or eliminated.

Having defined a method for approximating the inverse of light transport matrix T, it will now be shown how dual photography can be used with an immersive display system to achieve advanced and complex setups.

Figure 18:
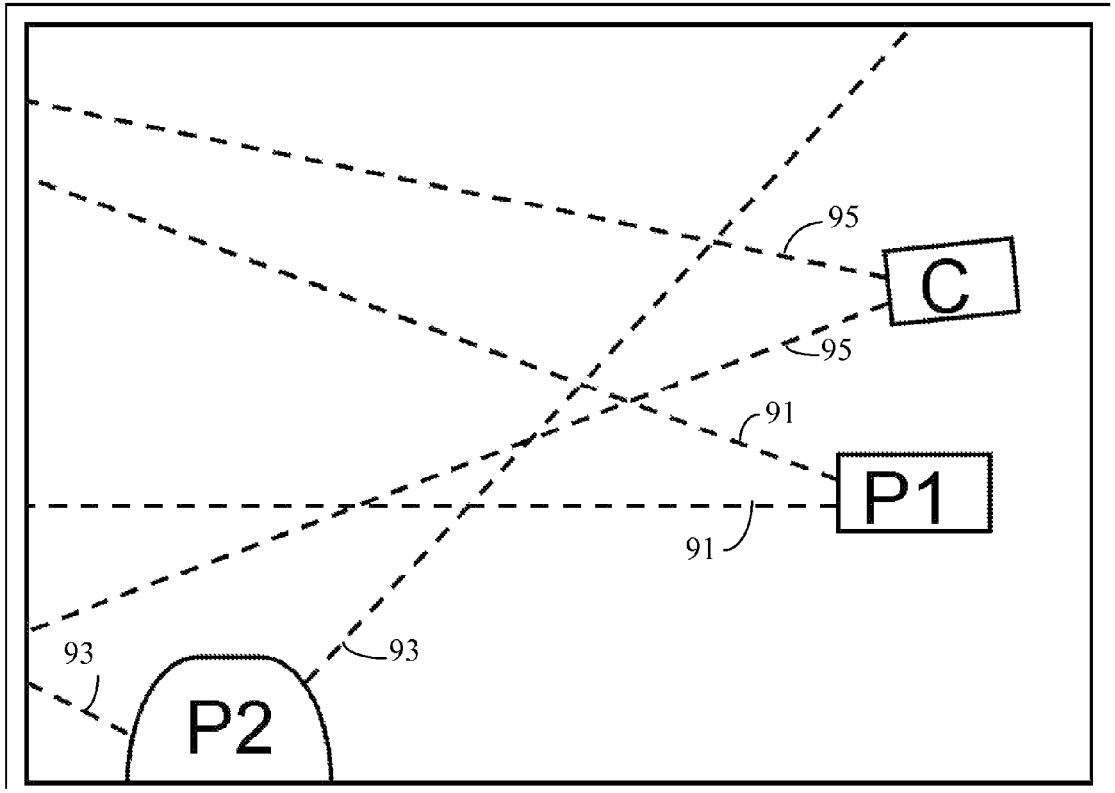
FIG. 18 is an exemplary projection setup for using dual photography to create an immersive display system.

With reference to FIG. 18, in a preferred embodiment, a conventional front projector P1 (similar to real projector 21 of FIG. 2A) is used in conjunction with an immersive projector P2. As indicated by field-of-view (i.e. FOV) 91, in the presently preferred embodiment, the portion of a display surface covered by the FOV 91 of front projector P1 is a subset of the field-of-view of immersive projector P2, as indicated by field-of-view lines 93. Since FOV 91 of front projector P1 is entirely within the scope of FOV 93 of immersive projector P2, it would be desirable to have immersive projector P2 simulate the projected image produced by front projector P1. However, it should be emphasized that in general FOV 91 of front projector P1 does not necessarily need to overlap any part of FOV 93 of immersive projector P2.

Although it is not necessary for FOV 93 of immersive projector P2 to overlap part of FOV 91 of front projector P1, it is desirable that two light transport matrices separately associating a camera C to front projector P1 and to immersive projector P2 be created. As it would be understood, the two transport matrices may be generated separately since the FOV's of P1 and P2 do not necessarily overlap.

However, in the specific example of the presently preferred embodiment, camera C is placed such that the FOV 95 of camera C is a superset of FOV 91 of front projector P1 and a subset of FOV 93 of immersive projector P2. As indicated by FOV lines 95, the field-of-vision of camera C completely encompasses FOV 91 of front projector P1, but is entirely engrossed by FOV 93 of immersive projector P2. To simulate a projected image from front projector P1 using immersive projector P2, one first determines a first light transport matrix, $T_1$, relating a first projected image $p_1$ from front projector P1 to a first captured image $c_1$ captured by camera C such that $c_1=T_1p_1$. One then determines a second light transport matrix, $T_2$, relating a second projected image $p_2$ from immersive projector P2 to a second captured image $c_2$ captured by camera C such that $c_2=T_2p_2$. Consequently, one has the following relation $$c_1=T_1p_1$$

and $$c_2=T_2p_2$$

In order to simulate projected image pi from front projector P1 using immersive projector P2, one needs $c_1$ (i.e. the captured, projected image from front projector P1) to be the same as $c_2$ (i.e. the captured, projected image from immersive projector P2), i.e. one needs $$c_2=c_1$$

which lead to the relation:

$$T_2p_2=T_1p_1$$

solving for $p_2$ (i.e. the image projected by immersive projector P2), one obtains the following relation:

$$p_2=(T_2^{-1})(T_1p_1)$$

This means that to create image $p_1$, one can project the image directly using front projector P1, or the same effect can be achieved by projecting a transformed image [defined as $(T_2^{-1})(T_1p_1)$] on immersive projector P2. Note that the view projection matrices naturally convey the projector-camera correspondence into projector-projector correspondence.

Figure 19:
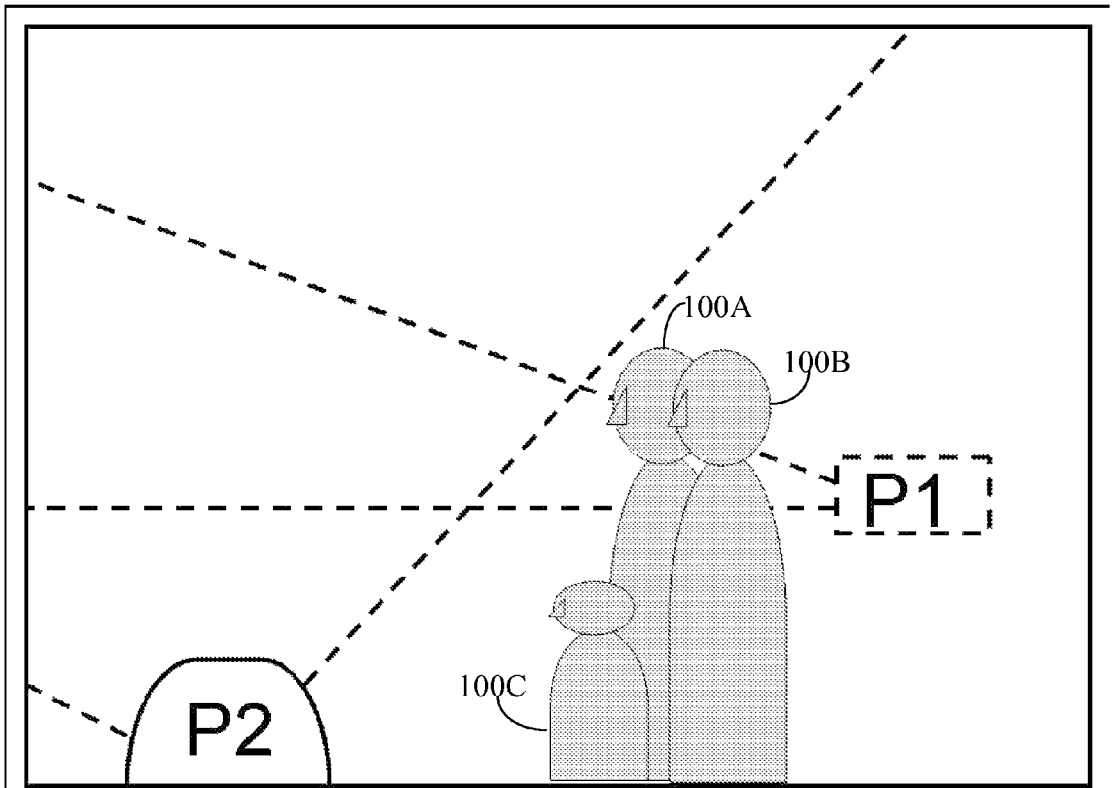
FIG. 19 shows an immersive projector P2 being used to simulate a front projector P1.

Such a projection is shown in FIG. 19, where immersive projector P2 is used to simulate a front projector, such as projector P1 of FIG. 18. In FIG. 19, a virtual projector P1", as simulated by immersive projector P2, is denoted by dotted lines. Therefore, image $p_1$, as projected by front projector P1 of FIG. 18, can be recreated by projecting transformed image $(T_2^{-1})\times(T_1p_1)$ on immersive projector P2 of FIG. 19. By doing so, viewers 100a, 100b, and 100c do not have to concern themselves with occluding any front projector, i.e. P1 or P1". Clearly, the image is distortion free and movie playback on the virtual projector can be run in real time. It is to be understood that $T_2^{-1}$ can be replaced by an approximation matrix $\check{T}^T_2$, as explained above. As stated before, view projection matrix $\check{T}^T$, which approximates an inverse matrix $T^{-1}$, can be freely substituted for $T^{-1}$ in the following discussions, unless otherwise stated.

Figure 20:
FIG. 20 is an example of an image generated using the virtual projector implementation of FIG. 19.

An example of an image generated using this virtual projector implementation is shown in FIG. 20. A front projected image 101 is simulated using a large field-of-view display system. Projector 103, located along the bottom of FIG. 20 is part of the large field-of-view display system, and is used to generate image 101 shown in the center of FIG. 20.

Figure 21A:
FIG. 21A shows the right side of an image projected by a real front projector.
Figure 21B:
FIG. 21B shows the corresponding left side of the image shown in FIG. 21A, but in FIG. 21B, the left side of the image is projected by an immersive projector.
Figure 21C:
FIG. 21C shows the right side image of FIG. 21A joined to the left side image of FIG. 21B.

FIGS. 21A to 21C illustrate the quality of the simulation by showing a real front-projected image (FIG. 21A) and a simulated front-projected image (FIG. 21B) seamlessly coupled together side-by-side (FIG. 21C). FIG. 21A shows the right side of a front-projected image projected by a real front projector, such as P1 of FIG. 18. FIG. 21B shows the corresponding left side of the front-projected image of FIG. 21A, but in FIG. 21B the left side of the front-projected image is projected by an immersive projector, such as P2 of FIG. 19, to simulate a virtual front projector, such as P1" of FIG. 19.

FIG. 21C illustrates the quality of the simulated, left-side, front-projected image created by the immersive projector. In FIG. 21C, the right-side, front-projected image of FIG. 21A is shown joined to the left-side, front-projected image of FIG. 21B. This results in a side-by-side seamless registration of the right-side and left-side images created by a real front projector and a simulated, virtual front projector, respectively.

Figure 22A:
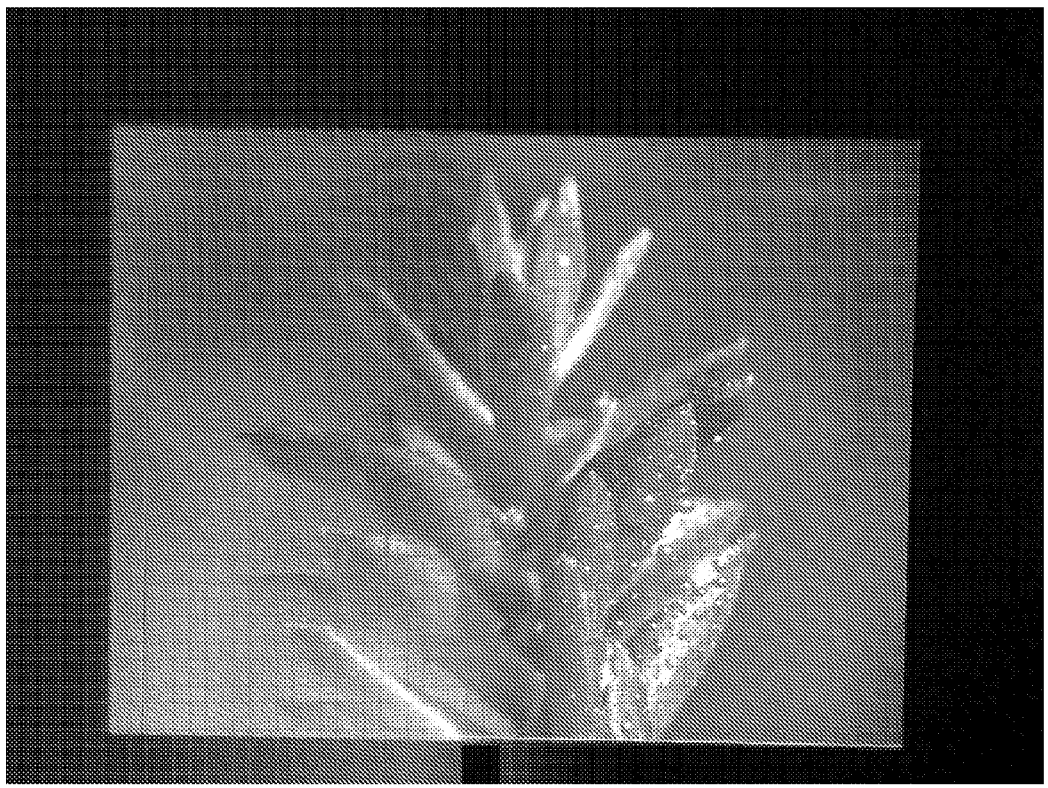
FIGS. 22A and 22B show two additional examples of a left side image generated by an immersion projector joined to the right side image generated by a front projector.
Figure 22B:
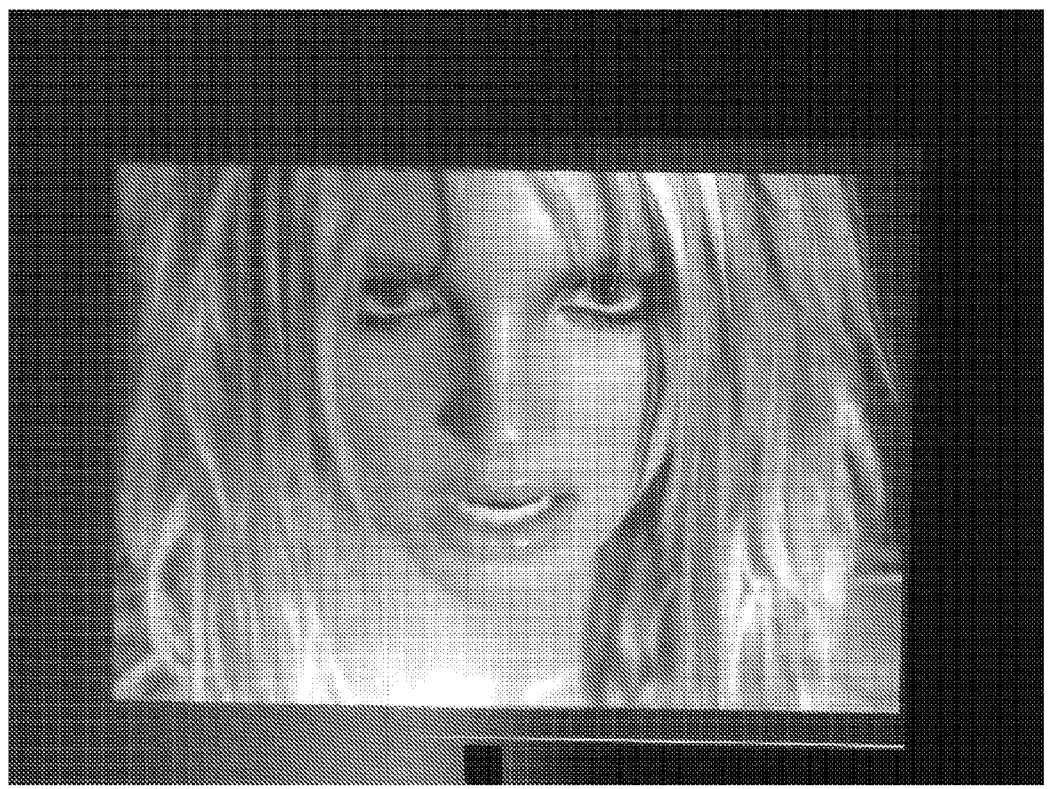

Two additional examples showing side-by-side comparisons of real front-projected images created by a real front projector and simulated front-projected images created by an immersive projector are shown in FIGS. 22A and 22B. In both FIGS. 22A and 22B, the left half of the shown image is created by an immersive projector to simulate a display from a virtual front projector, and the right side half of the shown image is created by a real front projector.

Figure 23A:
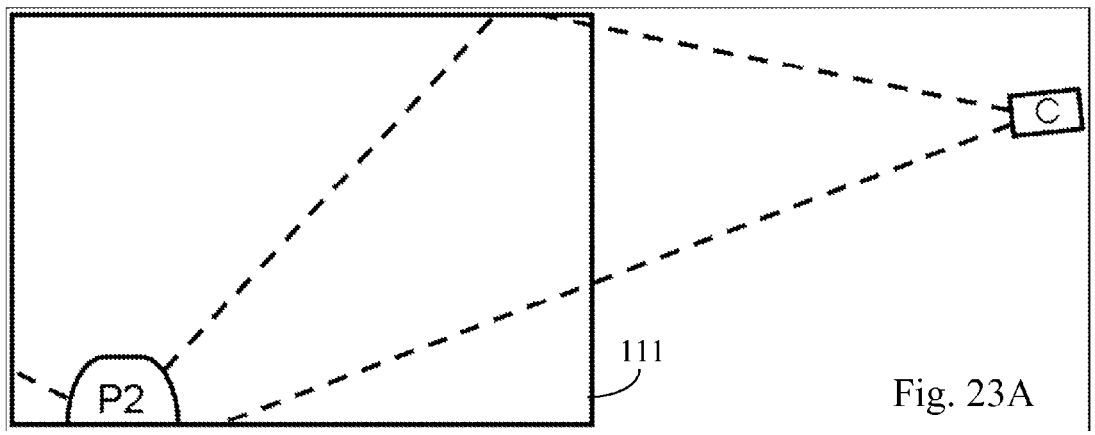
FIGS. 23A to 23C show an alternate application of the present invention to recreate in a real room a virtual image created in a virtual model room.
Figure 23B:
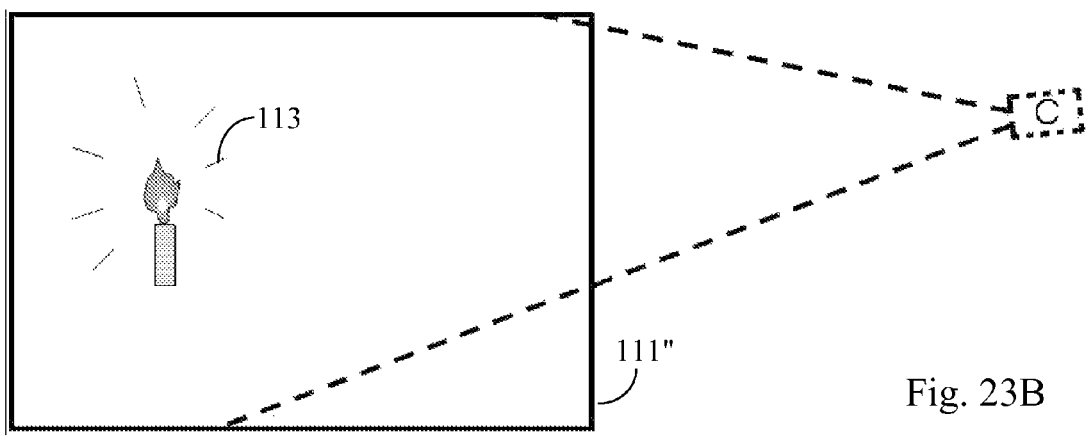
Figure 23C:
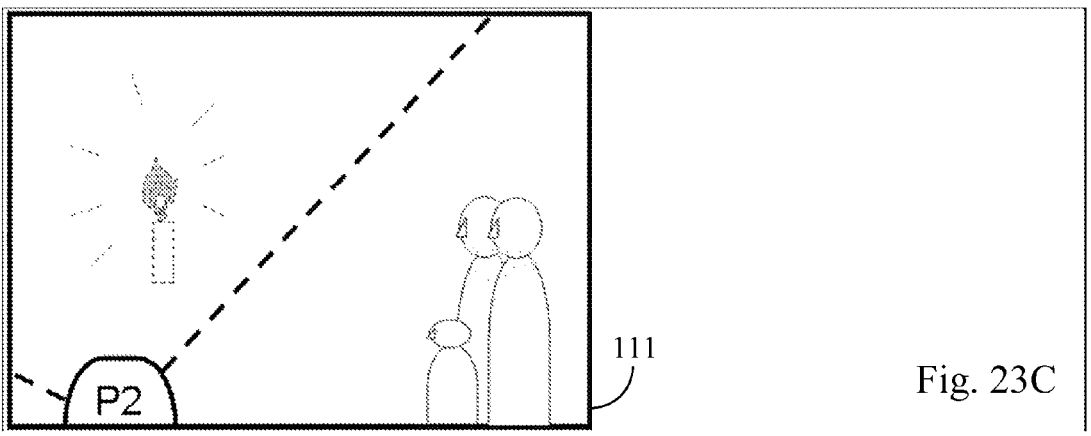

An alternate application of the present technique is better understood with reference to FIGS. 23A to 23C. In the present example, immersive projector P2 of FIG. 23C is used to create various ambient lighting effects (i.e. virtual environments). If the camera is positioned such that its FOV covers a significant portion of the display room, one can use view projection to create an immersive environment where the walls are lit according to a virtual model. To achieve this, camera C is therefore positioned such that its FOV covers a significant portion of a display room 111, as shown in FIG. 23A. In FIG. 23A, camera C and immersive projector P2 are positioned such that the FOV of camera C encompasses most, if not all of (and preferably more than) the FOV of immersive projector P2. In the present example, P2 is shown as an immersive projector, but projector P2 may be any type of a projector, such a front projector. To establish a relationship between camera C and projector P2, a light transport matrix $T_3$ relating camera C to projector P2 is captured, i.e. determined, using any of the methods described above. Once this is done, an image $c_3$ as viewed (i.e. captured) by camera C will be related to a projected image $p_3$, as projected by projector P2, according to the following relationship:

$$c_3=T_3p_3$$

which results in $$p_3=(T_3^{-1})\times(c_3)$$

Consequently, one can build a virtual model of display surfaces of room 111. This constructed virtual model room (i.e. virtual room) 111", shown in FIG. 23B, may be a computer simulation, for example. Once virtual room 111" is created, various simulated lighting effects (or projected images or floating images) may be added to virtual room 111". For example, FIG. 23B shows virtual room 111" being lit by candle light from a large candle 113. The computer model further models the position and resolution of camera C (of FIG. 23A), shown as dotted box C in FIG. 23B. The computer model then "captures" (i.e. creates) a synthetic view $c_3"$ of virtual room 111" from the viewpoint camera C to simulate a real image of virtual room 111" as if it had been captured by real camera C of FIG. 23A. The simulated lighting effects of FIG. 23B can then be recreated in real room 111 of FIG. 23C using P2 by projecting transformed image $(T_3^{-1})\times(c_3")$.

Another application of the present technique is when it is desired to project an image 117 that is bigger than the walls of a real room 111. As was discussed above, various techniques may be used to calibrate a real projector to compensate for the angles of the walls and ceiling to the projection wall of real room 111, but the present embodiment solves this problem using a different approach. In the present example, virtual room 111" of FIG. 23B is assigned dimensions similar to real room 111 of FIGS. 23C and 24, and image 117 is superimposed in an undistorted fashion onto virtual room 111". An undistorted image 117 may be superimposed onto virtual room 111" (i.e. a computer generated room) using any number of known image processing software. A view $c_3$" (i.e. a synthetic captured image) of image 117 without distortion on virtual room 111" from the viewpoint of camera C is then created. Immersive projector P2 is then made to project transformed image $(T_3^{-1}) \times (c_3")$ to recreate the undistorted oversized image 117 on a wall of real room 111.

Figure 24:
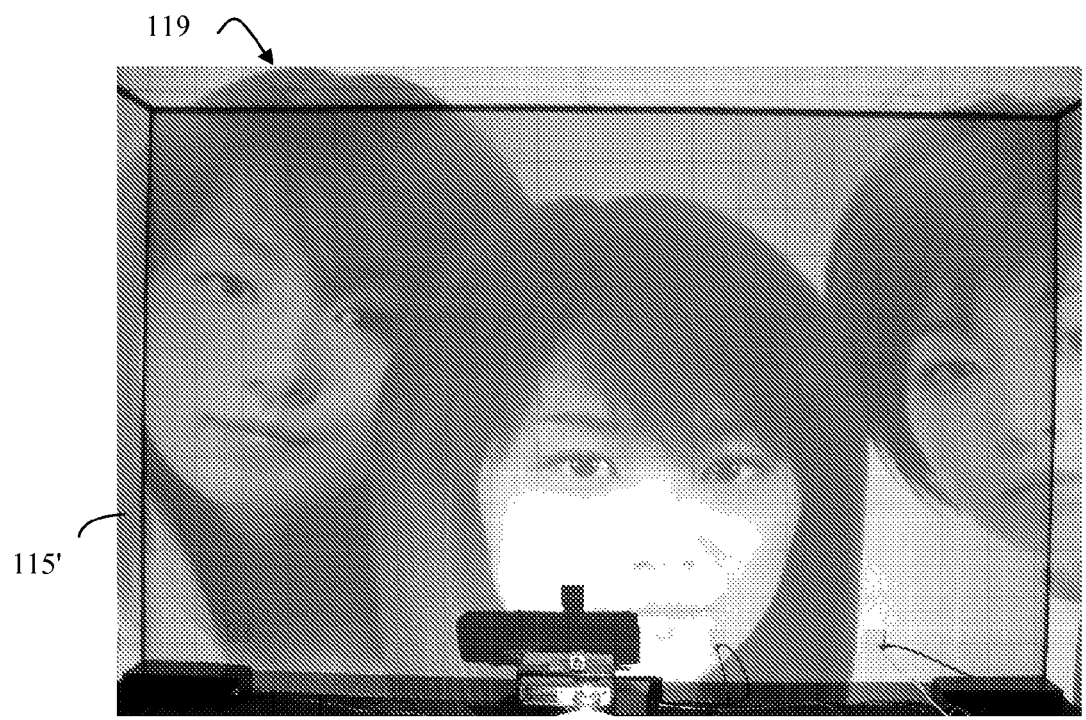
FIG. 24 is an example of the application of the technique of FIGS. 23A-23C to project an image bigger than the projection space in a real room without image distortion.

An example of this technique is shown in FIG. 24, where an image 115' is projected within a room 119 having wall dimensions smaller than the projection dimensions of image 115'. The result is an undistorted projection 115' that does not require calibrating the projector (such as projector P2, above) to compensate for curvatures (or other irregularities) on the projection surface.

As seen, virtual projectors and environments can be combined to create an immersive movie viewer. Since the virtual environment is also an active visual field, one can animate the larger field of view display to create a more engaging experience.

The above-described techniques may be applied to the creation of large field-of-view (i.e. large FOV) displays. A large FOV creates a sense of immersion and provides a more engaging experience for a viewer. The present approach describes an immersive projection system with a very large FOV. The system is also designed with a built-in large FOV camera/light sensor that is able to capture light from the areas covered by projection's FOV. The sensor allows the system to adapt the projected light to optimize image quality and to more generally allow the system to interact with its environment. Although the present system is primarily motivated by the desire to display surround video content, it is important to note that this projection system can also be used to view conventional video content.

Figure 25:
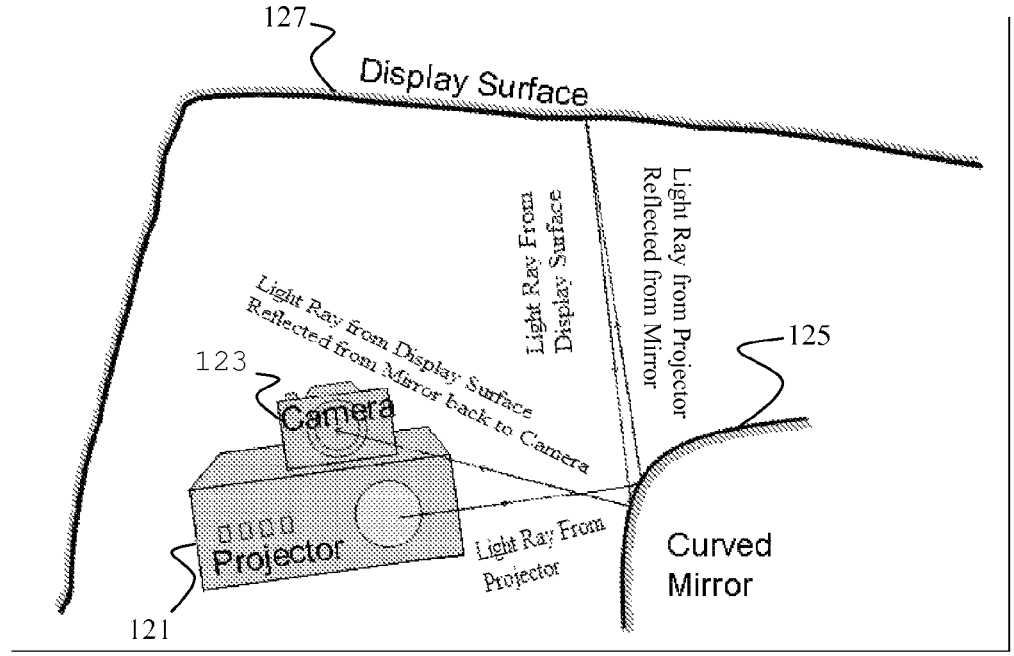
FIG. 25 is an exemplary projection system in accord with the present invention in a minimal form.

With reference to FIG. 25, an exemplary projection system in accord with the present invention in its minimal form consists of the following components: a projector 121; a camera 123, which can be a digital still camera or a digital video camera; curved mirror 125, which can be spherical or otherwise; and mounting mechanisms for the above components. Light from projector 121 is reflected off curved mirror 125 before reaching a display surface 127, which can be any surface, including building walls, floors, ceilings, and dedicated projection screens. Display surface 127 can also be arbitrarily shaped. Reflecting the projected light off the curved mirror enlarges the projector FOV. Light rays from the environment, which may or may not have originated from the projector, also reflect off the curved mirror 125 before reaching the camera. This similarly enlarges the camera FOV.

Figure 26:
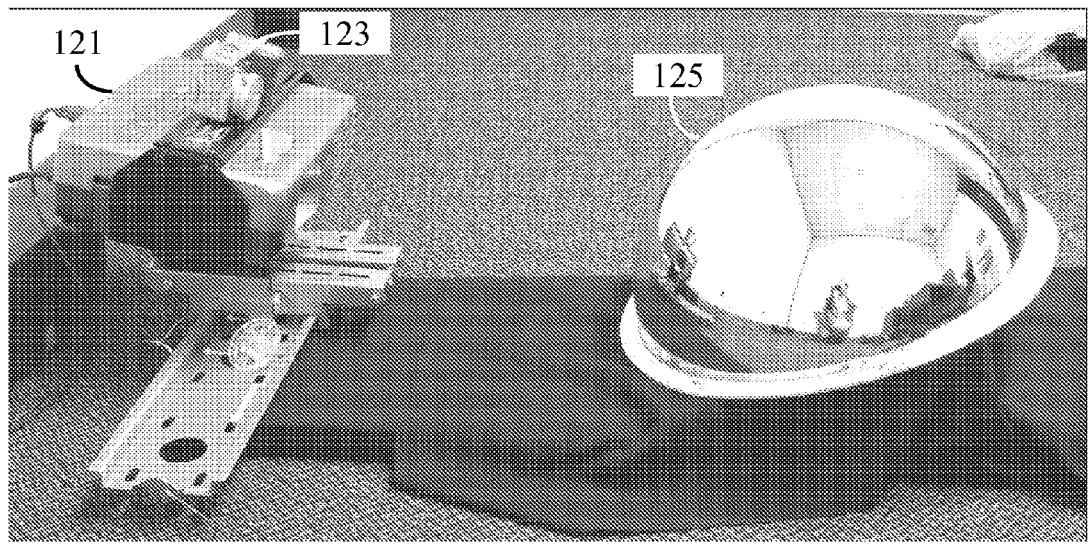
FIG. 26 shows a prototype based on the design of FIG. 25.

FIG. 26 shows an implementation based on the design of FIG. 25. All elements in FIG. 26 similar to those of FIG. 25 have similar reference characters and are described above. The present construction highlights one of the key applications of smart projector-camera systems, which is to build immersive multi-wall virtual environments. Thus, the present example uses a simple panoramic projection setup consisting of a conventional front projector 121, a high-resolution digital still camera 123, and a hemispherical curved mirror 125. In the present setup, curved mirror 125 (which may be termed a 'dome projector') is a low-cost hemispherical plastic security mirror dome of the type used community convenience stores.

This type of mirror dome costs at least three orders of magnitude less than a professionally designed and fabricated optical-grade mirror. Furthermore, the mounting mechanism was also made from inexpensive parts available from typical hardware and building material stores. As such, there is virtually no guarantee of conformance to elegant mathematical models. In experimenting with this construct, it was further found that mirror dome 125 is quite far from a true hemispherical surface (or any simple parametric form, for that matter).

Figure 27:
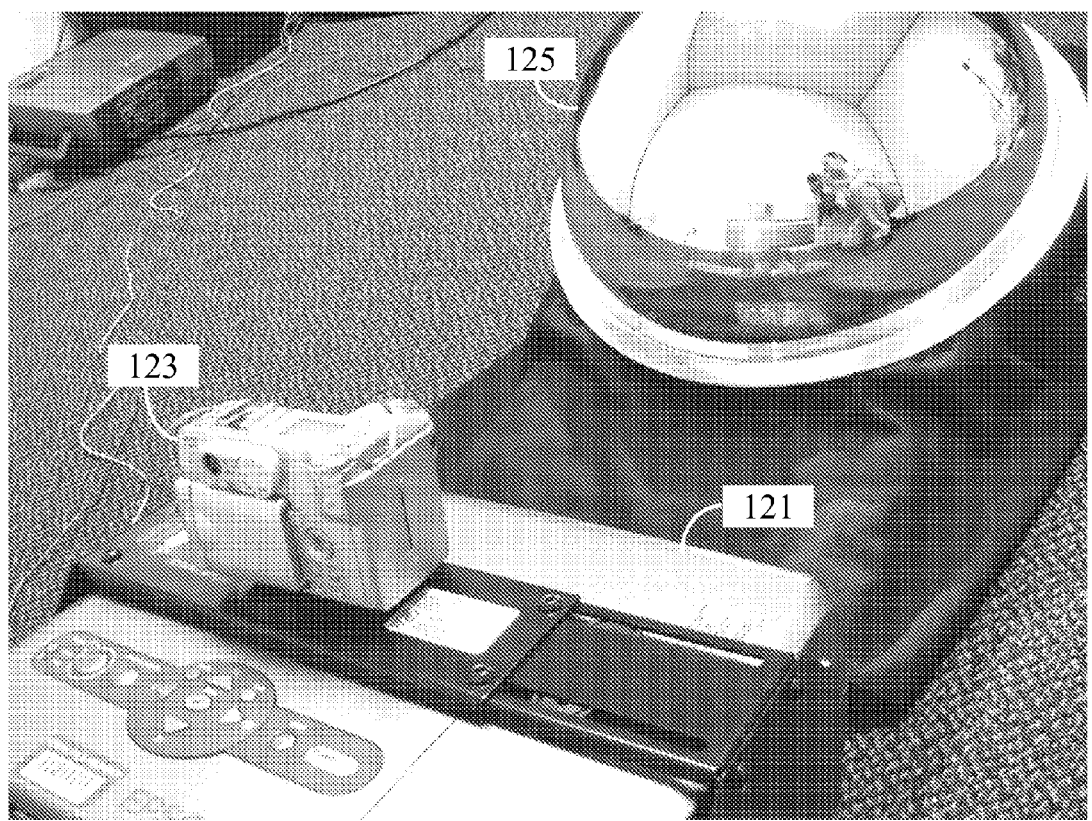
FIG. 27 is an alternate view of the setup of FIG. 26.

FIG. 27 is an alternate view of the setup of FIG. 26, and shows the view of mirror 125 as seen (very roughly) from the viewpoint of camera 123. As can be seen in the reflection of mirror 125 in FIG. 27, camera 123 is able to "see" the floor, at least three vertical walls, and the ceiling by means of the reflection in mirror 125.

Figure 28A:
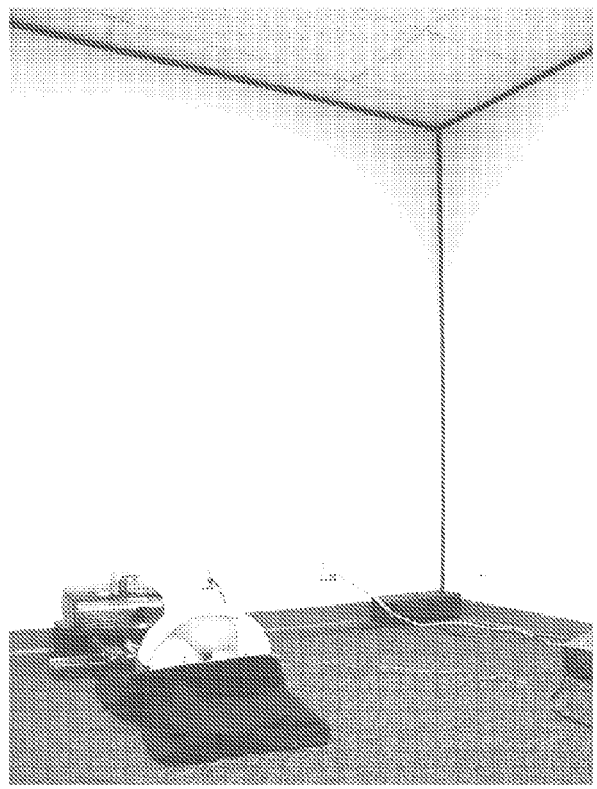
FIG. 28A shows, under ambient lighting, a room with the projection system of FIGS. 26 and 27 installed.

In FIG. 28A, a room under ambient lighting with the present projection system installed. FIG. 29A, an uncalibrated dome projector displays an image of a checkerboard in the room of FIG. 28A. Clearly there is a significant amount of nonlinear geometric distortion in the displayed image. FIG. 29B shows the same setup, but with geometric compensation using the view projection matrix. As the image was shot from the location of the reference camera, straight lines in the view remain straight across multiple walls.

The view projection matrix $\check{T}^T$ also compensates photometrically for the color and intensity variations as well as non-uniformity in the display surface albedo/reflectance properties. FIG. 30A shows an uncalibrated dome projector displaying a uniform intensity image. As can been seen, the resulting image is significantly darker towards the top left and right corners of the front wall. In FIG. 30B, the same uniform intensity image is projected in a calibrated dome projector, which is shown to produce a more uniform intensity.

Having a compact representation for all things necessary for view projection makes it easy to analyze display systems that could be overwhelmingly difficult to calibrate otherwise. It also makes it practical to build these systems and have them precisely calibrated up to the limits of the display and imaging hardware. In this section we illustrate the usefulness of $T^{-1}$ with a few examples using the dome projector, described above, in combination with a front projector. Even using a consumer-level, commodity, panoramic projector like the one used in the present example, however, it was found that the view projection matrix still enabled one to put together compelling, immersive display setups.

It is further to be understood that the present dome projector setup of FIGS. 25-30 can be used in place of immersive projector P2 of FIGS. 18 and 19 to achieve simulation of a front projector, as described above, or in place of immersive projector P2 in FIGS. 23A-23C to create virtual environments, as described above.

Figure 28B:
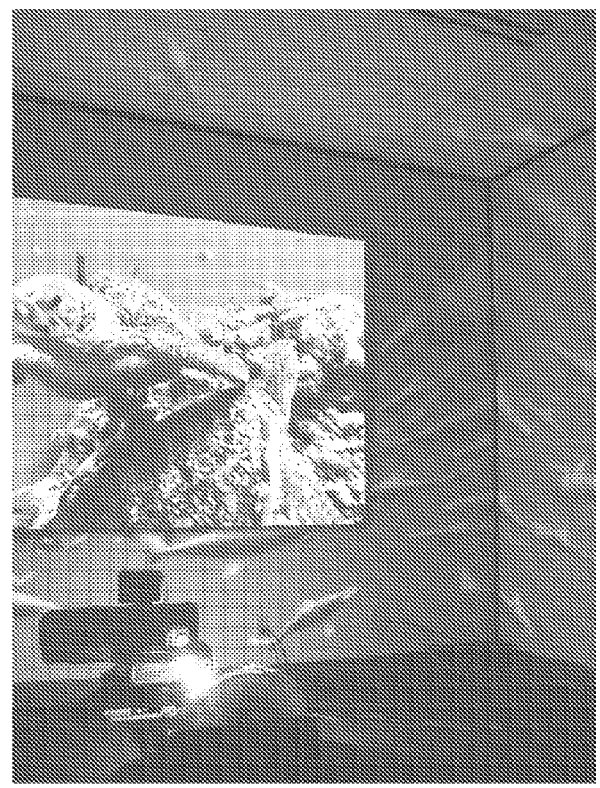
FIG. 28B shows the room of FIG. 28A under immersive projection lighting.
Figure 32:
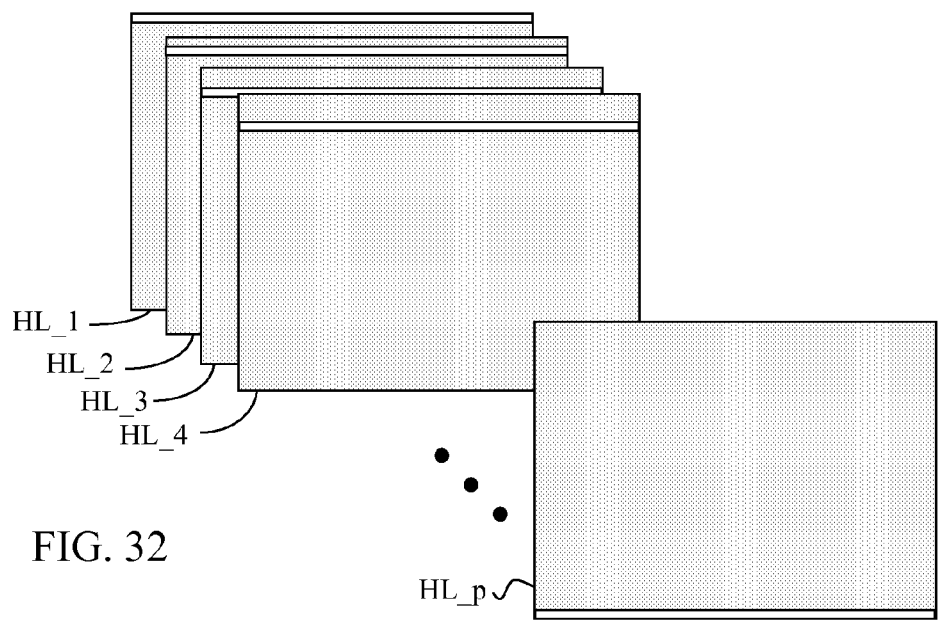
FIG. 32 is a second step in the application of the present invention to a dome mirror projector.
Figure 33:
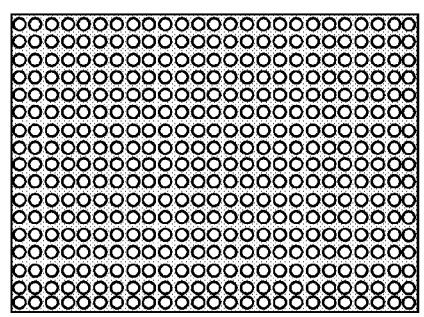
FIG. 33 is a third step in the application of the present invention to a dome mirror projector.

An example of immersive projection lighting created using the present projector-camera system is shown in FIG. 28B. As can be seen, the present projection-camera system is able to project images onto the two walls as well as the ceiling. An example of how this effect can be achieved using the view projection matrix, $\check{T}^T$, is illustrated in FIGS. 31-33.

The view projection matrix $\check{T}^T$ is first generated using any of the methods described above. As is explained above, when a projection surface consists primarily of a flat surface (or conjoined flat surfaces), forty-nine (49) or fewer, reference points may be generated using seven vertical light lines and seven intersecting horizontal light lines to approximate a full view projection matrix, $\check{T}^T$, and still achieve a good level of projector to camera calibration. In this case, the missing matrix entry values may be extrapolated from the 49 reference points since the projection surface is assumed to be flat.

However, since in the examples of FIGS. 25-30, the projection surface consists of a curved mirror, it is preferred that a full view projection matrix $\check{T}^T$ at the resolution of the projector be generated. Since in the present example projector 121 has a resolution of p×q projector pixels, calibration between projector 121 and camera 123 should be achieved by generating p×q light transport reference points.

Figure 31:
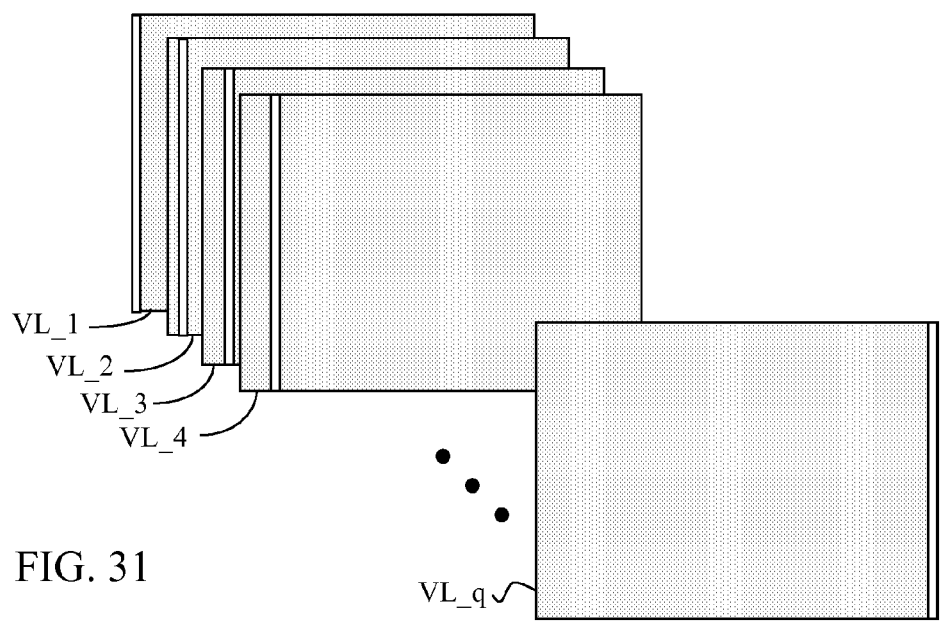
FIG. 31 is a first step in the application of the present invention to a dome mirror projector.

With reference to FIG. 31, projector 121 of FIG. 26 individually projects a series of q vertical lines VL_1 to VL_q onto the projection surface (i.e. mirror 125 of FIG. 26 in the present case), which are individually, and automatically, captured by camera 123 of FIG. 26. In FIG. 32, projector 121 then individually projects p horizontal lines HL_1 to HL_p that are in turn individually, and automatically, captured by camera 123. As is explained above, the captured vertical and horizontal lines are each individually combined to identify their uniquely coincident reference point (i.e. light footprint). This process is continued until all unique intersecting points are identified (shown as white circles in FIG. 33), and their light transport information extracted. It is to be understood that although the vertical and horizontal lines emitted from projector 121 are perfectly vertical and horizontal, the resultant projected lines on dome mirror 125 will follow the curvature of dome mirror 125.

As is explained above, it is preferred that the Display Constraint be enforced in the construction of view projection matrix $\check{T}^T$. Thus, if one has a desired image, C, and wants to determine how to transform a projection image P in order to display desired image C undistorted onto room 111 via mirror 125, one needs to project a distorted version of image C defined as $P=\check{T}^T \times C$.

Figure 34:
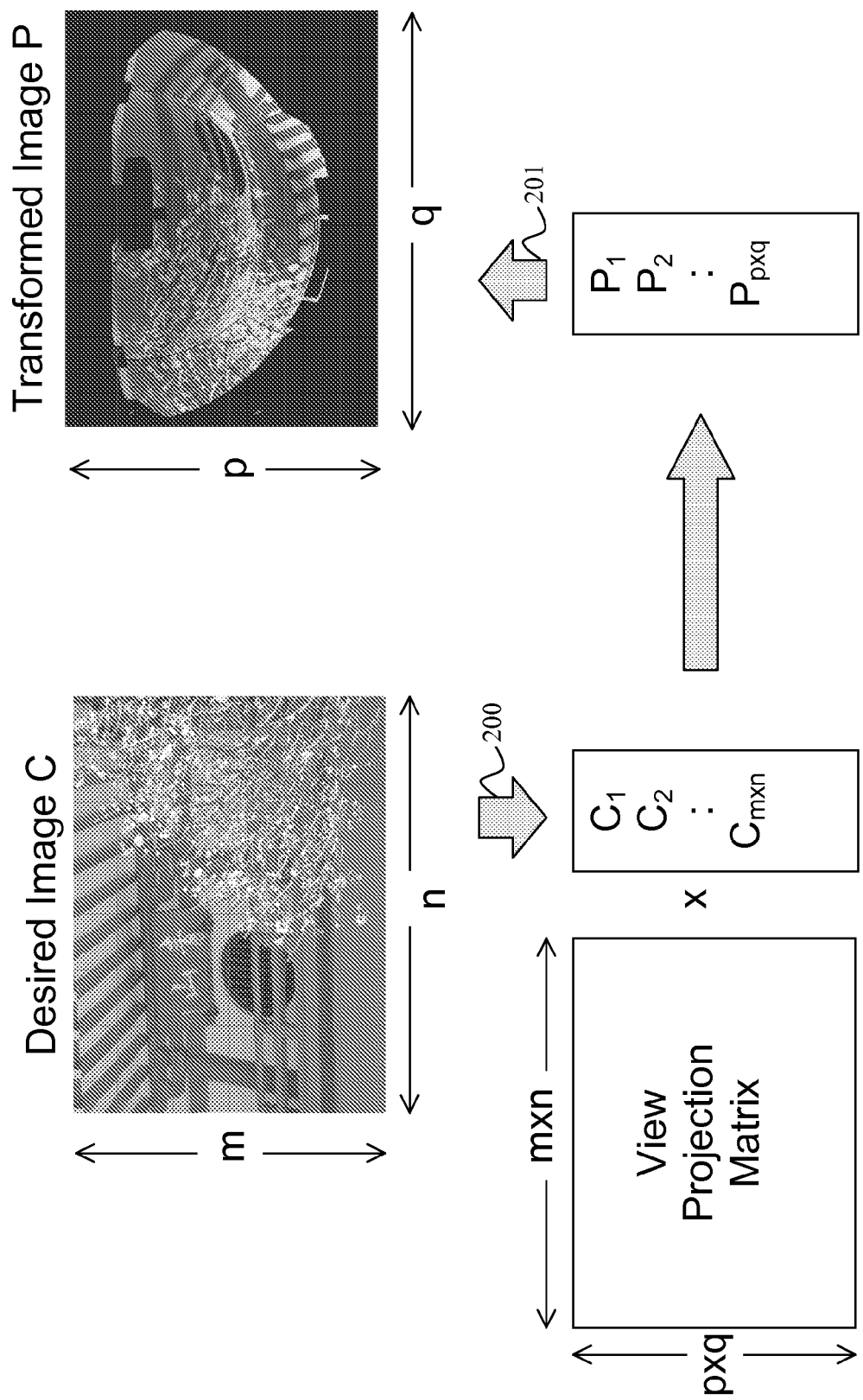
FIG. 34 demonstrates the application of the present invention to a desired image, to produce a precisely distorted image for projection on a dome mirror projector.

This is illustrated in FIG. 34, where Desired Image C is written as a vector 200 consisting of m×n image pixel entry values, $C_1$ to $C_{m \times n}$. Vector 200 is multiplied with the created view projection matrix $\check{T}^T$, which consists of (p×q) rows and (m×n) columns to produce a transformed image P, written as vector 201 and consisting of (p×q) image pixel entry values to be respectively applied their corresponding one of the (p×q) projector pixels of projector 121. The resultant transformed image P is shown to consist of p rows and q columns.

Figure 35:
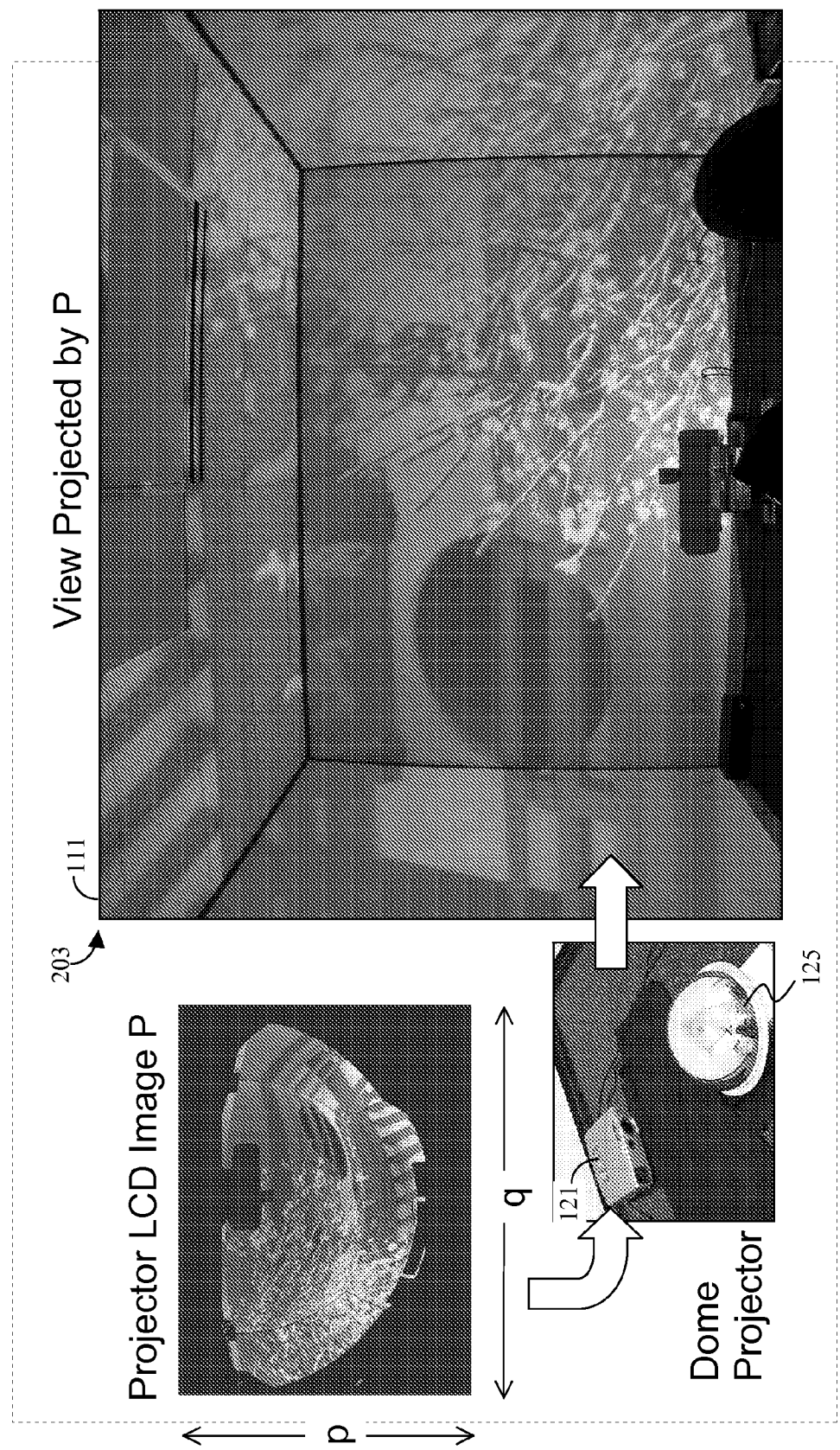
FIG. 35 demonstrates the result of projecting the distorted image of FIG. 34.

With reference to FIG. 35, transformed image P from FIG. 34 is sent to projector 121 as Projector LCD Image P, and is projected onto mirror 125. The resultant image 203 on room 111 is an undistorted representation of Desired Image C of FIG. 34.

It is to be noted that in the present case, camera 123 and projector 121 were not calibrated prior to creating transformed image P. Rather, the distortion of transformed image P inherently compensates for issues related to a lack of calibration between camera 123 and projector 121 due to it having been constructed using view projection matrix $\check{T}^T$, which includes calibration compensating information for the camera-projector pair.

As it would be understood, if the desired image were a video image, then the view projection matrix $\check{T}^T$ would be applied to the video image. That is, since a video image is comprised of a plurality of still images arranged in sequence, one would apply the view projection matrix $\check{T}^T$ transformation to each of the sequenced still images to produce a transformed video projection.

It should further be emphasized that the FOV of projector 121 and the FOV of camera 123 are in general different, and may or may not overlap. When there is a significant overlap in the two FOV's, images captured by camera 123 can be used as feedback for improving the quality of a projected image from projector 121 in a manner similar to those described above. For example, feedback from camera 123 to projector 121 can be used to compensate for variations in the shape and reflectance properties of a display surface (as seen by camera 123) so that a projected image appears as though it were projected on a flat white surface.

The FOV of camera 123 may also include areas not covered by the FOV of projector 121. For example, while the FOV of projector 121 covers the front and side walls of test room 127 shown in FIGS. 28A and 28B, the camera may capture areas outside the projector's FOV, possibly including areas where viewers are located. This allows the system to adapt and interact with viewers by detecting and tracking either the viewers or the viewers' pointing devices. It may be possible for camera 123 to track small lights mounted, for example, on remote controls and facilitate user interaction.

Figure 36:
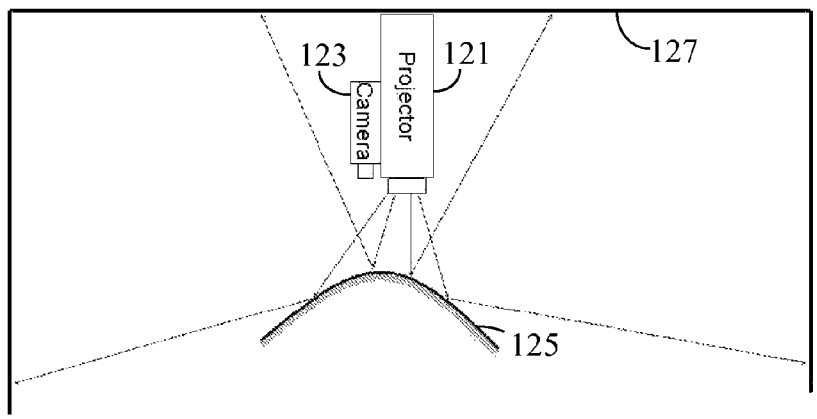
FIG. 36 is an alternative design for ceiling-mounted operation.

With reference to FIG. 36, an alternate configuration based on the construct of FIG. 25 but geared toward ceiling-mounted operation is shown. All elements similar to those of FIG. 25 have similar reference characters and are described above.

Figure 37:
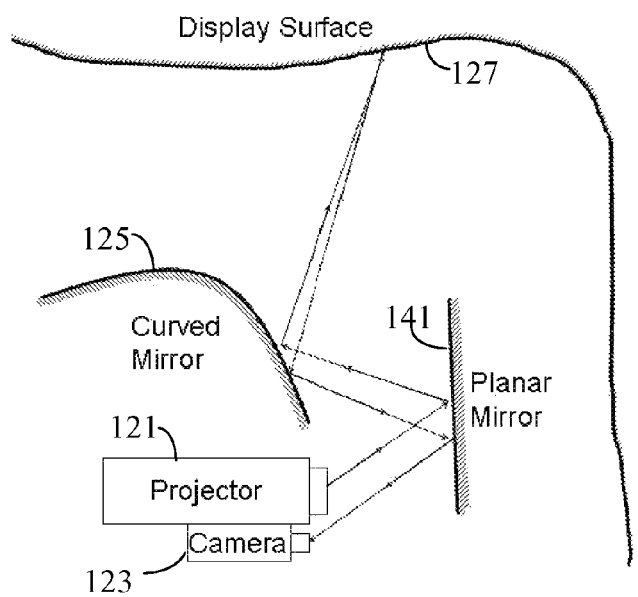
FIG. 37 is an alternate configuration of the present invention.
Figure 38:
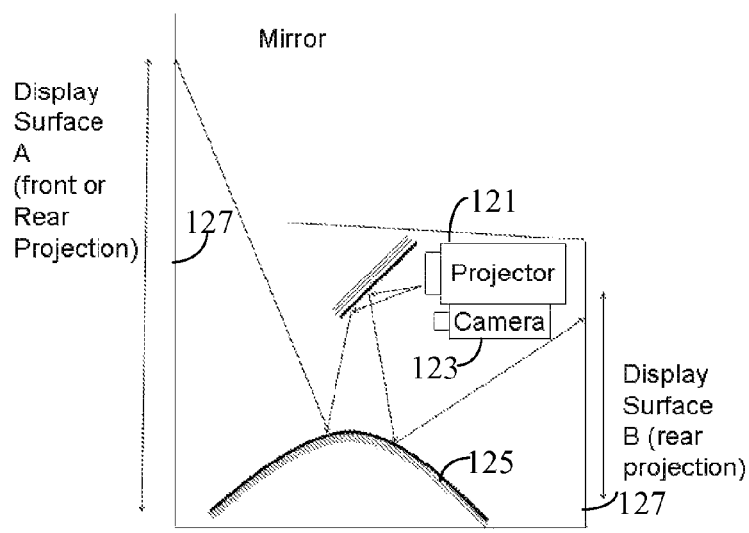
FIG. 38 is still another configuration of the present invention.

In FIGS. 37 and 38, two additional alternate configurations are shown. All elements in FIGS. 37 and 38 similar to those of FIG. 25 have similar reference characters and are described above.

In FIG. 37, a planar mirror 141 is used to fold the optical path so that projector 121 and camera 123 can be placed under the curved mirror 125, thereby achieving a smaller footprint. FIG. 38 shows a booth design for enclosing projector 121, camera 123, curved mirror 125, and flat mirror 141 within a booth 143 for display booth operation. Using this construct, one can simultaneously produce two projection images; a first front (or rear) projection image on a first Display Surface A and a second rear projection image on a second Display Surface B.

In several of the designs described above, the projector and cameras do not have common optical centers. However, it is possible to design projector-camera pairs with collocated optical centers. While a system with collocated optical centers allows the projector and the camera to have identical field-of-visions, a system with non-collocated optical centers has the potential to allow 3D reconstruction of its environment.

Up to this point, the provided examples have consisted of one camera and one projector, but as suggested above, multiple camera and projector combinations may be used. This poses the problem of how to seamlessly integrate, or combine, two or more projected images from two or more projectors that have different field-of-visions, or combine multiple projectors to create a large field of vision display. Therefore, before expounding on some of the visual effects possible by using multiple projectors, it may be beneficial to first discuss how multiple projectors may be seamlessly used together. That is, the efficacy of the present invention as applied to a single projector, single camera system, can be expanded to systems having multiple projectors and one (or more) camera(s).

The development of a non-parametric method for calibrating projector-camera systems and for solving the above described "view projection problem" is discussed above. That is, the view projection problem of defining how a projector should illuminate a scene (i.e. defining what a projector should project onto the scene) so that a camera sees a desired view is discussed above. In summary, the above-described development first provided multiple constructs for a light transport matrix T that relates an image p projected from a projector to an image c captured by a camera by the relationship c=Tp. Then, an interim working matrix, $\check{T}$, was defined as being populated by the following relationship:

$$\check{T}r = Tr/(\|Tr\|)^2, \ r=1, 2, 3, \ldots, pq \qquad (1)$$

where $\check{T}r$ is the $r^{th}$ column of T and pq is the number of columns in T. It was then shown that under the Display Constraint, one can define the view projection matrix $\check{T}^T$ as:

$$\check{T}^T = T^{-1}$$

which leads to the following relation:

$$p = \check{T}^T c$$

As is explained above, the Display Constraint comes from the observation that in a typical projector camera setup for information display purposes, any two distinct light rays emitting from distinct projector pixels will typically hit a camera sensor pixel array at distinct parts, i.e., there is usually little overlap in the camera pixels i hit by light from each of the distinct light rays. It implies that the columns of T are orthogonal to each other, which enables the normalization process in equation (1) to lead to the inverse of T. As is further explained above, in situations where the Display Constraint is not observed naturally, one can modify the construct of T to artificially impose the Display Constraint by declaring the brightest pixel in each row of T as being part of a light footprint resulting from a distinct light ray, and declaring all other pixels in the same row of T to be zero-valued entries. This operation forces T to become orthogonal, and thereby permits the application of equation (1).

The view projection matrix $\check{T}^T$ thus solves the view projection problem, defined as: given a desired view c; find an image $p = \check{T}^T c$ such that projecting p produces a scene which, when viewed from the location of the reference camera, has the same appearance as c.

In practice, large field-of-view displays, virtual living stations with surrounding wall screens, and many other applications require the use of more than one projector due to the limited field-of-view of each individual projector. In general when using more than one projector, the field-of-views of these projectors partially overlap with each other. To achieve view projection (or indeed to project a continuous image across the different field-of-views) using display systems having two or more projectors, one needs to mosaic the individual projectors to generate the desired camera view.

An example of mosaicing using the present invention is presented using a two-projector display system. It is to be understood that the present approach to constructing a mosaic display may be extended to display systems having three or more projectors, since extension to systems consisting of more projectors is straightforward. That is, the process described below for combining first projection image from a first projector with second projection image from a second projector can be applied to combining the second projection image of the second projector with a third image of a third projector to create a mosaic image combining the first, second, and third projection images. Similarly, the same process can be applied to combine the third projection image with a fourth projection image from a fourth projector to create a mosaic image that combines the first, second, third, and fourth projection images.

Consider a multi-projector display system consisting of two projectors with an overlapping field-of-view (FOV), and a camera with a FOV that is a superset of both projectors. The light transport matrixes $T_1$ and $T_2$ (separately determined) respectively relating each projector image $p_1$ and $p_2$ to corresponding camera captured image $c_1$ and $c_2$, give the following equations:

$$c_1 = T_1 p_1$$

and $$c_2 = T_2 p_2$$

To display an image that spans the field-of-vision, FOV, of both projectors, one needs to find $c_1$ and $c_2$ such that a composite image, c, combines $c_1$ and $c_2$ seamlessly. That is, composite image c, which is defined as $c = c_1 + c_2$, is the desired image as observed by the camera. More specifically, one needs to compute the appropriate projector images $p_1$ and $p_2$ to display the desired composite image c, by solving the following linear equation, $$c = c_1 + c_2$$

or $$c = (T_1 p_1) + (T_2 p_2) = [T_1 T_2][p_1 p_2]^T \qquad (2)$$

In such a setting, a camera pixel is lit by either one projector pixel from one of the projectors or two projector pixels simultaneously from respective projectors. In the former case, the camera pixel gives a linear equation on the corresponding projector pixel in $p_1$ or $p_2$. In the latter case where the camera pixel falls in an overlapping part of the FOVs of the two projectors, it gives a linear equation on the two corresponding projector pixels in $p_1$ or $p_2$, respectively. Since each projector pixel covers a number of camera pixels, it is constrained by a number of linear equations. Thus such equations from all the camera pixels form an overconstrained linear system on the projector images $p_1$ or $p_2$.

However, one can no longer directly compute the view projection matrix for the two-projector system (i.e. one cannot compute the inverse of $[T_1 T_2]$ directly), as could be done in the single-projector cases, describe above. This is because the projection of pixels from different projectors can overlap with each other, and therefore the Display Constraint no longer holds between the multiple projectors, i.e. columns in $T_1$ are not necessarily orthogonal to columns in $T_2$, and consequently Eq. (1), above, can not be used to compute the view projection matrix for $[T_1 T_2]$. Therefore, instead of directly solving the linear system in Eq. (2), an alternating linear solution has been developed by iterating two steps until convergence, as follows:

1. Given the current estimate of $p_2$, compute $p_1 = (\check{T}_1)^T (c - T_2 p_2)$
2. Given the current estimate of $p_1$, compute $p_2 = (\check{T}_2)^T (c - T_1 p_1)$ In the two formulas immediately above, $(\check{T}_1)^T$ and $(\check{T}_2)^T$ are the respective view projection matrices for the two projectors, and P2 is set equal to zero at the initial iteration step. Since the view projection matrices naturally convey the correspondence and mapping between the images of the projectors and the camera, it does not take many iterations for $p_1$ and $p_2$ in formulas 1 and 2 (immediately above) to converge to their respective complementary image. In practice, the iteration process takes only a few iterations cycles (typically 5 or less) for $p_1$ and $p_2$ to converge to respective complementing images that, when combined form a mosaic image. That is, $p_1$ will converge to a first image and $p_2$ will converge to a second image, and when images of $p_1$ and $p_2$ are projected and superimposed, they will form a combined mosaic image.

Figure 39:
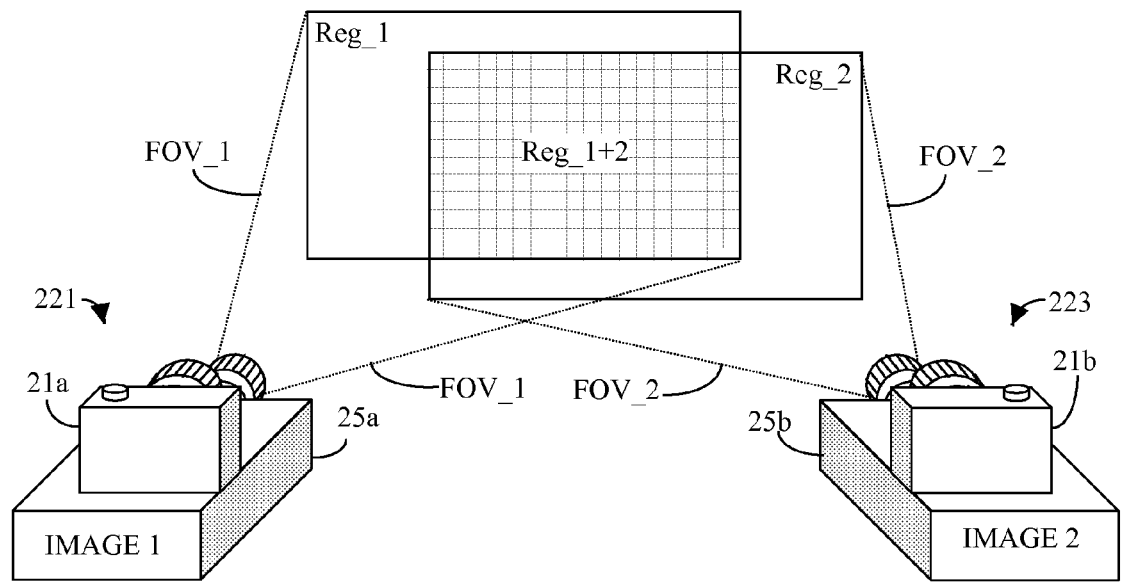
FIG. 39 shows a set up for mosaicing two, or more, projector-camera systems to create composite image.

With reference to FIG. 39, an example of a system that implements this process includes a first projector-camera system pair 221 and a second projector-camera system pair 223. First projection-camera system pair 221 includes a first projector 21a and a first camera 25a related by a first view projection matrix $\check{T}_1$ constructed using any method described above. Similarly, second projection-camera system pair 223 includes a second projector 21b and a second camera 25b related by a second view projection matrix $\check{T}_2$ also constructed using any of the above-described methods. It is further to be understood that $\check{T}_1$ and $\check{T}_2$ are each generated independently such that second projector-camera system pair 223 is off while $\check{T}_1$ is generated and first projector-camera system pair 221 is off while $\check{T}_2$ is generated.

First projector-camera system pair 221 has a first field-of-vision FOV_1 defining a first projection region Reg_1, and second projector-camera system pair 223 has a second field-of-vision FOV_2 defining a second projection region Reg_2. As shown, Reg_1 and Reg_2 overlap each other within an area identified by crosshatch marks. This overlap region is further labeled Reg_1+2. It is to be understood that the size of overlap region Reg_1+2 is made large for purposes of explanation and that a small overlap region is more typical, although the amount of overlap is not critical to the present application.

It is to be noted that formulas $p_1=(\check{T}_1)^T(c-T_2p_2)$ and $p_2=(\check{T}_2)^T(c-T_1p_1)$ account for geometric (i.e. spatial) and photometric (i.e. lighting) compensation, and thus take care of any blending needs between adjoining displayed images. This is because light transport matrix T incorporates geometric information, and consequently so does view projection matrix $\check{T}$. Furthermore when identifying the light footprint information for a typical light transport matrix T, full photometric information is also obtained due to each captured pixel in a light footprint having a value-entry for any light intensity variation of the three color (RGB) sub-components of each camera pixel (see for example, the white and shades of gray blocks that make up light footprints Ft1 in FIG. 3a or Ft2 in FIG. 4A).

However, if matrix T were to be constructed in a binary ON/OFF manner (that is, pixels within a light footprint are classified as being fully ON (i.e. classified as having a light intensity value of 255 in a typical luminosity scale of 0 to 255) and pixels outside the light footprint are classified as being fully OFF (i.e. classified as having a light intensity value of 0), then this binary ON/OFF manner of constructing matrix T would not have much photometric information (since it would in effect be a black-and-white image). However, this binary ON/OFF manner of constructing matrix T would still have full geometric information so that the above two formulas (1) for $p_1$ and (2) for $p_2$ would still be able to determine the geometric mosaicking of multiple projection images. In such a case, however, an additional light blending step (described below) would be helpful to blend light intensities of multiple projection images when mosaicking the multiple projection images.

Another situation where such an additional step for blending the light intensity of multiple projected images may be useful is in situations where light transport matrix T is created from a limited number of light footprint information. As is explained above, this would apply to situations where a projection surface (or scene) is flat, and the light transport matrix T is estimated using a limited number of intersecting patterns to generate a limited number of identified light footprints. Since the projection surface is flat, the missing geometric information within light transport matrix T can be inferred using homography techniques. The estimated light transport matrix T thus provides full geometric information, but it does not generally provide photometric information for locations between the limited number of identified light footprints.

If the projection surface is assumed to be uniformly white in color (such as a white projection canvas or a white wall), then a light blending step may be skipped by simply insert white-color information as photometric information for all identified and inferred light footprint information. Alternatively, if one assumes that the projection surface is of a uniform color, but not necessarily white, then one can define an estimated photometric reading by assigning it the photometric information value of one (or of an average of two or more) identified light footprint(s). One can then populate the photometric information of all inferred light footprints with the thus defined estimated photometric reading.

Returning now to the topic of the additional light blending step, it has been found that even if one has a light footprint matrix T generated by using all available pixel information (i.e. a full T, not an estimated T), a projected image can still benefit from an additional light blending step when mosaicking multiple projected images. In this case, the information obtained from the additional light blending step may constitute an additional parameter to the blending results obtained from the formulas $p_1=(\check{T}_1)^T(c-T_2p_2)$ and $p_2=(\check{T}_2)^T(c-T_1p_1)$.

Figure 40:
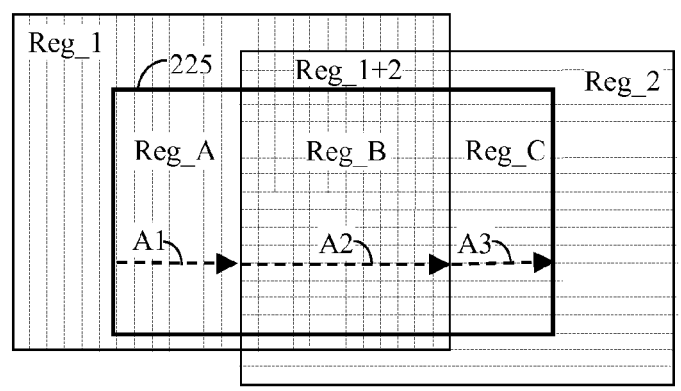
FIG. 40 shows a composite of images from multiple projector-camera systems.

A simplified view of multiple projection regions demonstrating this additional light blending step is shown in FIG. 40. As before, Reg_1 is the projection region provided by projector-camera system pair 221, and Reg_2 is the projection region provided by projector-camera system pair 223. For ease of explanation, Reg_1 is denoted by vertical hatch lines and Reg_2 is denoted by horizontal hatch lines. Overlap region Reg_1+2 is therefore denoted by the intersection of vertical and horizontal hatch lines. Of particular interest is the definition of a desired projection region 225 denoted by a darkened outline spanning across parts of regions Reg_1, Reg_2, and Reg_1+2. Desired projection region 225 defines the region upon which a desired combined (i.e. mosaic) image is to be displayed. Desired projection region 225 has image contributions from both projector-camera systems 221 and 223. Within desired projection region 225, Reg_A identifies that part of image region 225 provided solely by projector-camera system 221, Reg_C identifies that part of image region 225 provided solely by projector-camera system 223, and Reg_B identifies that part of image region 225 provided by a combination of projector-camera systems 221 and 223. It is to be understood that Reg_B might also be provided solely by either one of projector-camera systems 221 or 223, but it has been found that visual artifacts at an image border (where an image provided by one projector-camera system ends and a second image projected by a second projector-camera system begins) can be mitigated, or eliminated, by blending the transition between projector-camera systems. Therefore, in the presently preferred embodiment, both projector-camera systems 221 and 223 contribute to the image created within Reg_B. The question at hand is, how much (i.e. what parts) of an image within Reg_B each of projector-camera systems 221 and 223 provides.

Figure 41:
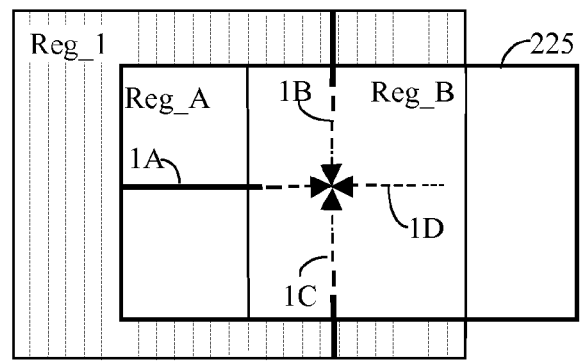
FIG. 41 shows an image as projected by a first of two projector-camera systems in a multi-projector-camera system.

For ease of explanation, FIG. 41 shows Reg_1 and that part of desired image 225 within the FOV of projector-camera system 221, i.e. Reg_B. The vertical hatch lines indicate that part of Reg_1 that is made dark due to it not contributing to desired image 225. Arrows 1A, 1B, 1C, and 1D indicate how normalized light intensity is varied as one moves away from a border of region Reg_1 toward Reg_B, and approaches a border of desired image 225 that is provided by projector-camera system 223. Area Reg_A is outside the combined section Reg_B, and is provided solely by projector-camera system 221. As one traverses arrow 1A from the left border of Reg_1 and approaches Reg_B, arrow 1A is shown dark to indicate that all image components are provided by projector-camera system 221. Following arrow 1A, as one enters Reg_B, arrow 1A is initially dark and is then lightened (i.e.

shown as thinning stripes) to indicate that the image intensity is initially strongly provided by projector-camera system 221, but the intensity drops off as one traverses from left to right along Array 1A toward the right border of Reg_B and Reg_1. Arrow 1D indicates that initially at the right end of Reg_B, no intensity is provided by projector-camera system 221, but the light intensity from projector-camera system 221 is increased as one traverses from right to left within Reg_B toward the end-point of arrow 1A. Similarly, arrow 1B indicates that the light intensity falls as one traverses down arrow 1B away from a border of region 225. Likewise, arrow 1C indicates that light intensity falls as one traverses up arrow 1C away from a border of region 225.

In other words, light intensity variations in an image can be expressed as a factor of a defined maximum light intensity value, i.e. the normalized value. This normalized valued multiplied by a factor of 1, would provide the defined maximum light intensity value, and the same normalized value multiplied by a factor of 0.5 would provide half the defined maximum light intensity value. By altering the normalized value within a given region, one can alter the brightness of the image within the given region. In the present case, undesirable light artifacts are avoided at the borders by providing a gradual blending of image borders, rather than abruptly changing light intensity of pixels at the borders.

Figure 42:
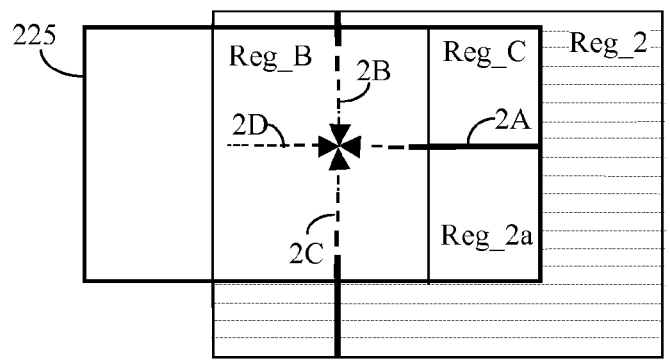
FIG. 42 shows an image as projected by a second of two projector-camera systems in a multi-projector-camera system.

A similar construct is shown in FIG. 42 from the point of view of projection-camera system 223. Again, the horizontal hatch lines indicate that part of Reg_2 that is made dark due to it not contributing to desired image 225. Also like before, Reg_B indicates the blending area where an image is provided by a combination of both projector-camera systems 221 and 223, and region Reg_C indicates that part of desired image region 225 provided solely by projector-camera system 223. Arrows 2A, 2B, 2C, and 2D are indicative of how the normalized light intensity is varied as moves from Reg_2 toward the borders of desired region 225, and within Reg_B toward that part of desired image 225 provided by projection-camera system 221. Area Reg_C defines that part of desired image 225 that is outside combined region Reg_B, and is provided solely by projector-camera system 223. As one enters region Reg_B, arrow 2A indicates that the image intensity is initially strongly provided by projector-camera system 223, but the intensity drops off as one traverses from right to left along Array 2A toward the left border of region Reg_B. Arrow 2D indicates that initially at the left end of region Reg_B, no intensity is provided by projector-camera system 223, but the light intensity from projector-camera system 223 is increased as one traverses from left to right within Reg_B. Similarly, arrow 2B indicates that the light intensity falls as one traverses down arrow 2B away from a border of desired region 225 within Reg_B. Likewise, arrow 2C indicates that light intensity falls as one traverses up arrow 2C away from a border of region 225.

For each pixel projected by projector-camera system 221, a determination is made of the projected pixel's proximity to the left, right, upper, and lower border of the Reg_1 and Reg_B. These parameters affect the normalized light intensity of the projected pixel. The closer a projected pixel from projector-camera system 221 is to any one border of Reg_1, the higher parameter contribution for that border, which makes for a brighter normalized intensity. The same is true for a projected pixel from projector-camera system 223 with determination of the projected pixel's proximity to the four borders of Reg_2 and Reg_B. Additionally, the light intensity of projected pixels close to border is adjusted as one approaches the border so as to avoid abrupt light intensity changes at the borders.

For example in FIG. 40, as one travels along arrow A1 in region Reg_A from left to right one will be moving from the left border of desired image region 225, which is provided wholly by projector-camera system 221, to the left border of region Reg_2, and region Reg_B which is provided by both projector-camera systems 221 and 223. As one moves along arrow A1 from left to right, one is moving further away from the left border of Reg_1, but the image is provided solely by projector-camera system 221, and so the normalized light intensity of pixels produced by projector-camera system 221 is at its normal, highest value. When one reaches the end of arrow A1 and reaches the beginning of arrow A2, projector-camera system 221 is still at its highest normalized value since light blending is just about to begin. At the start of arrow A2, projector-camera system 221 has its highest normalized light intensity and projector camera system 223 has its lowest normalized light intensity. As one moves along arrow A2 from left to right (i.e. from Reg_A provided exclusively by projector-camera system 221 toward Reg_C provide exclusively by projector-camera system 223), the normalized light intensity of projector-camera system 221 is lowered from its highest to it lowest normalized light intensity value. Conversely, as one moves along arrow A2 from left to right, the normalized light intensity of projector-camera system 223 is raised from its lowest normalized light intensity value to its highest. It is to be understood that this light transition is not necessarily linear. For example, the greater changes in normalized light intensity of projector camera system 221 preferred occur as one approaches the right border or Reg_B along arrow A2.

Therefore, at the end of arrow A2, projector-camera system 223 is at its highest normalized light intensity, and projector-camera system 221 is at its lowest normalized light intensity. As one moves from left to right along arrow A3, projector-camera system 223 provides all the projected light and no light contribution is provided by projector-camera system 221. Thus, within region Rev_C, projector-camera system 223 may be maintained at its highest normalized light intensity.

Figure 43:
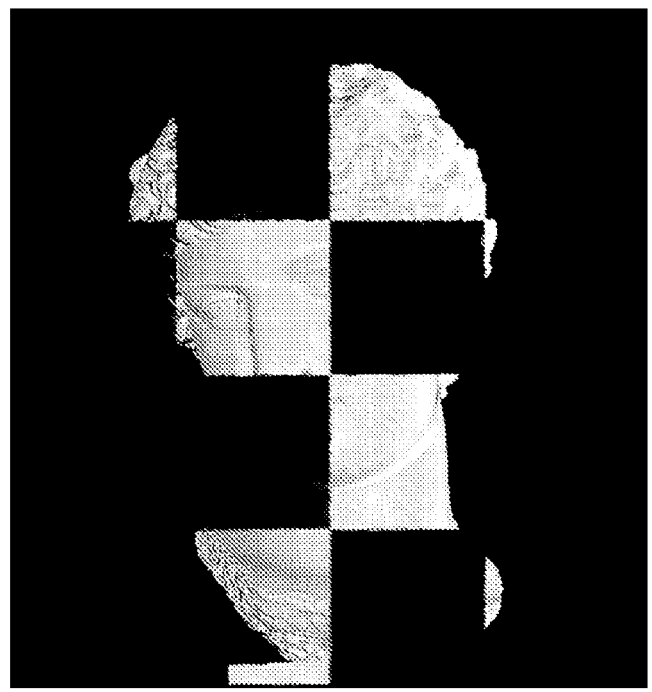
FIG. 43 is an example of the present invention applied to the projection of a checkerboard pattern onto a complex surface.

The above formulas $p_1=(\check{T}_1)^T (c-T_2 p_2)$ and $p_2=(\check{T}_2)^T (c-T_1 p_1)$, using both geometric and photometric information, was tested by mosaicing two projectors on a statue, as shown in FIG. 43. This is not a contrived example, as the two projectors are required to cover all surfaces visible from the camera. Using this setup, a seamless, distortion-free (from the point of view of the camera) image was successfully projected on the statue. One can also easily perform relighting by view projecting images of the statue under varying illumination conditions.

Figure 44A:
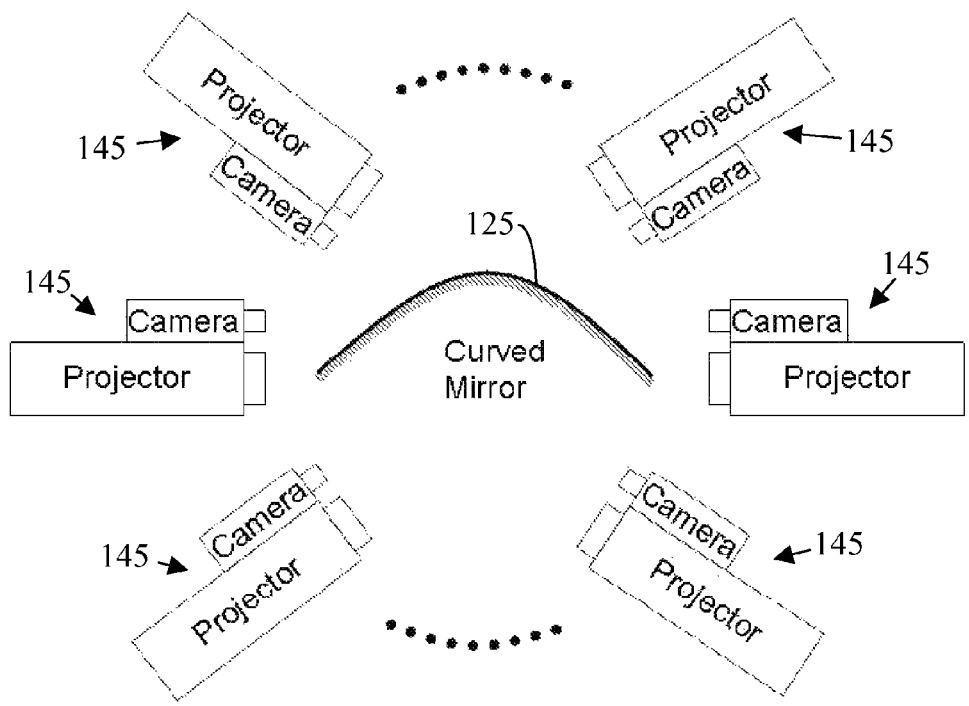
FIG. 44A shows a design that uses a single curved mirror 125 and multiple projector-camera pairs 145.
Figure 44B:
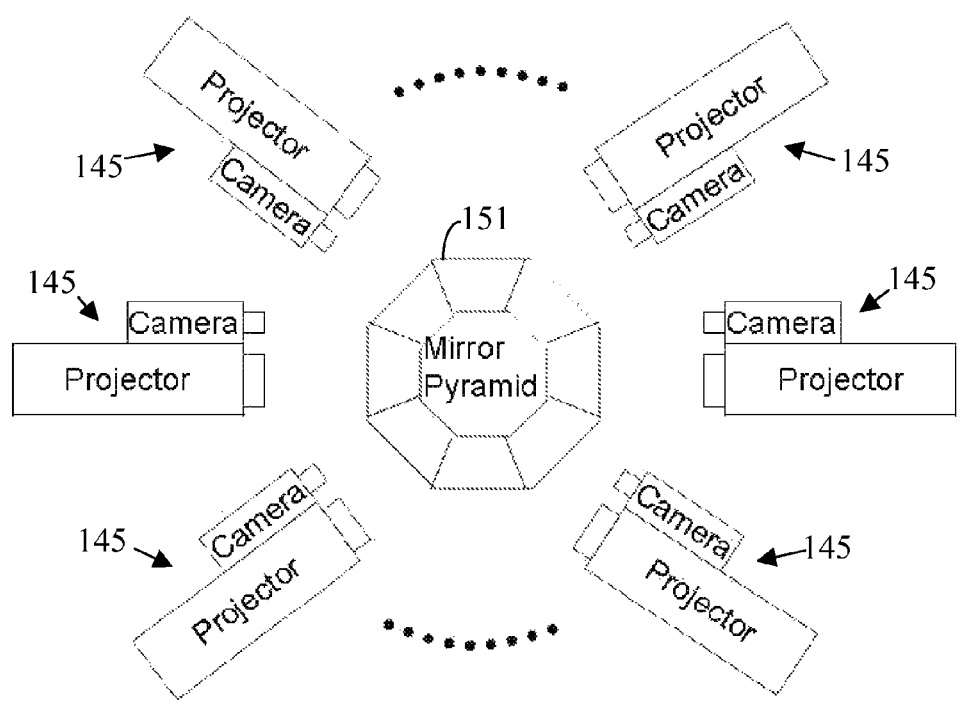
FIG. 44B shows a design that uses a single mirror pyramid 151 and multiple projector-camera pairs 145.

Construction of large FOV projector systems using the above method of combining multiple projectors is shown in FIGS. 44A and 44B. In FIG. 44A, a single curved mirror 125 is used in combination with multiple projector-camera pairs 145. In FIG. 44B, a single mirror pyramid 151 is used with multiple projector-camera pairs 145 to achieve a large FOV. With the construct of FIG. 44B, the optical centers of all projectors can be collocated within the mirror pyramid, creating a single virtual large FOV projector. Similarly, the camera optical centers can also be collocated to create a single virtual large FOV camera.

Figure 45:
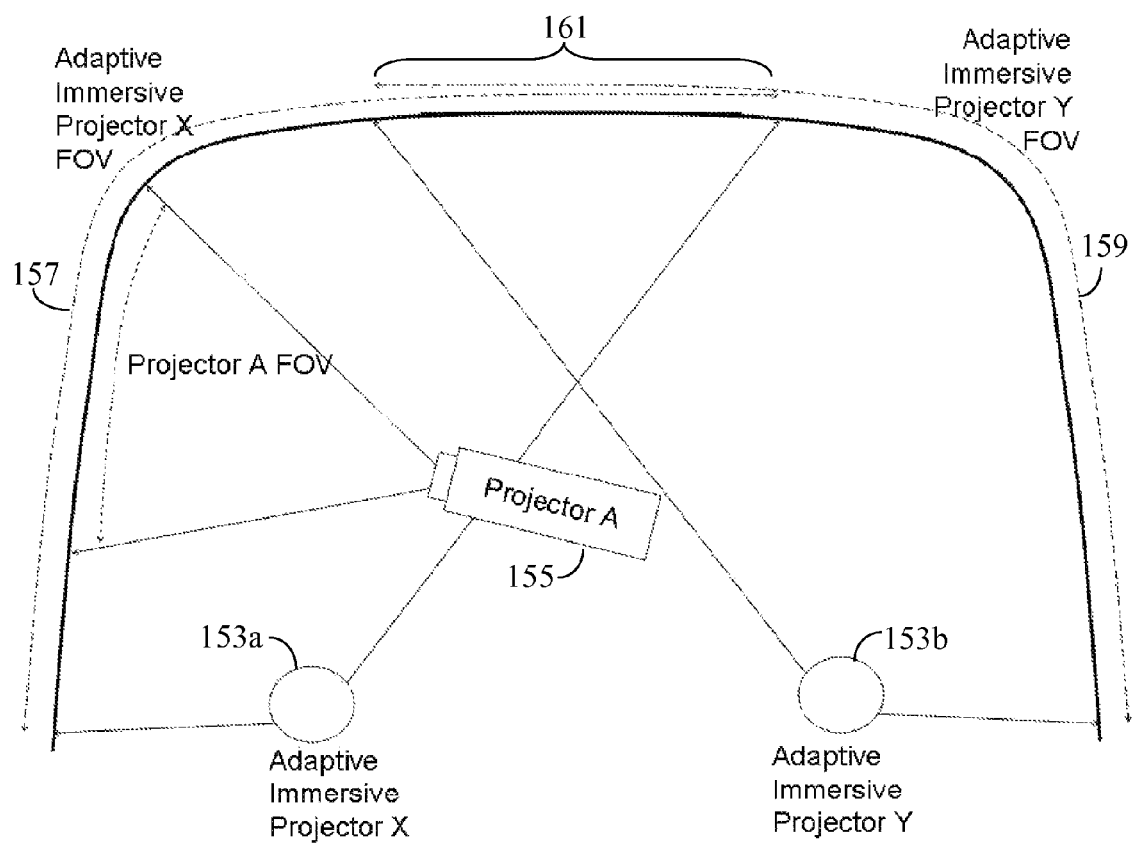
FIG. 45 shows how multiple large FOV projectors 153a and 153b can be used to achieve an even larger overall projection FOV.

FIG. 45 shows that multiple large FOV projectors 153a and 153b (such as those shown in FIGS. 44A, 44B, or other large FOV projector systems) can be used to achieve an even larger overall projection FOV. One or more conventional projectors 155 can also be used in combination. As seen, the FOV of projector 153a, as indicated by dotted line 157 overlaps the FOV of projector 154b, as indicated by dotted line 159, by an overlap amount 161. The images from projectors 153a and 153b may be combined using the method described above for combining multiple projectors.

Although the above discussed methods of generating and using the light transport matrix T are more efficient than previous approaches, the above discussed methods still requires substantial memory resources during generation of the light transport matrix T. Once generated, however, the memory and computational resource requirements for using the light transport matrix T can be efficiently reduced, as is described above. It is therefore desirable to now describe a method of reducing the memory requirements for generating light transport matrix T.

Above are described methods for calibrating multiple projectors so that they can be automatically aligned. Also described are methods for efficiently storing the light transport matrix T, as well as methods for reducing the number of capture image needed from p×q down to p+q. Further described is how to synthesize each column of light transport matrix T by $$Tj \approx MIN(C_{S1}, C_{S2})$$

where Tj is the $j^{th}$ column of T. S1 and S2 are sets of pixels where S1 ∩ S2={j}, and $C_{S1}, C_{S2}$ are the sum of the respective columns of T, i.e. $Cs = \Sigma_{j \in S} Tj$.

Recall that the display constraint dictates that the non-zero entries in the distinct columns of T do not line up on the same row. This means that on each row of T, there will only be one non-zero entry and one just needs to store that entry along with its column index. This means one can reduce the space needed to store T down to that for a single column plus a column of index values. In a real world setting, due to sensor noise many of the unlit entries of T will not be exactly zero. One can simply identify the maximum value in each row and designate that entry as the one non-zero entry for the row.

Note that even though the final representation of the light transport matrix needs only a single column of light values and a single column of index values, during the capture process one is still storing p+q images. When the capture device has mass storage capability, such as a built-in hard disk drive, this may not be an issue. However, if the capture device needs to work with a small memory footprint, this may not be acceptable. Additionally, computing the columns of T from the p+q images also takes a significant amount of computational resources. Fortunately, as is shown below, it is possible to capture the light transport matrix using just enough memory to hold two copies of the matrix (in its efficient format), and a single capture image.

A key aspect of the present new process for capturing light transport matrix T is that one captures matrix T directly into its efficient, sparse format, instead of first storing the p+q images, then generating the full light transport matrix T from the p+q images, and then compressing the resultant full matrix T into its efficient format. In order to do this, one needs a way to compute the column of light values and the column of index values directly from the set of p+q images as each image is captured.

In the previous approach described above, the sparse matrix representation is computed by finding the maximum value in each row. The column index of that maximum value entry gives one the index value, and the maximum value itself gives one the light transport value entry for that row. This means that in the end, only the maximum light value is necessary, and so the present embodiment finds the maximum values during image capture.

The above reasoning assumes that one is finding the maximum values across the columns of light transport matrix T.

However, one is not capturing the columns of matrix T directly, and instead one is approximating each of the p×q values from the p+q images. A pseudo code (or procedural steps) describing the present embodiment is shown in FIG. 46. That is, FIG. 46 shows a Small Memory Footprint Algorithm for capturing light transport matrix T directly into its efficient, sparse representation T=(Tval, Tid).

Recall that the present approach requires the construction of sets $$Y=\{Y1, \ldots, Yp\} \text{ and } X=\{X1, \ldots, Xq\}$$

such that $$\forall i \in \{1, \ldots, (p \times q)\}, \exists X_j, Y_k | X_j \cap Y_k = \{i\},$$

In FIG. 46, each $P_X(P_Y)$ is a projector image formed by turning the set of pixels in a particular Xi(Yj) ON, and each $C_X(C_Y)$ is the corresponding captured image when $P_X(P_Y)$ is projected. The capture phase captures $C_Y$ where Y=1 ... p and $C_X$ where X=1 ... q. Note that the algorithm does not need to store all the $C_X, C_Y$ images. Instead, a pair MaxX, MaxY images and IdX, IdY index images are computed and stored. The sparse light transport matrix T=(Tval, Tid) is then computed from these four images. The pseudo code function IntersectionIndex maps a 2D index (j, k) back to a 1D index i (the relationship between i, j, k is defined immediately above).

The basic insight that allows this efficient procedure to work is the following: if a captured camera pixel's value is at its maximum when projector pixel i is turned ON, then it should also be at its maximum when projector images Pj, Pk are projected, because the projector pixel i should be turned ON in both projector images Pj, Pk. Thus finding the maximum across the set of images $P_X$ where X=1 ... q and across $P_Y$ where Y=1 ... p will identify the Pj, Pk images whose camera pixels were at their maximum values when projector pixel i was turned ON.

Without this algorithm, it was previously necessary to store all the p+q images. Using this algorithm, one only needs to store the MaxX, MaxY and IdX, IdY images, and the Tval, Tid images. Similarly without this algorithm, it was previously necessary to synthesize the p×q columns of light transport matrix T before it could be compressed into efficient Tval, Tid format. This requires O(p×q×m×n) time. The new algorithm runs in O((p+q)×m×n) time.

It is to be understood that the present embodiment for reducing memory and computational resources in the generation of light transport matrix T may be substituted for any of the above-described applications of light transport matrix T.

FIGS. 47 to 50 provide an alternate, pictorial rendition of the present embodiment of FIG. 46. In FIG. 47, the first part of the pseudo code of FIG. 46 creates three matrices (or arrays) MaxX[i], MaxY[i], and Tval[i], and populates the three matrices with zero values. Each of the three matrices are of size (m×n), i.e. the size of the camera pixel density. For ease of explanation, each of the three matrices is illustratively shown as a rectangular matrix to resemble the arrangement of a projector pixel array and a camera photo sensor array, as discussed above. It is to be understood, however, that the actual arrangement of the data set is irrelevant, as long each datum's relationship to the data set, as whole, is known.

Figure 48:
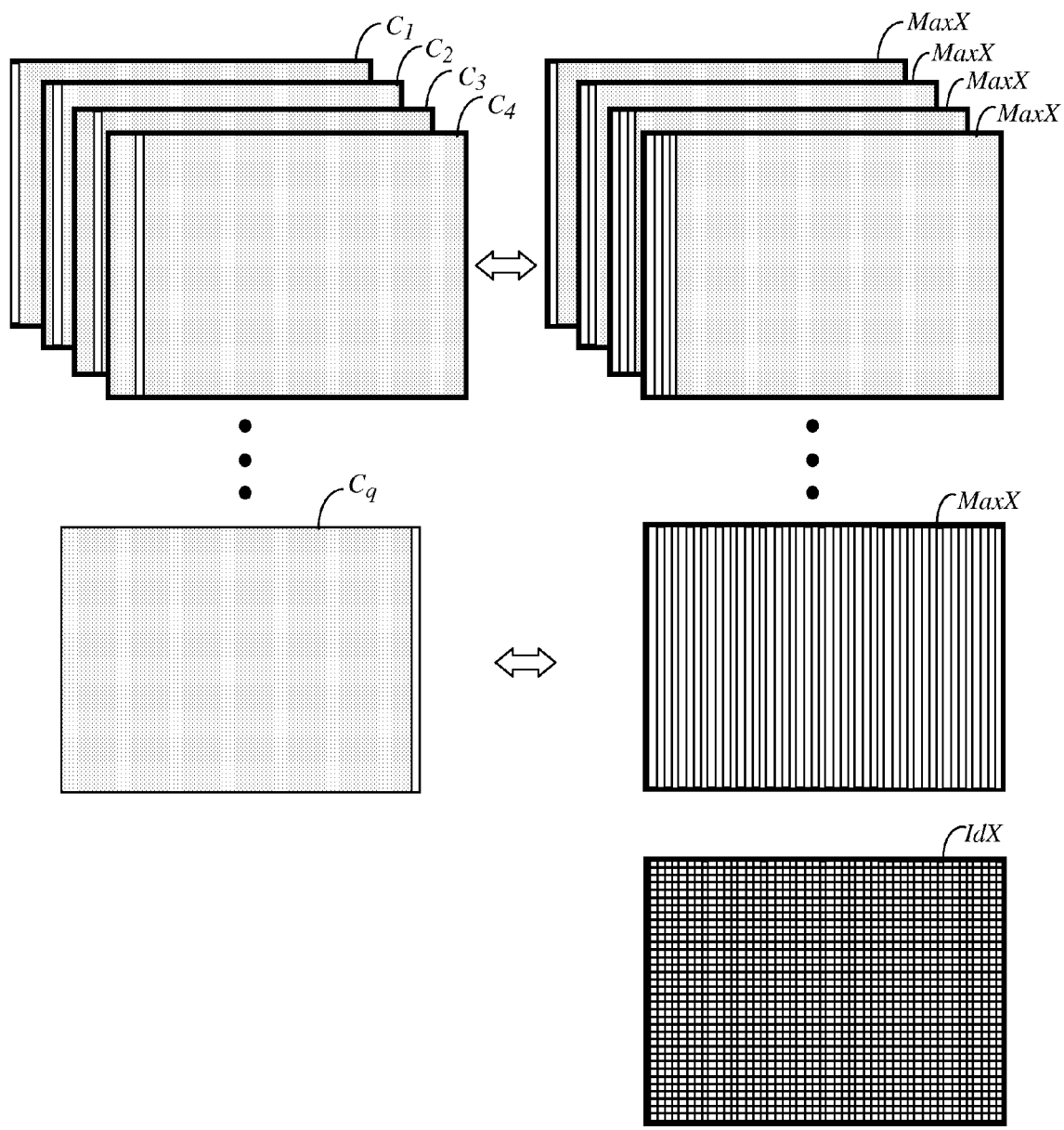
FIG. 48 is a pictorial representation of the second part of the algorithm of FIG. 46.

In FIG. 48, the next part of the pseudo code of FIG. 46 compares each pixel location $C_X[i]$ of each newly captured image $C_X$ of a projected vertical line (created by simultaneously turning ON all the projector pixels within one column of a projector pixel array) to the current contents of MaxX.

Whenever a current pixel value within captured image $C_X$ is brighter than the value currently stored in the correlating location within MaxX, the correlating location within matrix MaxX is overwritten with current captured image's brighter pixel value. When comparing the first captured image, $C_1$, to MaxX, this process results in MaxX storing a copy of the first captured picture $C_1$ since matrix MaxX was initially populated with all zero values. When comparing the second and subsequent captured images ($C_2$ to $C_q$) to the current values of MaxX, any previously stored bright vertical line is retained, and any new bright vertical line from the currently captured image is written to MaxX. Thus, by the time this process is applied to the last captured image (i.e. $C_q$) of the last projected vertical line, MaxX has stored all q vertical lines from all q captured images into MaxX. It is noted that a second matrix, or array, IdX maintains a running record correlating each entry within MaxX to its corresponding projector column within the projector pixel array.

Figure 49:
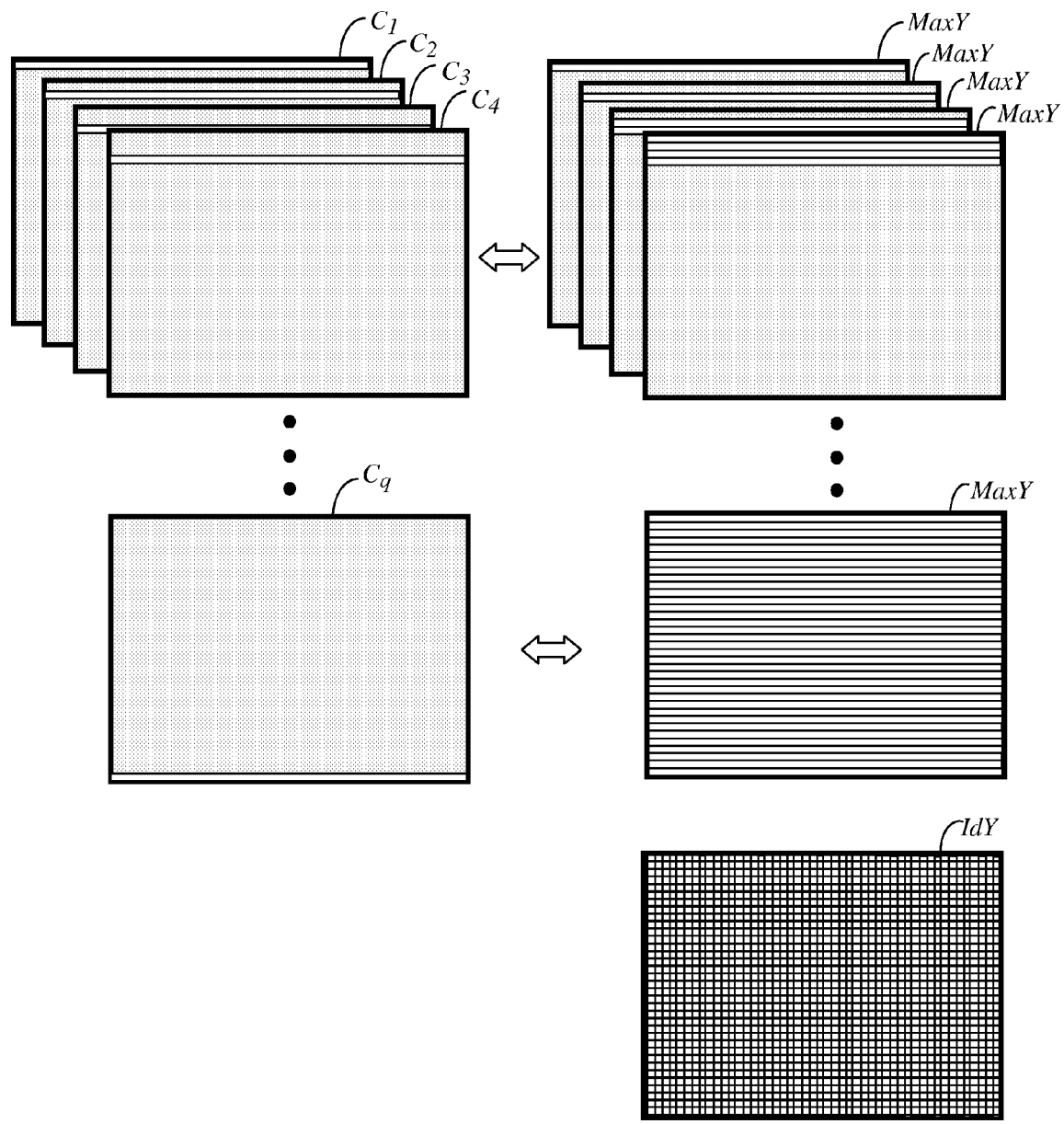
FIG. 49 is a pictorial representation of the third part of the algorithm of FIG. 46.

In FIG. 49, the next part of the pseudo code of FIG. 46 executes a similar process for storing the values of captured bright horizontal lines corresponding to projected horizontal lines. As before, each pixel location $C_Y[i]$ of each newly captured image $C_Y$ of a projected horizontal line (created by simultaneously turning ON all the projector pixels within one row of a projector pixel array) is compared to the current contents of MaxY. Whenever a current pixel value within captured image $C_Y$ is brighter than the value currently stored in the correlating location within MaxY, the correlating location within matrix MaxY is overwritten with current captured image's brighter pixel value. When comparing the first captured image, $C_1$, to MaxY, this process results in MaxY storing a copy of the first captured picture $C_1$ since matrix MaxY was initially populated with all zero values. When comparing the second and subsequent captured images ($C_2$ to $C_p$) to the current values of MaxY, any previously stored bright horizontal line is retained, and the new bright horizontal line from the currently captured image is written to MaxY. Thus, by the time the present process is applied to captured image $C_p$ of the last projected horizontal line, MaxY has stored all p horizontal lines from all p captured images into MaxY. It is noted that a second matrix, or array, IdY maintains a running record correlating each entry within MaxY to its corresponding projector row within the projector pixel array.

Figure 50:
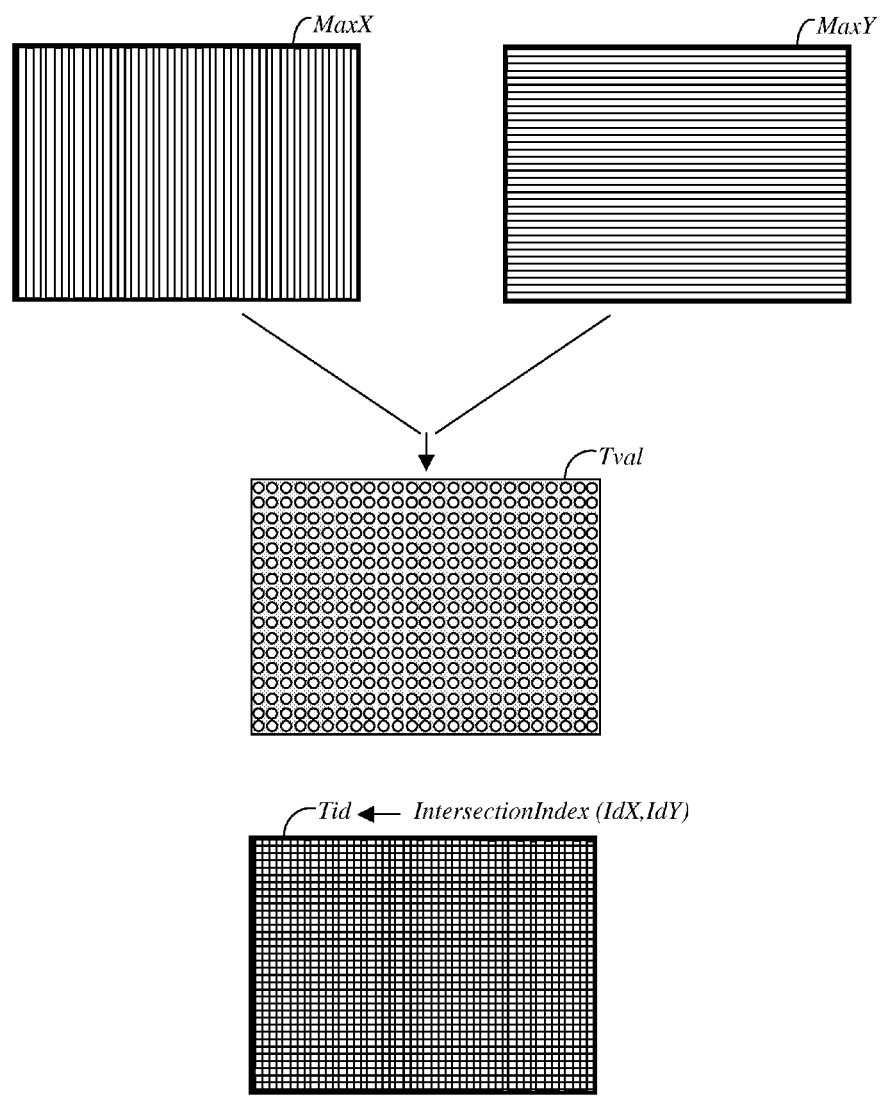
FIG. 50 is a pictorial representation of the fourth part of the algorithm of FIG. 46.

In FIG. 50, the last part of the pseudo code of FIG. 46 compares each stored value of MaxX with its corresponding value stored in MaxY, and writes the smaller of the two (i.e. the dimmer value) to matrix Tval. This results in the storing of light footprint information in Tval. Again, matrix Tid maintains index information for Tval correlating each value within Tval to its corresponding projector pixel. Tid obtains its index information by combining the information of IdX and IdY.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of generating light transport coefficients relating a digital projector to a digital camera, said digital projector having an array of projection pixels and said digital camera having an array of sensor pixel, said method comprising at least one processing unit to execute the following steps:
    (a) defining a first test image;
    (b) defining a second test image, each pixel within said first test image having a one-to-one corresponding with a pixel within said second test image;
    (c) defining a first set of first test patterns, each first test pattern within said first set defining a first group of selected projection pixels to be simultaneously activated and defining a first group of not-selected projector pixels to be simultaneously not-activated;
    (d) defining a second set of second test patterns, each second test pattern within said second set defining a second group of selected projection pixels to be simultaneously activated and defining a second group of not-selected projector pixels to be simultaneously not-activated;
    (e) using said digital projector to project, each in turn, said first test patterns;
    (f) using said digital camera to capture, each in turn, each projected first test pattern;
    (g) checking each captured first test pattern by comparing the captured light intensity value of each pixel of said captured first test pattern with a corresponding pixel in said first test image, and if the captured light intensity value being compared is greater than that of the corresponding pixel in said first test image, then over-writing the corresponding pixel with the captured light intensity value, otherwise leaving said corresponding pixel unchanged;
    (k) comparing, pixel-by-pixel, the intensity value of each pixel within said first test image with the intensity value in its corresponding pixel within said second test image, storing the lower intensity value.

2. The method of claim 1, wherein said first test image has a pixel resolution matching said digital camera.

3. The method of claim 2, wherein said second test image has a pixel resolution matching said digital camera.

4. The method of claim 1, wherein each of said first test patterns defines said first group of selected projection pixels as a straight line pattern of projection pixels spanning from an edge of said array of projection pixels to an opposite edge of said projection pixels.

5. The method of claim 1, wherein each of said second test patterns defines said second group of selected projection pixels as a straight line pattern of projection pixels spanning from an edge of said array of projection pixels to an opposite edge of said projection pixels, wherein the straight line pattern of said second group of selected projection pixels is aligned along a direction different from the straight line pattern of said first group of selected projection pixel.

6. The method of claim 1, wherein each of said first test patterns is limited to having not more than one projection pixel in common with each of said second test patterns.

7. The method of claim 1, wherein all projector pixels not within said first group of selected projection pixels are part of said first group of not-selected projection pixels.

8. The method of claim 1, wherein selected projection pixels are lit to their maximum light intensity, and not-selected pixels are maintained dark.

9. The method of claim 1, wherein all of said first test patterns within said first set are distinct from each other.

10. The method of claim 9, wherein all of said second test patterns within said second set are distinct from each other.

11. The method of claim 1, wherein said first test image is a blank image.

12. The method of claim 11, wherein said second test image is a blank image.

13. The method of claim 1, wherein in step (g), if the compared value of the captured light intensity value of said first test pattern is greater than that of the corresponding pixel in said first test image, then further storing correlation information correlating the overwritten corresponding pixel in said first test image to the first test pattern being checked.

14. The method of claim 1, wherein between steps (g) and (k), said method further comprising:
   (h) using said digital projector to project, each in turn, said second test patterns;
   (i) using said digital camera to capture, each in turn, each projected second test pattern;
   (j) checking each captured second test pattern, comparing the captured light intensity value of each pixel of said captured second test pattern with a corresponding pixel in said second test image, and if the captured light intensity value of said second test pattern is greater than that of the corresponding pixel in said second test image, then over-writing the corresponding pixel within said second test image with the captured light intensity value, otherwise leaving the corresponding pixel unchanged.

15. The method of claim 14, wherein:
   in step (g), if the compared value of the captured light intensity value of said first test pattern is greater than that of the corresponding pixel in said first test image, then further storing correlation information correlating the overwritten corresponding pixel in said first test image to the first test pattern being checked; and
   in step (j), if the compared value of the captured light intensity value of said second test pattern is greater than that of the corresponding pixel in said second test image, then further storing correlation information correlating the overwritten corresponding pixel in said second test image to the second test pattern being checked.

16. The method of claim 1, wherein in step (f):
   each captured image has a resolution matching said first blank image.

17. The method of claim 1, wherein all projection pixels within said digital projector are activated at least once by the end of said step (e).

18. The method of claim 1, wherein no projector pixel within said digital projector is actuated more than once during the execution of said step of (e).

19. The method of claim 1, wherein in said step (e), each of said first test patterns is projected consecutively with no second test pattern projected between projections of said first test patterns.

20. The method of claim 1, further comprising:
   defining a composite_light_transport image as a blank image having a pixel resolution matching the pixel resolution of said first test image; and
   in step (k), said lower intensity value is stored in the pixel within said composite_light_transport image that corresponds to pixel within said first test image being compared.

21. The method of claim 1, further comprising in step (k):
   identifying the first test pattern correlated to the pixel within said first test image being compared;
   identifying the second test pattern correlated to the pixel within said second test image being compared;
   determining an intersection index identifying the projection pixel corresponding to the illumination of an intersection of the identified first test pattern and the identified second test pattern; and
   correlating with the stored lower intensity value the determined intersection index.

* * * * *